(12) United States Patent
Hamada et al.

(10) Patent No.: US 7,642,738 B2
(45) Date of Patent: Jan. 5, 2010

(54) POWER STEERING APPARATUS

(75) Inventors: Kenichi Hamada, Kanagawa (JP);
Tamotsu Yamaura, Kanagawa (JP);
Atsushi Matsuoka, Kanagawa (JP);
Yutaka Makino, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 307 days.

(21) Appl. No.: 11/845,847

(22) Filed: Aug. 28, 2007

(65) Prior Publication Data

US 2008/0048591 A1 Feb. 28, 2008

(30) Foreign Application Priority Data

Aug. 28, 2006 (JP) ............... 2006-230896

(51) Int. Cl.
*H02P 7/00* (2006.01)
(52) U.S. Cl. .................. 318/434; 318/432; 318/433; 318/471
(58) Field of Classification Search .......... 318/432, 318/433, 434, 471, 472, 473; 180/412, 422, 180/443
See application file for complete search history.

(56) References Cited

U.S. PATENT DOCUMENTS

| | | | |
|---|---|---|---|
| 6,334,503 B1 * | 1/2002 | Fukumura et al. | ........... 180/446 |
| 7,084,593 B2 * | 8/2006 | Crowley | ............ 318/432 |
| 7,091,686 B2 * | 8/2006 | Kagei | ............ 318/434 |
| 7,129,660 B2 * | 10/2006 | Fujita et al. | ............ 318/434 |
| 7,164,248 B2 * | 1/2007 | Hayashi | ............ 318/434 |
| 7,304,447 B2 * | 12/2007 | Hirai et al. | ............ 318/471 |

FOREIGN PATENT DOCUMENTS

JP 2002-211425 A 7/2002

* cited by examiner

*Primary Examiner*—Bentsu Ro
*Assistant Examiner*—Thai Dinh
(74) *Attorney, Agent, or Firm*—Foley & Lardner LLP

(57) ABSTRACT

A power steering apparatus includes an electric motor, a temperature sensor, and a control unit. The electric motor produces an assist steering effort in a steering system. The temperature sensor measures a temperature of a first portion subject to thermal influence of operation of the electric motor. The control unit determines an estimated temperature of a second portion in accordance with a value of a motor current, the second portion being subject to thermal influence of operation of the electric motor. The control unit determines a first upper limit value in accordance with the measured temperature; determines a second upper limit value in accordance with the estimated temperature; limit the motor current to a smaller one of the first and second upper limit values, when determining that the temperature sensor is normal; limit the motor current to the second upper limit value, when determining that the temperature sensor is abnormal.

27 Claims, 43 Drawing Sheets

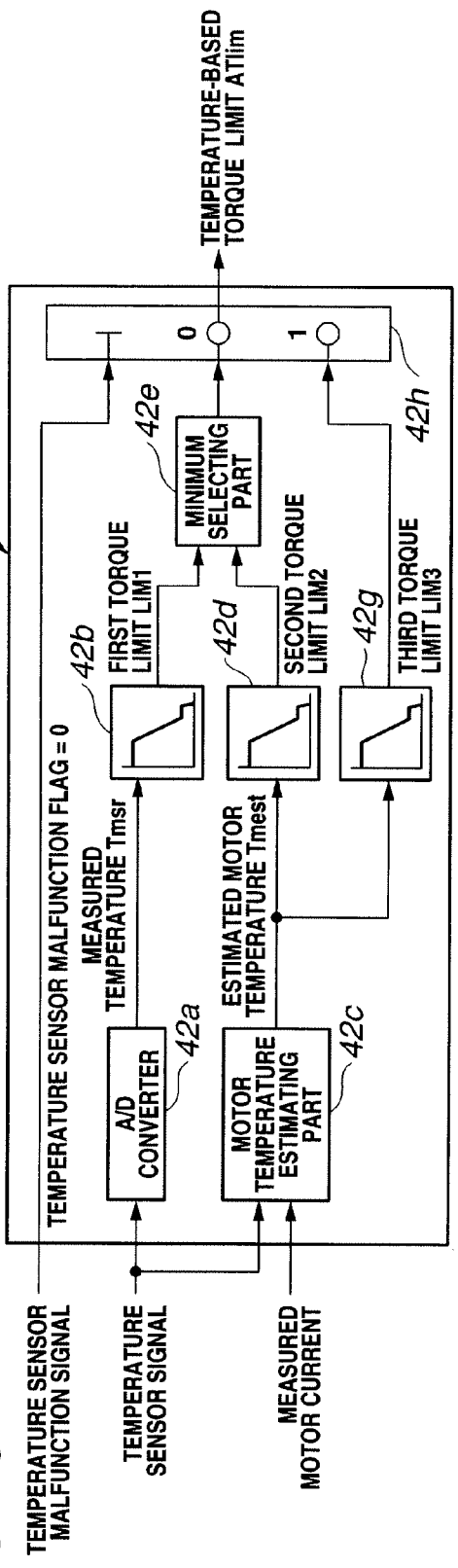
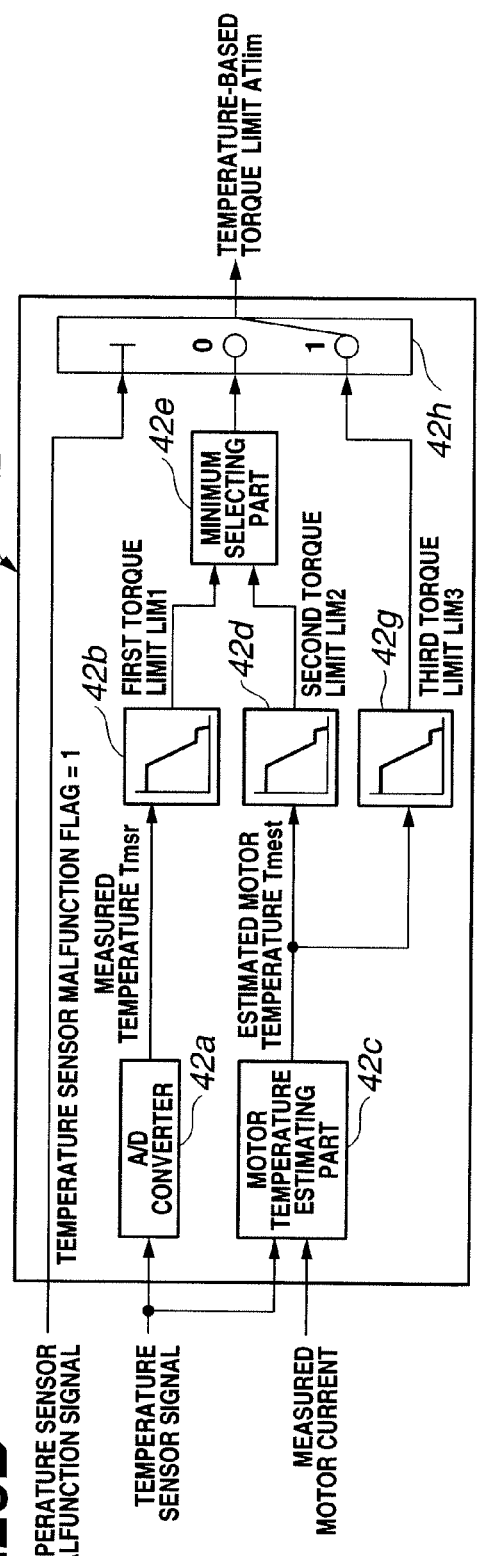
FIG.26A
FIG.26B

POWER STEERING APPARATUS

BACKGROUND OF THE INVENTION

The present invention relates to power steering apparatuses including an electric motor for generating an assist steering effort.

Japanese Patent Application Publication No. 2002-211425 discloses a power steering apparatus with an electric motor, in which a temperature sensor is provided at a motor drive section of a control unit. The temperature of the electric motor is estimated by: assuming an initial temperature of the electric motor to be equal to a temperature value detected by the temperature sensor when an ignition switch is turned on; computing an estimated temperature increase on the basis of a value of a motor current supplied to the electric motor; and adding the estimated temperature increase to the initial temperature. When the temperature sensor is judged as failed, then the motor current is limited to a motor current value with which both of the control unit and the electric motor can continuously operate without being overheated.

SUMMARY OF THE INVENTION

When the temperature sensor is failed in the power steering apparatus as disclosed in Japanese Patent Application Publication No. 2002-211425, the power steering apparatus may fail to control the assist steering effort as desired, because it is impossible to compute the initial temperature of the electric motor on the basis of the detected temperature value, and therefore to estimate the temperature of the electric motor.

Accordingly, it is desirable to provide a power steering apparatus including an electric motor for generating an assist steering effort, and a temperature sensor, wherein the power steering apparatus is capable of controlling the assist steering effort as desired even when the temperature sensor is abnormal or failed.

According to one aspect of the present invention, a power steering apparatus comprises: an electric motor for producing an assist steering effort in a steering system; a temperature sensor for measuring a temperature of a first portion subject to thermal influence of operation of the electric motor; and a control unit configured to: determine an estimated temperature of a second portion in accordance with a value of a motor current flowing through the electric motor, the second portion being subject to thermal influence of operation of the electric motor; determine a first upper limit value in accordance with the measured temperature; determine a second upper limit value in such a manner that when the estimated temperature is below a threshold temperature value, the second upper limit value is larger than or equal to a maximum value of the motor current, and that when the estimated temperature is above the threshold temperature value, the second upper limit value is smaller than the maximum value; determine whether the temperature sensor is normal or abnormal; limit the motor current to a smaller one of the first and second upper limit values, when determining that the temperature sensor is normal; limit the motor current to the second upper limit value, when determining that the temperature sensor is abnormal; and correct at least one of the estimated temperature and the threshold temperature value in such a manner that the estimated temperature increases with respect to the threshold temperature value, when determining that when the estimated temperature is below the threshold temperature value, the temperature sensor becomes abnormal. The control unit may be configured to determine the estimated temperature of the second portion by: determine an estimated amount of change of temperature of the second portion in accordance with the value of the motor current; and adding the estimated amount of change of temperature to a reference temperature value. The first portion may include a switching circuit for driving the electric motor. The second portion may include the electric motor. The control unit may be configured to: determine whether the determination of the estimated temperature is normal or abnormal; and limit the motor current to the first upper limit value, when determining that the temperature sensor is normal and that the determination of the estimated temperature is abnormal. The control unit may be configured to hold the estimated temperature constant, when determining that when the estimated temperature is above the threshold temperature value, the temperature sensor becomes abnormal. The control unit may be configured to set the first upper limit value to be larger than or equal to the maximum value of the motor current, when determining that the temperature sensor is abnormal. The control unit may be configured to correct the estimated temperature by adding a predetermined value, when determining that when the estimated temperature is below the threshold temperature value, the temperature sensor becomes abnormal. The control unit may be configured to correct the threshold temperature value by subtracting a predetermined value, when determining that when the estimated temperature is below the threshold temperature value, the temperature sensor becomes abnormal.

According to another aspect of the invention, a power steering apparatus comprises: an electric motor for producing an assist steering effort in a steering system; a temperature sensor for measuring a temperature of a portion subject to thermal influence of operation of the electric motor; and a control unit configured to: determine an estimated temperature of the portion in accordance with a value of a motor current flowing through the electric motor; determine a first upper limit value in accordance with the measured temperature; determine a second upper limit value in such a manner that when the estimated temperature is below a threshold temperature value, the second upper limit value is larger than or equal to a maximum value of the motor current, and that when the estimated temperature is above the threshold temperature value, the second upper limit value is smaller than the maximum value; determine whether the temperature sensor is normal or abnormal; limit the motor current to a smaller one of the first and second upper limit values, when determining that the temperature sensor is normal; limit the motor current to the second upper limit value, when determining that the temperature sensor is abnormal; and correct at least one of the estimated temperature and the threshold temperature value in such a manner that the estimated temperature increases with respect to the threshold temperature value, when determining that when the estimated temperature is below the threshold temperature value, the temperature sensor becomes abnormal.

According to a further aspect of the invention, a power steering apparatus comprises: an electric motor for producing an assist steering effort in a steering system; a temperature sensor for measuring a temperature of a first portion subject to thermal influence of operation of the electric motor; and a control unit configured to: determine an estimated temperature of a second portion in accordance with a value of a motor current flowing through the electric motor, the second portion being subject to thermal influence of operation of the electric motor; determine a first upper limit value in accordance with the measured temperature; determine a second upper limit value in such a manner that when the estimated temperature is within a first predetermined temperature range, the second upper limit value is larger than or equal to a maximum value of the motor current, and that when the estimated temperature is within a second predetermined temperature range, the second upper limit value is smaller than the maximum value; determine whether the temperature sensor is normal or abnormal; limit the motor current to a smaller one of the first and second upper limit values, when determining that the temperature sensor is normal; limit the motor current to the second upper limit value, when determining that the temperature sensor is abnormal; and reduce at least one of the first and second upper limit values, when determining that when the estimated temperature is within the first predetermined temperature range, the temperature sensor becomes abnormal.

According to a still further aspect of the invention, a power steering apparatus comprises: an electric motor for producing an assist steering effort in a steering system; a temperature sensor for measuring a temperature of a portion subject to thermal influence of operation of the electric motor; and a control unit configured to: determine an estimated temperature of the portion in accordance with a value of a motor current flowing through the electric motor; determine a first upper limit value in accordance with the measured temperature; determine a second upper limit value in such a manner that when the estimated temperature is within a first predetermined temperature range, the second upper limit value is larger than or equal to a maximum value of the motor current, and that when the estimated temperature is within a second predetermined temperature range, the second upper limit value is smaller than the maximum value; determine whether the temperature sensor is normal or abnormal; limit the motor current to a smaller one of the first and second upper limit values, when determining that the temperature sensor is normal; limit the motor current to the second upper limit value, when determining that the temperature sensor is abnormal; and reduce at least one of the first and second upper limit values, when determining that when the estimated temperature is within the first predetermined temperature range, the temperature sensor becomes abnormal.

According to another aspect of the invention, a power steering apparatus comprises: an electric motor for producing an assist steering effort in a steering system; a temperature sensor for measuring a temperature of a first portion subject to thermal influence of operation of the electric motor; and a control unit configured to: determine an estimated temperature of a second portion in accordance with a value of a motor current flowing through the electric motor, the second portion being subject to thermal influence of operation of the electric motor; determine a first upper limit value in accordance with the measured temperature; determine a second upper limit value in accordance with the estimated temperature; determine a third upper limit value in such a manner that the third upper limit value is smaller than or equal to the second upper limit value for each value of the estimated temperature; determine whether the temperature sensor is normal or abnormal; limit the motor current to a smaller one of the first and second upper limit values, when determining that the temperature sensor is normal; and limit the motor current to the third upper limit value, when determining that the temperature sensor is abnormal.

According to another aspect of the invention, a power steering apparatus comprises: an electric motor for producing an assist steering effort in a steering system; a temperature sensor for measuring a temperature of a first portion subject to thermal influence of operation of the electric motor; a control unit for controlling the electric motor, the control unit being configured to determine an estimated temperature of a second portion in accordance with a value of a motor current flowing through the electric motor, the second portion being subject to thermal influence of operation of the electric motor; and a circuit for supplying electric power to the control unit after the control unit is switched off, the circuit being configured to: determine in accordance with at least one of the measured temperature and the estimated temperature whether or not to supply electric power to the control unit after the control unit is switched off; correct the estimated temperature by adding a predetermined value, when determining that the temperature sensor is abnormal; and determine in accordance with the corrected estimated temperature whether or not to supply electric power to the control unit after the control unit is switched off, when determining that the temperature sensor is abnormal.

BRIEF DESCRIPTION OF THE DRAWINGS

FIGS. 26A and 26B are a set of control block diagrams showing the temperature-based torque limit computing section according to the fifth embodiment under two different conditions.

DETAILED DESCRIPTION OF THE INVENTION

Figure 1:
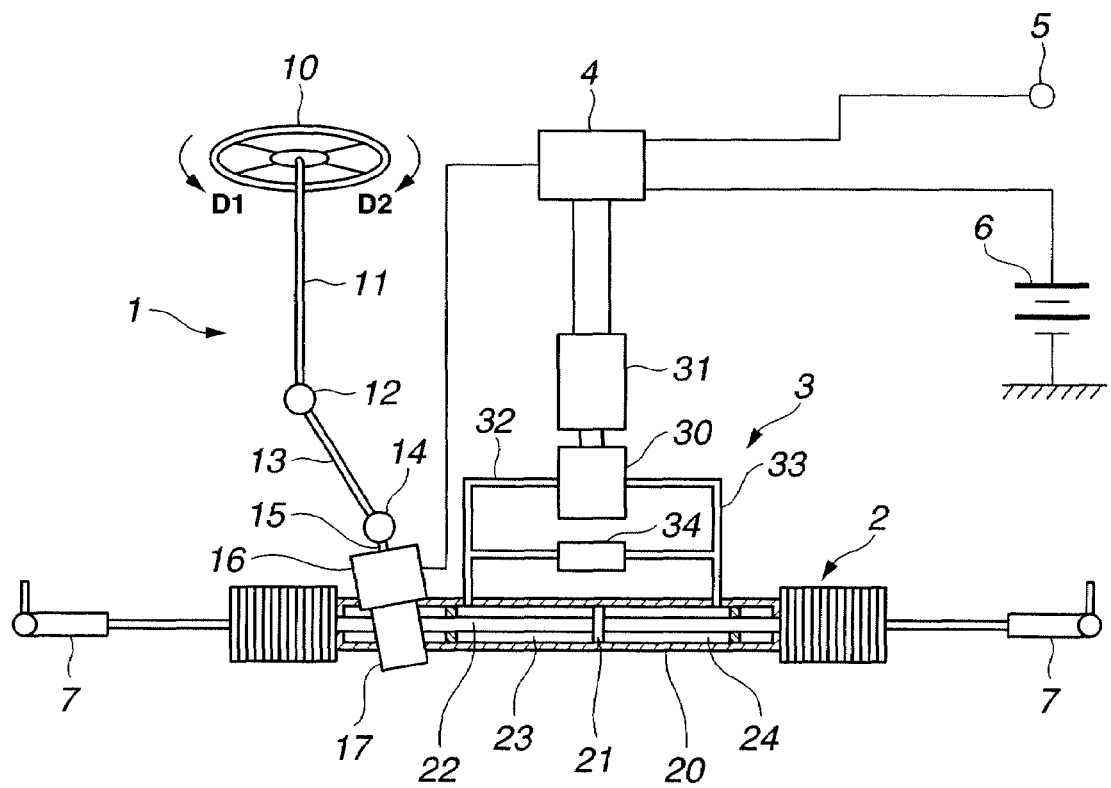
FIG. 1 is a schematic diagram showing system configuration of a power steering apparatus according to a first embodiment of the present invention.

The following describes a power steering apparatus according to a first embodiment of the present invention with reference to FIGS. 1 to 13. FIG. 1 shows system configuration of the power steering apparatus according to the first embodiment. As shown in FIG. 1, the power steering apparatus generally includes a steering input transmitting mechanism 1, an assist steering torque generating mechanism 2, a hydraulic fluid supplying mechanism 3, and a control unit 4. Steering input transmitting mechanism 1 is a mechanism constructed to receive and transmit a driver's steering torque (or driver's steering effort). Assist steering torque generating mechanism 2 is a mechanism constructed to generate an assist steering torque (or assist steering effort) in accordance with the driver's steering torque. Hydraulic fluid supplying mechanism 3 is a mechanism constructed to supply hydraulic fluids to assist steering torque generating mechanism 2.

Steering input transmitting mechanism 1 includes a steering wheel 10, a column shaft 11, a universal joint 12, an intermediate shaft 13, a universal joint 14, an input shaft 15, and a pinion 17 connected in series, where a steering torque sensor 16 is provided at input shaft 15 for measuring a steering torque applied to steering input transmitting mechanism 1.

Assist steering torque generating mechanism 2 includes a power cylinder 20, a piston 21, and a rack 22. Piston 21 is mounted within power cylinder 20 for longitudinal motion, defining first and second cylinder chambers 23 and 24 on both sides thereof. Rack 22 is fixed to piston 21 for motion therewith.

Hydraulic fluid supplying mechanism 3 includes a hydraulic pump 30, an electric motor 31, first and second fluid passages 32 and 33, and a failsafe valve 34. Electric motor 31 drives hydraulic pump 30 for supplying hydraulic fluids. The hydraulic fluids are supplied to power cylinder 20 through first and second fluid passages 32 and 33. First fluid passage 32 is connected between hydraulic pump 30 and first cylinder chamber 23 of power cylinder 20, while second fluid passage 33 is connected between hydraulic pump 30 and second cylinder chamber 24 of power cylinder 20. Failsafe valve 34 is a normally open valve, and is connected between first and second fluid passages 32 and 33. Thus, electric motor 31 produces an assist steering torque in a steering system.

Control unit 4 is connected electrically to a vehicle speed sensor 5, a battery 6, steering torque sensor 16, and electric motor 31. Vehicle speed sensor 5 measures the vehicle speed of an automotive vehicle on which the power steering apparatus is mounted. Control unit 4 receives a signal indicative of the measured vehicle speed from vehicle speed sensor 5, and a signal indicative of the measured steering torque from steering torque sensor 16, and controls the assist steering torque on the basis of those signals by controlling the electric motor 31 to adjust the amount of the hydraulic fluids supplied to assist steering torque generating mechanism 2.

Pinion 17 of steering input transmitting mechanism 1 meshes with rack 22 of assist steering torque generating mechanism 2 so that the driver's steering torque and the assist steering torque generated by assist steering torque generating mechanism 2 are transmitted to steerable vehicle wheels not shown through tie rods 7 and 7.

Under normal operating conditions, control unit 4 shuts off fluid communication between first and second fluid passages 32 and 33 by closing the failsafe valve 34. When steering wheel 10 is turned, and steering torque sensor 16 outputs a signal indicative of the measured steering torque to control unit 4, then control unit 4 produces an assist steering torque in accordance with the measured steering torque by driving the hydraulic pump 30 through electric motor 31.

When steering wheel 10 is turned left (counterclockwise from driver's viewpoint) as indicated by D1 in FIG. 1, then the hydraulic pressure is supplied to first cylinder chamber 23 of power cylinder 20 through first fluid passage 32, so as to boost the leftward steering effort. On the other hand, when steering wheel 10 is turned right as indicated by D2 in FIG. 1, then the hydraulic pressure is supplied to second cylinder chamber 24 of power cylinder 20 through second fluid passage 33, so as to boost the rightward steering effort.

Under failed operating conditions, control unit 4 allows fluid communication between first and second cylinder chambers 23 and 24 by opening the failsafe valve 34, so as to allow manual steering operation.

Figure 2:
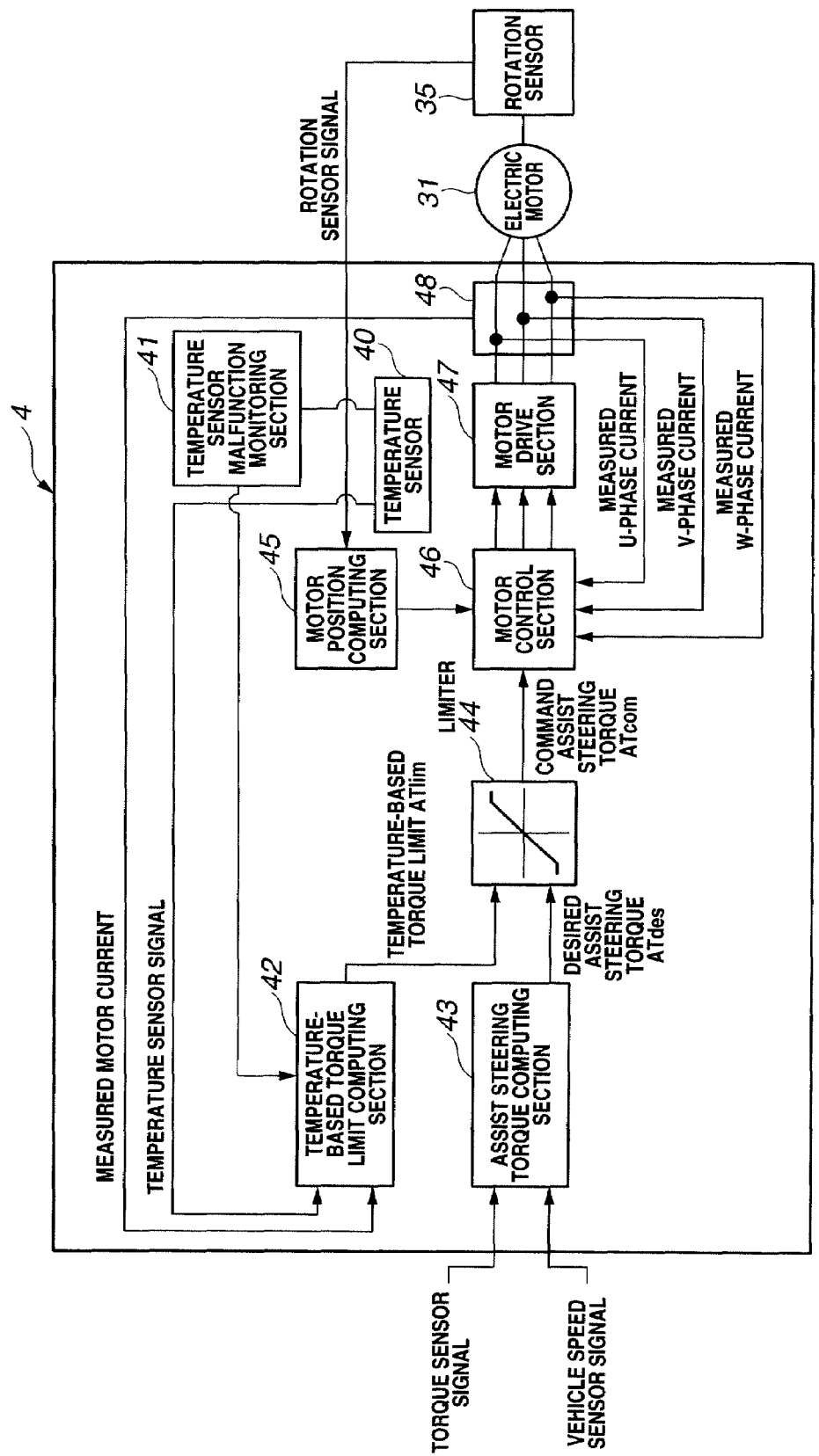
FIG. 2 is control block diagram showing a control unit of the power steering apparatus according to the first embodiment.

FIG. 2 shows a control block diagram of control unit 4. As shown in FIG. 2, control unit 4 includes a temperature sensor 40, a section 41 (referred to as temperature sensor malfunction monitoring section), a section 42 (referred to as temperature-based torque limit computing section), a section 43 (referred to as assist steering torque computing section), a limiter 44, a section 45 (referred to as motor position computing section), a section 46 (referred to as motor control section), a section 47 (referred to as motor drive section), and a current sensor 48. Temperature sensor 40 measures the temperature of a portion of control unit 4 as measured temperature Tmsr (environmental temperature), and outputs a signal indicative of measured temperature Tmsr to temperature-based torque limit computing section 42. The portion of control unit 4 is subject to thermal influence of operation of electric motor 31. Naturally, electric motor 31 is also subject to thermal influence of operation of electric motor 31. For example, temperature sensor 40 may measure the temperature of a switching circuit for driving electric motor 31.

Temperature sensor malfunction monitoring section 41 monitors and detects malfunctions of temperature sensor 40. Under abnormal conditions, temperature sensor 40 indicates extremely high or low temperatures existing out of a range of temperature within which temperature sensor 40 normally indicates temperatures. Accordingly, when temperature sensor 40 outputs a signal indicative of a temperature value existing out of the normal temperature range, then temperature sensor malfunction monitoring section 41 outputs a signal indicative of malfunction of temperature sensor 40 to temperature-based torque limit computing section 42.

Temperature-based torque limit computing section 42 receives a signal indicative of the temperature of control unit 4 from temperature sensor 40, a signal indicative of a motor current supplied to electric motor 31 from current sensor 48, and a signal indicative of malfunction of temperature sensor 40 from temperature sensor malfunction monitoring section 41.

Temperature-based torque limit computing section 42 computes an estimated temperature of electric motor 31 as estimated motor temperature Tmest on the basis of a measured value of the motor current flowing through electric motor 31, computes, on the basis of measured temperature Tmsr of control unit 4 and estimated motor temperature Tmest, a value (referred to as temperature-based torque limit ATlim) to which the assist steering torque is limited, so as to bring control unit 4 and electric motor 31 into conditions of normal temperature range, and outputs a signal indicative of temperature-based torque limit ATlim to limiter 44. Temperature-based torque limit computing section 42 is described in detail below with reference to FIG. 3.

Assist steering torque computing section 43 receives a signal indicative of the steering torque from steering torque sensor 16, and a signal indicative of vehicle speed from vehicle speed sensor 5, computes a desired assist steering torque ATdes, and outputs a signal indicative of desired assist steering torque ATdes to limiter 44.

Limiter 44 receives a signal indicative of temperature-based torque limit ATlim from temperature-based torque limit computing section 42, and a signal indicative of desired assist steering torque ATdes from assist steering torque computing section 43, and outputs a signal indicative of a command assist steering torque ATcom to motor control section 46 in accordance with those inputted signals.

Motor position computing section 45 receives a signal indicative of the angular position of electric motor 31 from rotation sensor 35, computes the angular position of electric motor 31, and outputs a signal indicative of the angular position to motor control section 46.

Motor control section 46 receives a signal indicative of the angular position of electric motor 31 from motor position computing section 45, and a signal indicative of measured U-phase, V-phase and W-phase current values from current sensor 48. Motor control section 46 converts the three-phase current values of U-phase, V-phase and W-phase into two-phase current values, generates motor drive signals (PWM signals) by feedback control such as PI control, and outputs the motor drive signals to motor drive section 47.

Motor drive section 47 receives the motor drive signals from motor control section 46. Motor drive section 47 includes power elements such as field-effect transistors (FETs). Motor drive section 47 performs switching operation for the power elements in accordance with the motor drive signals, and thereby supplies a motor current to electric motor 31.

Figure 3:
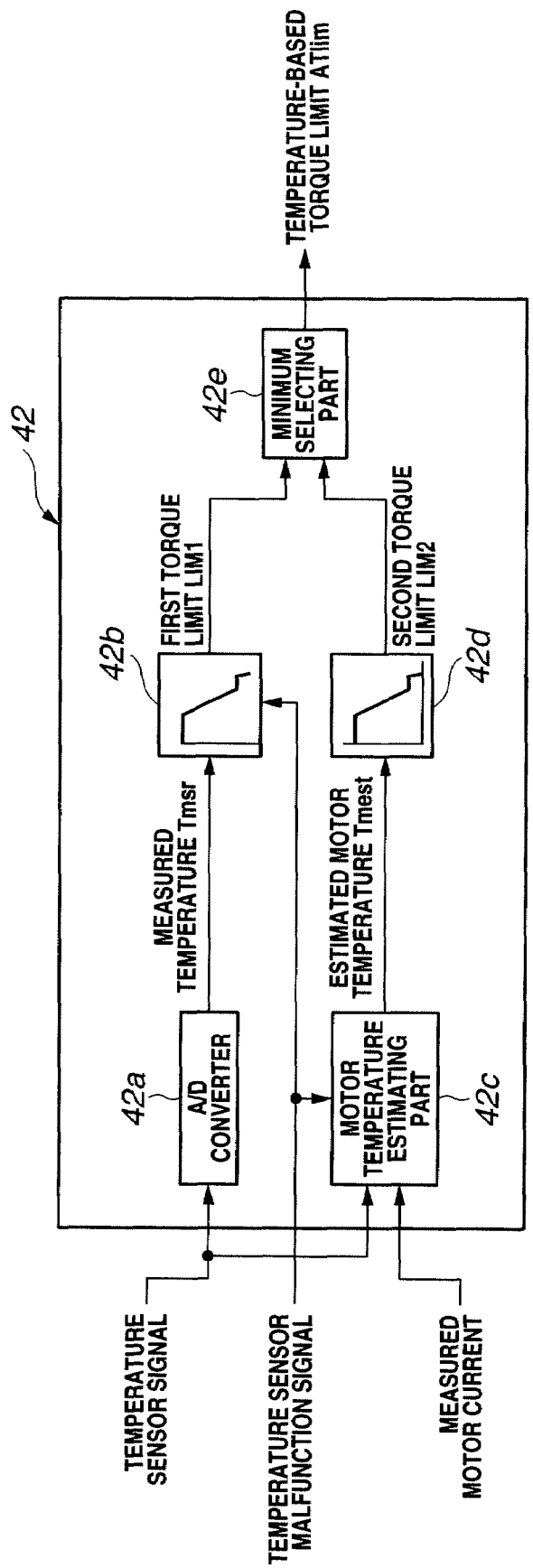
FIG. 3 is a control block diagram showing a temperature-based torque limit computing section of the control unit according to the first embodiment.

The following describes temperature-based torque limit computing section 42 with reference to FIG. 3. Temperature-based torque limit computing section 42 includes an A/D (Analog-to-Digital) converter 42a, a first torque limit computing part 42b, a motor temperature estimating part 42c, a second torque limit computing part 42d, and a minimum selecting part 42e. A/D converter 42a receives an analog signal indicative of the measured temperature from temperature sensor 40, converts the analog signal into a digital signal, and outputs the digital signal to first torque limit computing part 42b.

First torque limit computing part 42b receives a signal indicative of the measured temperature, and a signal indicative of malfunction of temperature sensor 40 from temperature sensor malfunction monitoring section 41, and computes a first upper limit value (referred to as first torque limit LIM1) which is computed based on the temperature of control unit 4 for preventing overheating. First torque limit computing part 42b outputs a signal indicative of first torque limit LIM1 to minimum selecting part 42e.

Figure 4:
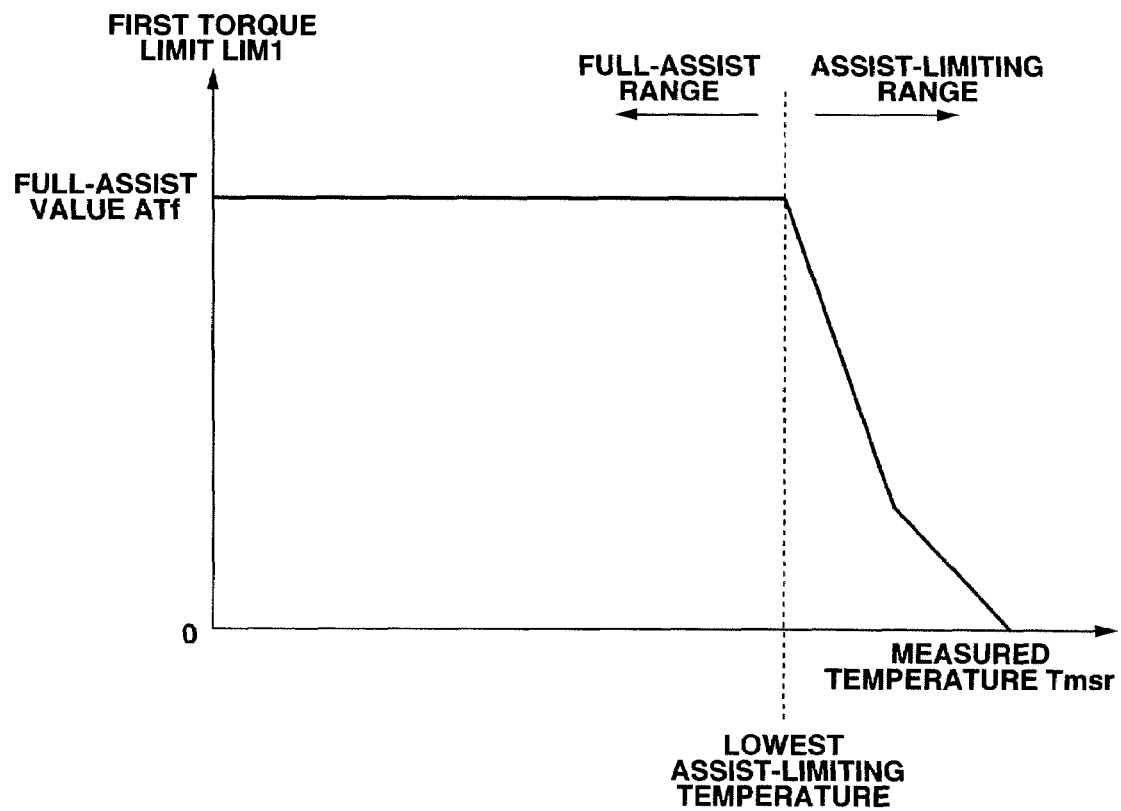
FIG. 4 is a graph showing a function of computing a first torque limit according to the first embodiment.

First torque limit computing part 42b stores data indicative of a function of computing first torque limit LIM1 as shown in FIG. 4. As shown in FIG. 4, according to the function of computing first torque limit LIM1, when measured temperature Tmsr (the temperature of control unit 4) is below a predetermined threshold temperature value (referred to as lowest assist-limiting temperature), then first torque limit LIM1 is set to a maximum value (referred to as full-assist value ATf). The temperature range below the lowest assist-limiting temperature is referred to as full-assist range. On the other hand, when measured temperature Tmsr is above the lowest assist-limiting temperature, then first torque limit LIM1 is set to decrease with increase in measured temperature Tmsr. The temperature range above the lowest assist-limiting temperature is referred to as assist-limiting range. Thus, a second upper limit value (LIM2) is determined in such a manner that when the estimated temperature (Tmest) is below a threshold temperature value, the second upper limit value (LIM2) is larger than or equal to a maximum value of the motor current, and that when the estimated temperature (Tmest) is above the threshold temperature value, the second upper limit value (LIM2) is smaller than the maximum value.

Motor temperature estimating part 42c receives a signal indicative of the motor current supplied to electric motor 31 from current sensor 48, a signal indicative of malfunction of temperature sensor 40 from temperature sensor malfunction monitoring section 41, and a signal indicative of measured temperature Tmsr of control unit 4 from temperature sensor 40, estimates the temperature of electric motor 31 as estimated motor temperature Tmest, and outputs a signal indicative of estimated motor temperature Tmest to second torque limit computing part 42d.

Second torque limit computing part 42d receives a signal indicative of estimated motor temperature Tmest from motor temperature estimating part 42c, computes a second upper limit value (referred to as second torque limit LIM2) which is computed based on the temperature of electric motor 31 for preventing overheating, and outputs a signal indicative of second torque limit LIM2 to minimum selecting part 42e.

Figure 5:
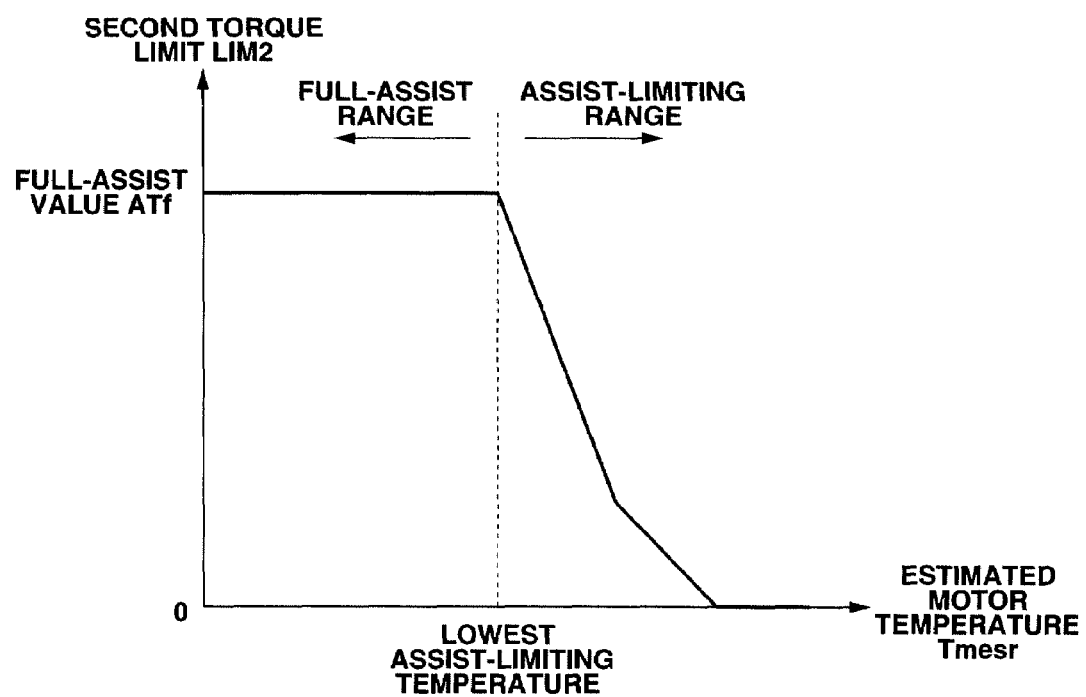
FIG. 5 is a graph showing a function of computing a second torque limit according to the first embodiment.

Second torque limit computing part 42d stores data indicative of a function of computing second torque limit LIM2 as shown in FIG. 5. As shown in FIG. 5, according to the function of computing second torque limit LIM2, when estimated motor temperature Tmest is lower than a temperature value (referred to as lowest assist-limiting temperature) (estimated motor temperature Tmest is within the full-assist range), then second torque limit LIM2 is set to full-assist value ATf. On the other hand, when estimated motor temperature Tmest is above the lowest assist-limiting temperature (estimated motor temperature Tmest is within the assist-limiting range), then second torque limit LIM2 is set to decrease with increase in estimated motor temperature Tmest.

Minimum selecting part 42e receives a signal indicative of first torque limit LIM1 from first torque limit computing part 42b, and a signal indicative of second torque limit LIM2 from second torque limit computing part 42d, compares first torque limit LIM1 with second torque limit LIM2, and outputs the smaller one of them as temperature-based torque limit ATlim.

According to the first embodiment, the power steering apparatus monitors the temperature of control unit 4 and electric motor 31, in order to prevent control unit 4 and electric motor 31 from overheating. The temperature of control unit 4 is directly monitored by temperature sensor 40. On the other hand, the temperature of electric motor 31 is monitored as follows. Motor temperature estimating part 42c estimates or computes an amount of generated heat on the basis of a value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

As described above, according to the related art, when a temperature sensor is judged as failed, then a motor current is limited to a motor current value with which both of a control unit and an electric motor can continuously operate without being overheated. However, it is possible that when the temperature sensor is failed, even if the temperature of electric motor 31 is sufficiently low, the motor current is suppressed so that the driver's steering torque is required to be large. In contrast, according to the first embodiment, even when temperature sensor 40 is failed, then temperature-based torque limit ATlim is provided on the basis of the estimated temperature of electric motor 31.

Figure 6:
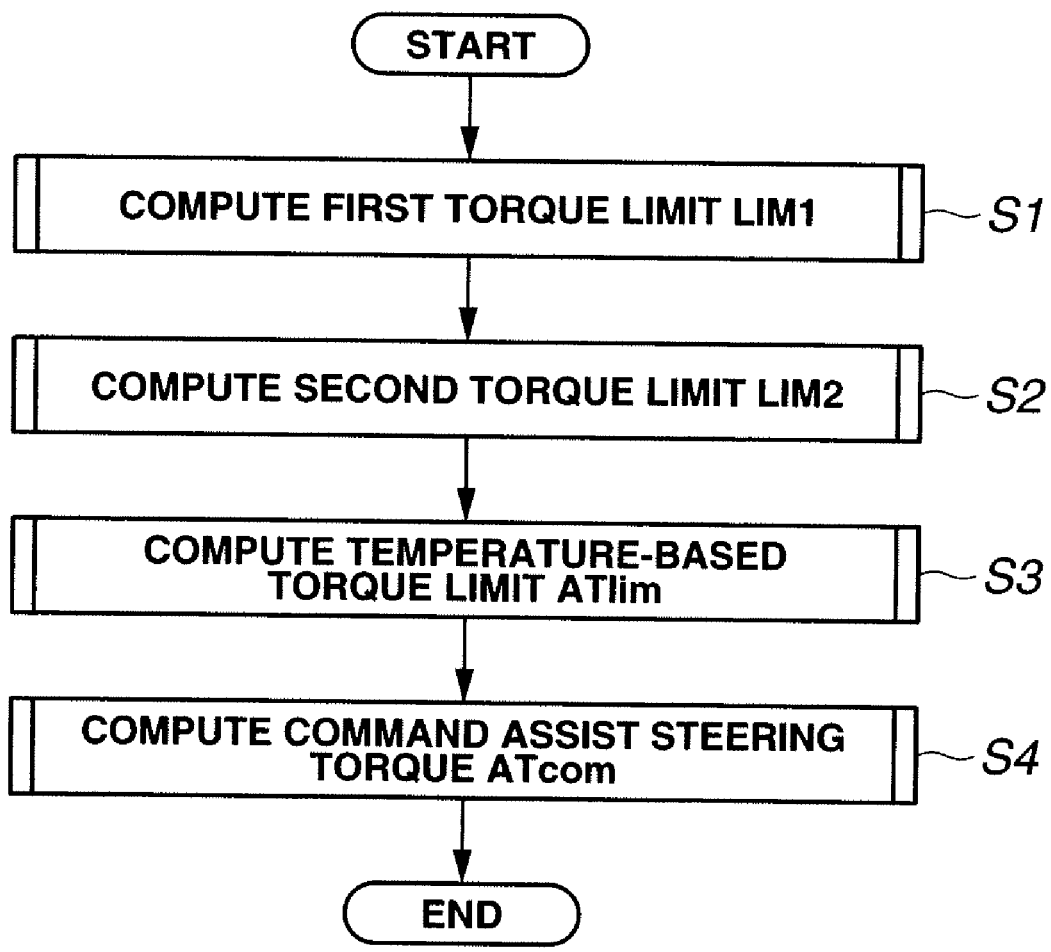
FIG. 6 is a flow chart showing a main process to be performed by the control unit according to the first embodiment.

The following describes a process performed by control unit 4 with reference to FIG. 6. At Step S1, control unit 4 computes first torque limit LIM1 on the basis of the temperature of control unit 4, and then proceeds to Step S2. The operation of computing first torque limit LIM1 is described in detail below with reference to FIG. 7.

At Step S2, control unit 4 computes second torque limit LIM2 on the basis of the temperature of electric motor 31, and then proceeds to Step S3. The operation of computing second torque limit LIM2 is described in detail below with reference to FIG. 8.

At Step S3, control unit 4 computes temperature-based torque limit ATlim on the basis of first torque limit LIM1 and second torque limit LIM2, and then proceeds to Step S4. The operation of computing temperature-based torque limit ATlim is described in detail below with reference to FIG. 9.

At Step S4, control unit 4 computes command assist steering torque ATcom on the basis of desired assist steering torque ATdes and temperature-based torque limit ATlim, and then exits from this process. The operation of computing command assist steering torque ATcom is described in detail below with reference to FIG. 10.

Figure 7:
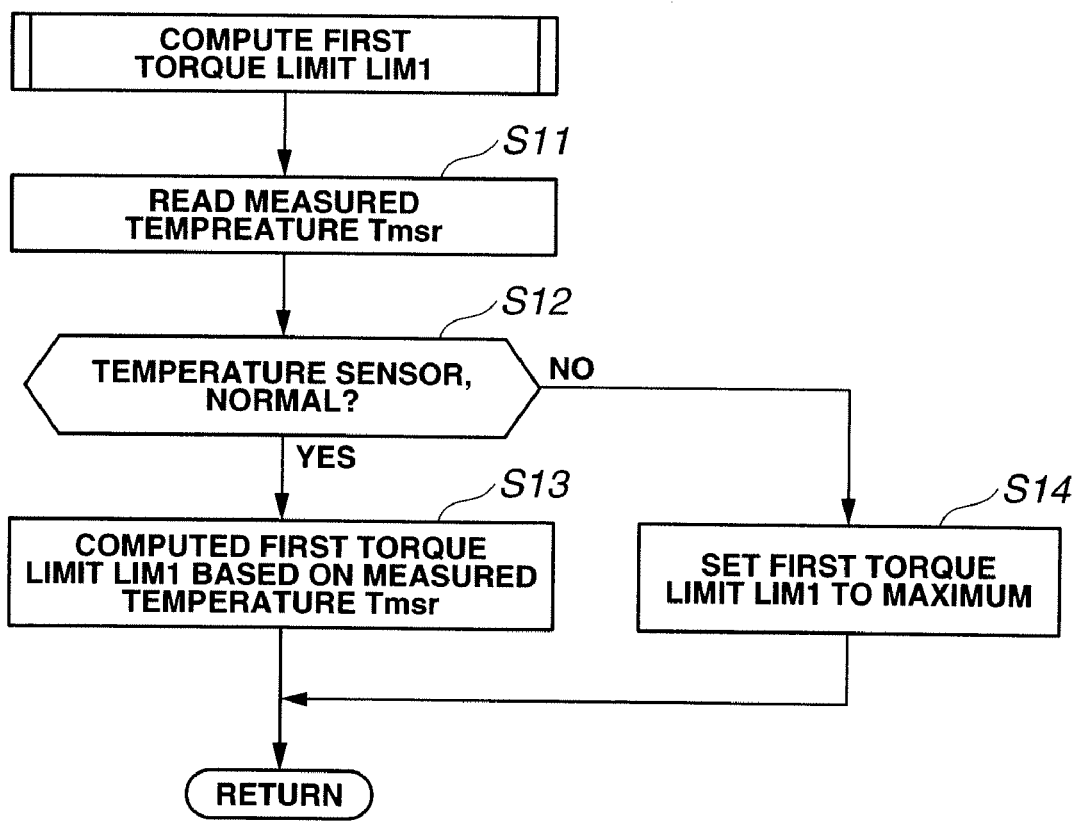
FIG. 7 is a flow chart showing a detailed process of computing the first torque limit according to the first embodiment.

The following describes a process of computing first torque limit LIM1 with reference to FIG. 7. At Step S11, control unit 4 reads and obtains measured temperature Tmsr from temperature sensor 40, and then proceeds to Step S12.

At Step S12, control unit 4 judges whether or not temperature sensor 40 is normal, on the basis of presence or absence of the signal indicative of malfunction of temperature sensor 40 outputted from temperature sensor malfunction monitoring section 41. When judging temperature sensor 40 as normal, then control unit 4 proceeds to Step S13. When judging temperature sensor 40 as abnormal or failed, control unit 4 proceeds to Step S14.

At Step S13, control unit 4 computes first torque limit LIM1 on the basis of measured temperature Tmsr using the function of computing first torque limit LIM1 shown in FIG. 4. Specifically, when measured temperature Tmsr (the temperature of control unit 4) is lower than the lowest assist-limiting temperature, then control unit 4 sets first torque limit LIM1 to full-assist value ATf. On the other hand, when measured temperature Tmsr is above the lowest assist-limiting temperature, then control unit 4 sets first torque limit LIM1 to decrease with increase in measured temperature Tmsr.

At Step S14, control unit 4 sets first torque limit LIM1 to the maximum, or to full-assist value ATf, and then exits from this process. As described in detail below, temperature-based torque limit ATlim is set to the smaller one of first torque limit LIM1 and second torque limit LIM2. When temperature sensor 40 is abnormal, temperature-based torque limit ATlim is set to second torque limit LIM2, because first torque limit LIM1 is set to the maximum at Step S14.

Figure 8:
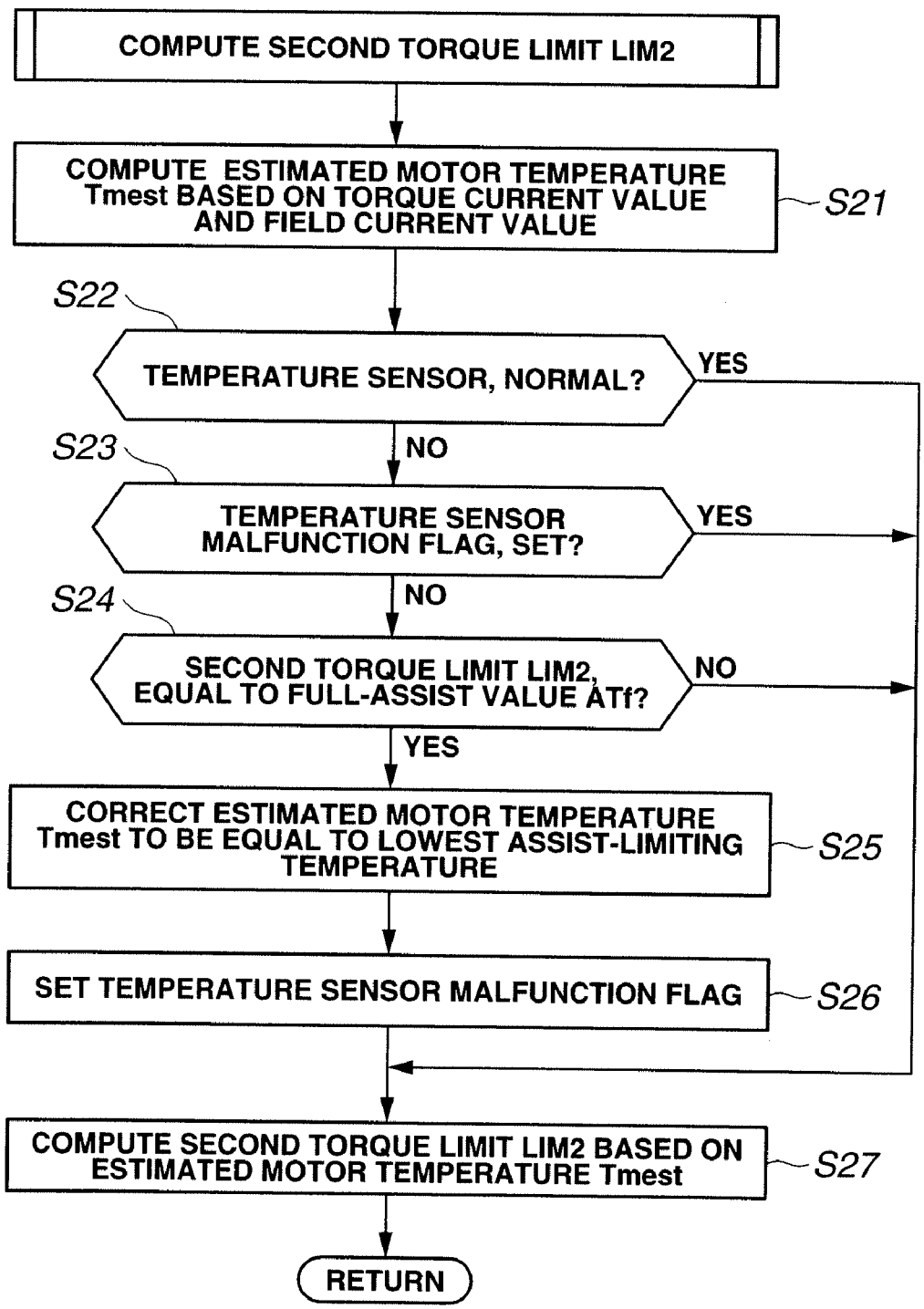
FIG. 8 is a flow chart showing a detailed process of computing the second torque limit according to the first embodiment.

The following describes a process of computing second torque limit LIM2 with reference to FIG. 8. At Step S21, control unit 4 computes estimated motor temperature Tmest of electric motor 31 on the basis of the torque current and field current supplied to electric motor 31, and then proceeds to Step S22. Control unit 4 estimates or computes an amount of generated heat on the basis of a value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S22, control unit 4 judges whether or not temperature sensor 40 is normal, on the basis of presence or absence of the signal indicative of malfunction of temperature sensor 40 outputted from temperature sensor malfunction monitoring section 41. When judging temperature sensor 40 as normal, then control unit 4 proceeds to Step S27. When judging temperature sensor 40 as abnormal, control unit 4 proceeds to Step S23.

At Step S23, control unit 4 judges whether or not a flag (referred to as temperature sensor malfunction flag) is set. When judging the temperature sensor malfunction flag as set, control unit 4 proceeds to Step S27. When judging the temperature sensor malfunction flag as not set, control unit 4 proceeds to Step S24. The temperature sensor malfunction flag is a data set flag for condition that temperature sensor 40 is abnormal.

At Step S24, control unit 4 judges whether or not second torque limit LIM2 is equal to full-assist value ATf. When judging second torque limit LIM2 as equal to full-assist value ATf, control unit 4 proceeds to Step S25. When judging second torque limit LIM2 as not equal to full-assist value ATf, control unit 4 proceeds to Step S27.

At Step S25, control unit 4 corrects estimated motor temperature Tmest to be equal to the lowest assist-limiting temperature, and then proceeds to Step S26. Estimated motor temperature Tmest is updated at Step S21 by adding, to the preceding value of estimated motor temperature Tmest, the amount of generated heat of electric motor 31 computed on the basis of the torque current and field current. If estimated motor temperature Tmest is increased in the following control cycle, the assist steering torque is limited to second torque limit LIM2 which is below full-assist value ATf, because estimated motor temperature Tmest is corrected to be equal to the lowest assist-limiting temperature at Step S25 in the current control cycle. Thus, estimated motor temperature Tmest is corrected by adding a predetermined value, when it is determined that when estimated motor temperature Tmest is below the lowest assist-limiting temperature, temperature sensor 40 becomes abnormal.

At Step S26, control unit 4 sets the temperature sensor malfunction flag, and then proceeds to Step S27.

At Step S27, control unit 4 computes second torque limit LIM2 on the basis of estimated motor temperature Tmest computed at Step S21 and corrected at Step S25, and then exits from this process. Second torque limit LIM2 is computed using the function of computing second torque limit LIM2 shown in FIG. 5. Specifically, when estimated motor temperature Tmest is below the lowest assist-limiting temperature, control unit 4 sets second torque limit LIM2 to full-assist value ATf. On the other hand, when estimated motor temperature Tmest is above the lowest assist-limiting temperature, control unit 4 sets second torque limit LIM2 to decrease with increase in estimated motor temperature Tmest.

Figure 9:
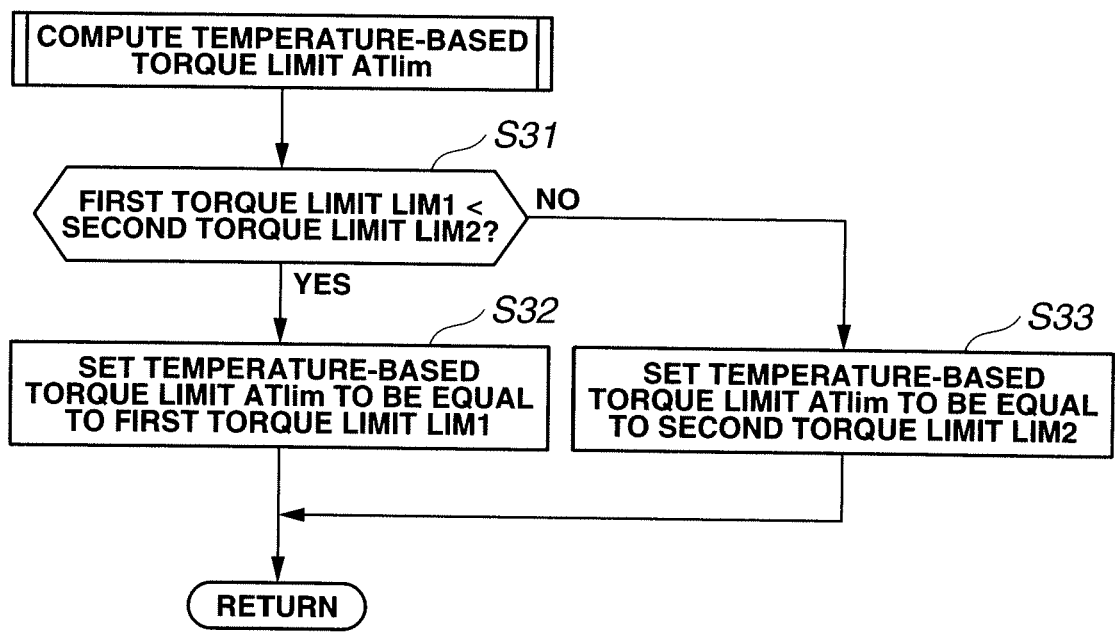
FIG. 9 is a flow chart showing a detailed process of computing a temperature-based torque limit according to the first embodiment.

The following describes a process of computing temperature-based torque limit ATlim with reference to FIG. 9. At Step S31, control unit 4 compares first torque limit LIM1 with second torque limit LIM2, and then judges whether or not first torque limit LIM1 is smaller than second torque limit LIM2. When judging first torque limit LIM1 as smaller than second torque limit LIM2, control unit 4 proceeds to Step S32. When judging first torque limit LIM1 as not smaller than second torque limit LIM2, control unit 4 proceeds to Step S33.

At Step S32, control unit 4 sets temperature-based torque limit ATlim to be equal to first torque limit LIM1, and then exits from this process.

At Step S33, control unit 4 sets temperature-based torque limit ATlim to be equal to second torque limit LIM2, and then exits from this process.

Figure 10:
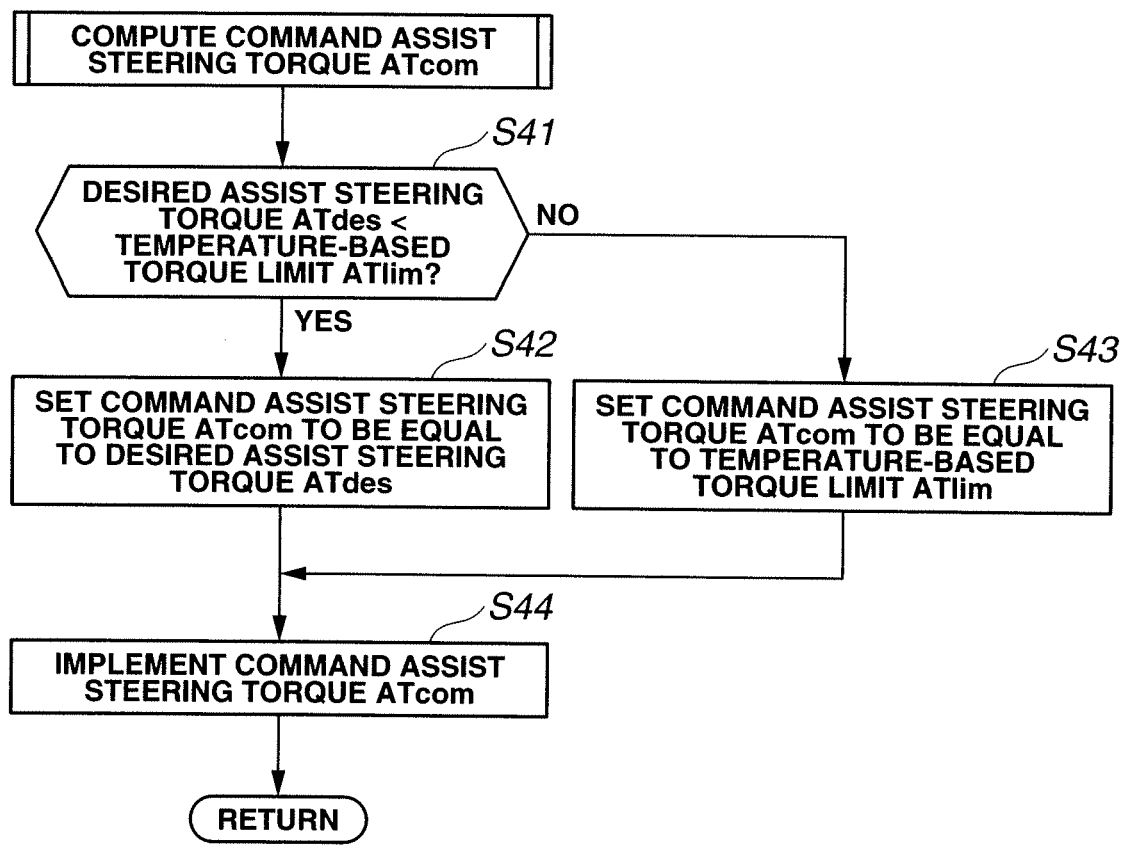
FIG. 10 is a flow chart showing a detailed process of computing a command assist steering torque according to the first embodiment.

The following describes a process of computing command assist steering torque ATcom with reference to FIG. 10. At Step S41, control unit 4 judges whether or not desired assist steering torque ATdes is smaller than temperature-based torque limit ATlim. When judging desired assist steering torque ATdes as smaller than temperature-based torque limit ATlim, control unit 4 proceeds to Step S42. When judging desired assist steering torque ATdes as not smaller than temperature-based torque limit ATlim, control unit 4 proceeds to Step S43.

At Step S42, control unit 4 sets command assist steering torque ATcom to be equal to desired assist steering torque ATdes, and then proceeds to Step S44.

At Step S43, control unit 4 sets command assist steering torque ATcom to be equal to temperature-based torque limit ATlim, and then proceeds to Step S44.

At Step S44, control unit 4 implements command assist steering torque ATcom which is set at Step S42 or S43, and then exits from this process.

Figure 11:
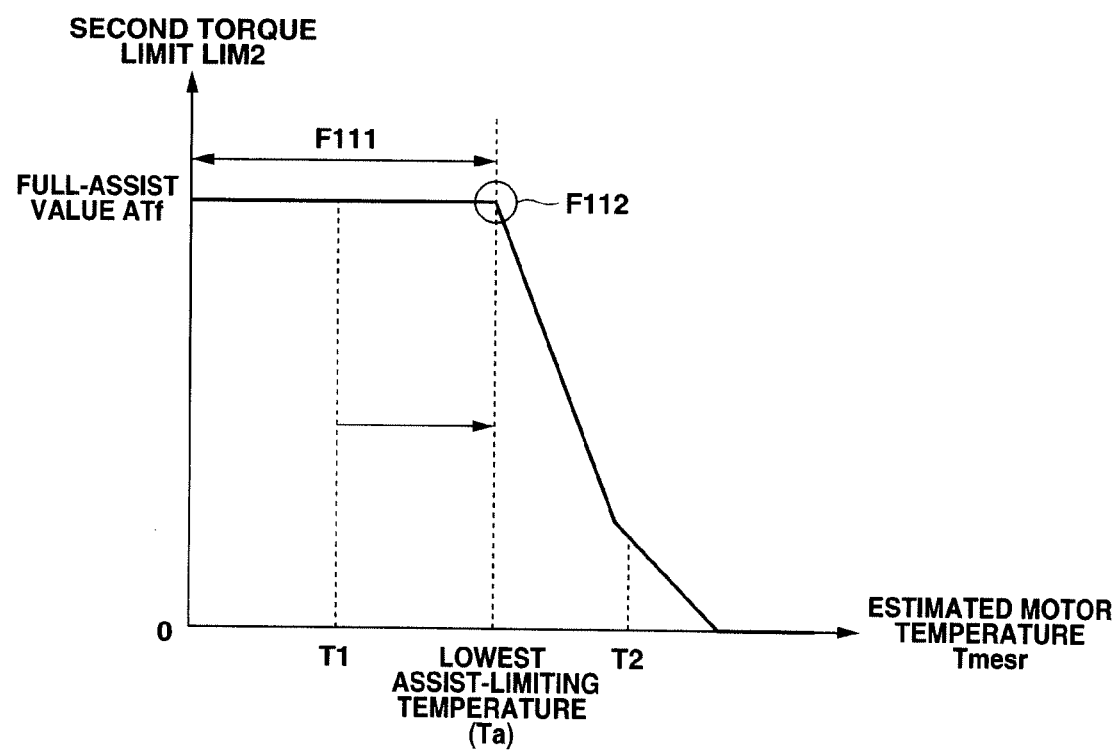
FIG. 11 is graph showing a function of computing the second torque limit according to the first embodiment, when a temperature sensor is abnormal.

FIG. 11 illustrates the foregoing method of setting second torque limit LIM2 for the case where temperature sensor 40 is abnormal.

According to the first embodiment, even when temperature sensor 40 provided at control unit 4 is abnormal, the power steering apparatus sets temperature-based torque limit ATlim on the basis of estimated motor temperature Tmest, and generates an assist steering torque within temperature-based torque limit ATlim. Motor temperature estimating part 42c of control unit 4 can estimate accurately the amount of increase in temperature based on heat generation by electric motor 31, although using no environmental temperatures and no measured temperature of electric motor 31.

For example, it is supposed that when temperature sensor 40 is abnormal, estimated motor temperature Tmest is equal to a temperature value T1 which is below the lowest assist-limiting temperature Ta, or within the full-assist range, as indicated by F111 in FIG. 11. In such a case, estimated motor temperature Tmest is corrected or increased to be equal to lowest assist-limiting temperature Ta in the direction to increase a margin for safety, as indicated by F112 in FIG. 11. After that, the current supplied to electric motor 31 is controlled on the basis of the modified estimated motor temperature Tmest which is updated by motor temperature estimating part 42c.

On the other hand, it is supposed that when temperature sensor 40 is abnormal, estimated motor temperature Tmest is equal to a temperature value T2 which is above the lowest assist-limiting temperature Ta, or within the assist-limiting range. In such a case, estimated motor temperature Tmest is maintained to be equal to temperature value T2.

Figure 12A:
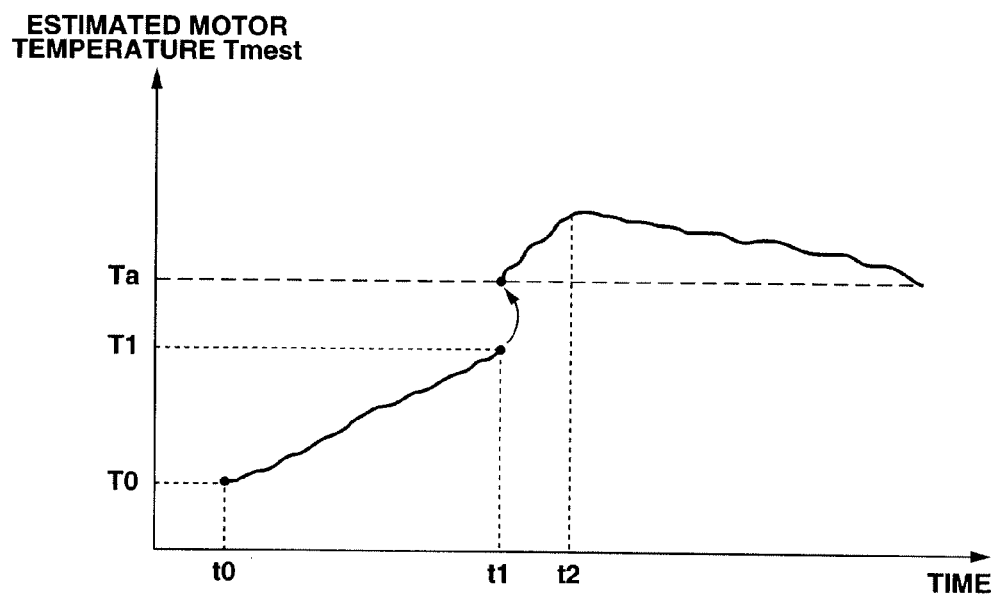
FIGS. 12A and 12B are a set of time charts showing an example of how the power steering apparatus according to the first embodiment operates.
Figure 12B:
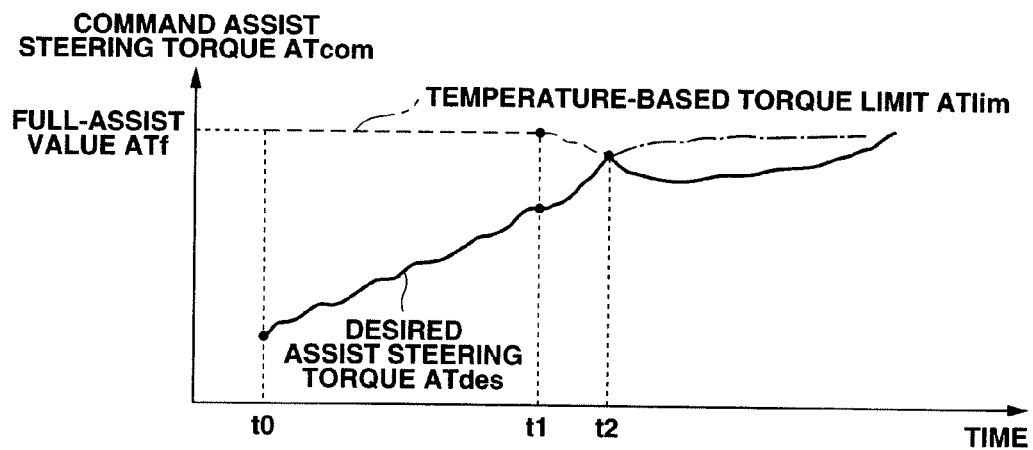

The following describes an example of how the power steering apparatus according to the first embodiment operates, in which temperature sensor 40 becomes abnormal under condition of the full-assist range, with reference to FIGS. 12A and 12B. FIG. 12A shows how estimated motor temperature Tmest changes with time, while FIG. 12B shows how command assist steering torque ATcom changes with time.

As shown in FIG. 12B, until time t1 after time t0, command assist steering torque ATcom is set to be equal to desired assist steering torque ATdes, because desired assist steering torque ATdes is smaller than temperature-based torque limit ATlim. Accordingly, as shown in FIG. 12A, until time t1 after time t0, estimated motor temperature Tmest increases with increase in desired assist steering torque ATdes.

Temperature sensor 40 is assumed to become abnormal at time t1. At time t1, estimated motor temperature Tmest is equal to temperature value T1. Estimated motor temperature Tmest is corrected to be equal to lowest assist-limiting temperature Ta, because temperature value T1 is within the full-assist range.

After time t1, estimated motor temperature Tmest becomes above lowest assist-limiting temperature Ta, so that temperature-based torque limit ATlim is set to decrease with increase in estimated motor temperature Tmest. Until time t2 after time t0, command assist steering torque ATcom is still set to be equal to desired assist steering torque ATdes, because desired assist steering torque ATdes is still smaller than temperature-based torque limit ATlim. Accordingly, as shown in FIG. 12A, until time t2, estimated motor temperature Tmest continues to increase with increase in desired assist steering torque ATdes.

After time t2, command assist steering torque ATcom is set to be equal to temperature-based torque limit ATlim, because desired assist steering torque ATdes exceeds temperature-based torque limit ATlim at time t2.

Thus, when temperature sensor 40 becomes abnormal, and motor temperature estimating part 42c estimates an increase in estimated motor temperature Tmest, second torque limit LIM2 is set so as to limit the assist steering torque. Therefore, it is possible to produce a sufficient assist steering torque for steering operation, while preventing control unit 4 and electric motor 31 from overheating.

Figure 13A:
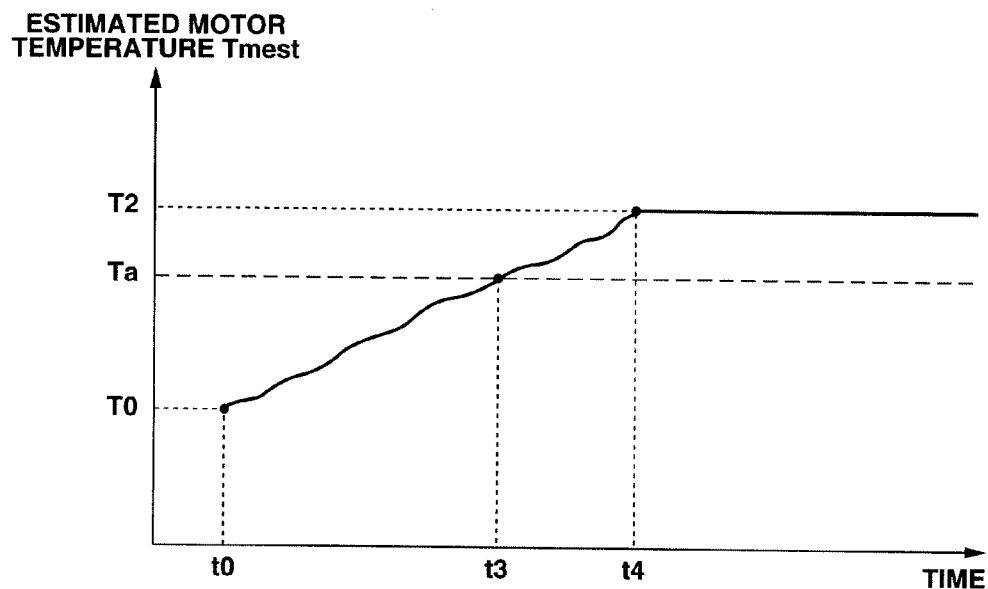
FIGS. 13A and 13B are a set of time charts showing another example of how the power steering apparatus according to the first embodiment operates.
Figure 13B:
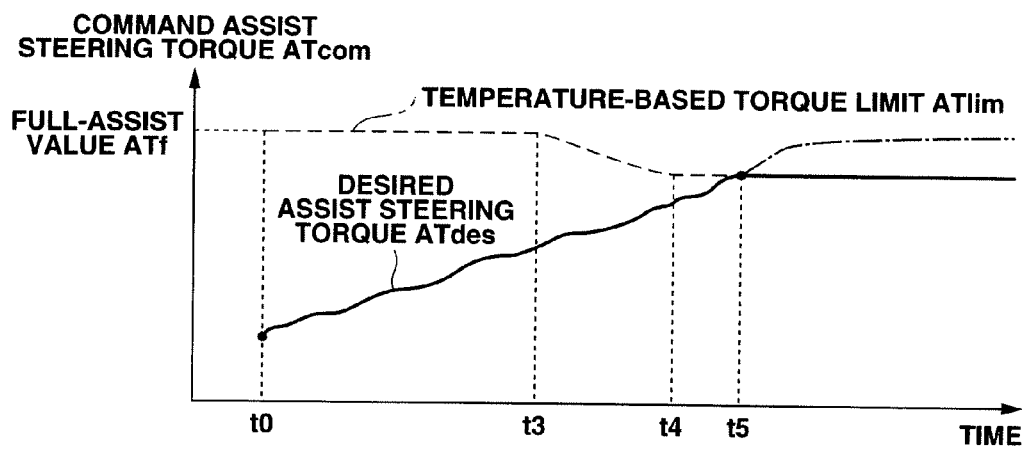

The following describes an example in which temperature sensor 40 becomes abnormal under condition of the assist-limiting range with reference to FIGS. 13A and 13B. FIG. 13A shows how estimated motor temperature Tmest changes with time, while FIG. 13B shows how command assist steering torque ATcom and temperature-based torque limit ATlim change with time.

As shown in FIG. 13B, until time t3 after time t0, command assist steering torque ATcom is set to be equal to desired assist steering torque ATdes, because desired assist steering torque ATdes is smaller than temperature-based torque limit ATlim. Accordingly, as shown in FIG. 13A, until time t3 after time t0, estimated motor temperature Tmest increases with increase in desired assist steering torque ATdes.

As shown in FIG. 13A, at time t3, estimated motor temperature Tmest exceeds lowest assist-limiting temperature Ta, so that temperature-based torque limit ATlim is set to decrease with increase in estimated motor temperature Tmest.

Temperature sensor 40 is assumed to become abnormal at time t4. At time t4, estimated motor temperature Tmest is equal to temperature value T2. After time t4, estimated motor temperature Tmest is held constant, i.e. maintained to be equal to temperature value T2, because temperature value T2 is within the assist-limiting range.

Until time t5 after time t3, command assist steering torque ATcom is still set to be equal to desired assist steering torque ATdes, because desired assist steering torque ATdes is still smaller than temperature-based torque limit ATlim. Accordingly, as shown in FIG. 13A, estimated motor temperature Tmest continues to increase with increase in desired assist steering torque ATdes until time t4.

After time t5, command assist steering torque ATcom is set to be equal to temperature-based torque limit ATlim, because desired assist steering torque ATdes exceeds temperature-based torque limit ATlim at time t5.

Accordingly, second torque limit LIM2 is maintained below full-assist value ATf. Thus, it is possible to produce a sufficient assist steering torque for steering operation, while preventing control unit 4 and electric motor 31 from overheating.

As described above, when temperature sensor 40 is abnormal, first torque limit LIM1 is set to the maximum or full-assist value ATf. Temperature-based torque limit LIM is constantly set to be equal to second torque limit LIM2, because temperature-based torque limit ATlim is set to be equal to the smaller one of first torque limit LIM1 and second torque limit LIM2.

Thus, even after temperature sensor 40 becomes abnormal, it is possible to provide temperature-based torque limit ATlim on the basis of estimated motor temperature Tmest. Therefore, it is possible to produce a sufficient assist steering torque for steering operation, while preventing control unit 4 and electric motor 31 from overheating.

As described above, according to the first embodiment, motor temperature estimating part 42c computes the estimated temperature of electric motor 31 by estimating the amount of generated heat of electric motor 31 on the basis of the current supplied to electric motor 31, and computes the estimated temperature of electric motor 31 on the basis of the amount of generated heat. Alternatively, motor temperature estimating part 42c may estimate the amount of generated heat of control unit 4 on the basis of the current supplied to electric motor 31, and compute an estimated temperature of control unit 4.

Moreover, temperature sensor 40 may be configured to measure the temperature of electric motor 31, instead of the temperature of control unit 4. Also, in this alternative configuration, it is sufficient to compute first torque limit LIM1 on the basis of the measured temperature of temperature sensor 40. This alternative configuration is effective similarly as in the first embodiment.

In general, it is difficult to attach a temperature sensor to an electric motor. The temperature of control unit 4 changes in correlation with that of electric motor 31, because control unit 4 drives electric motor 31. Accordingly, according to the first embodiment, temperature sensor 40 is provided in control unit 4 for detecting a temperature correlated with the temperature of electric motor 31.

Figure 14:
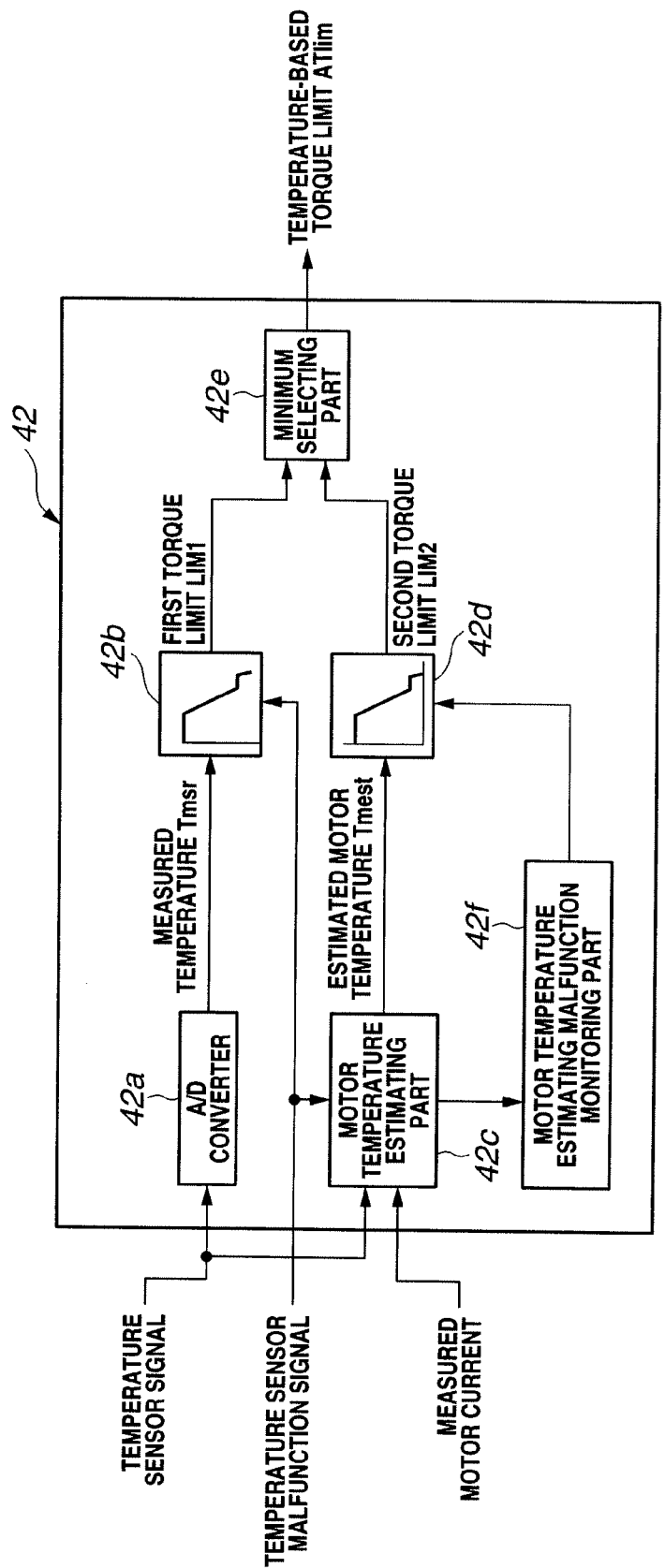
FIG. 14 is a control block diagram showing a temperature-based torque limit computing section of a control unit of a power steering apparatus according to a second embodiment of the present invention.
Figure 15:
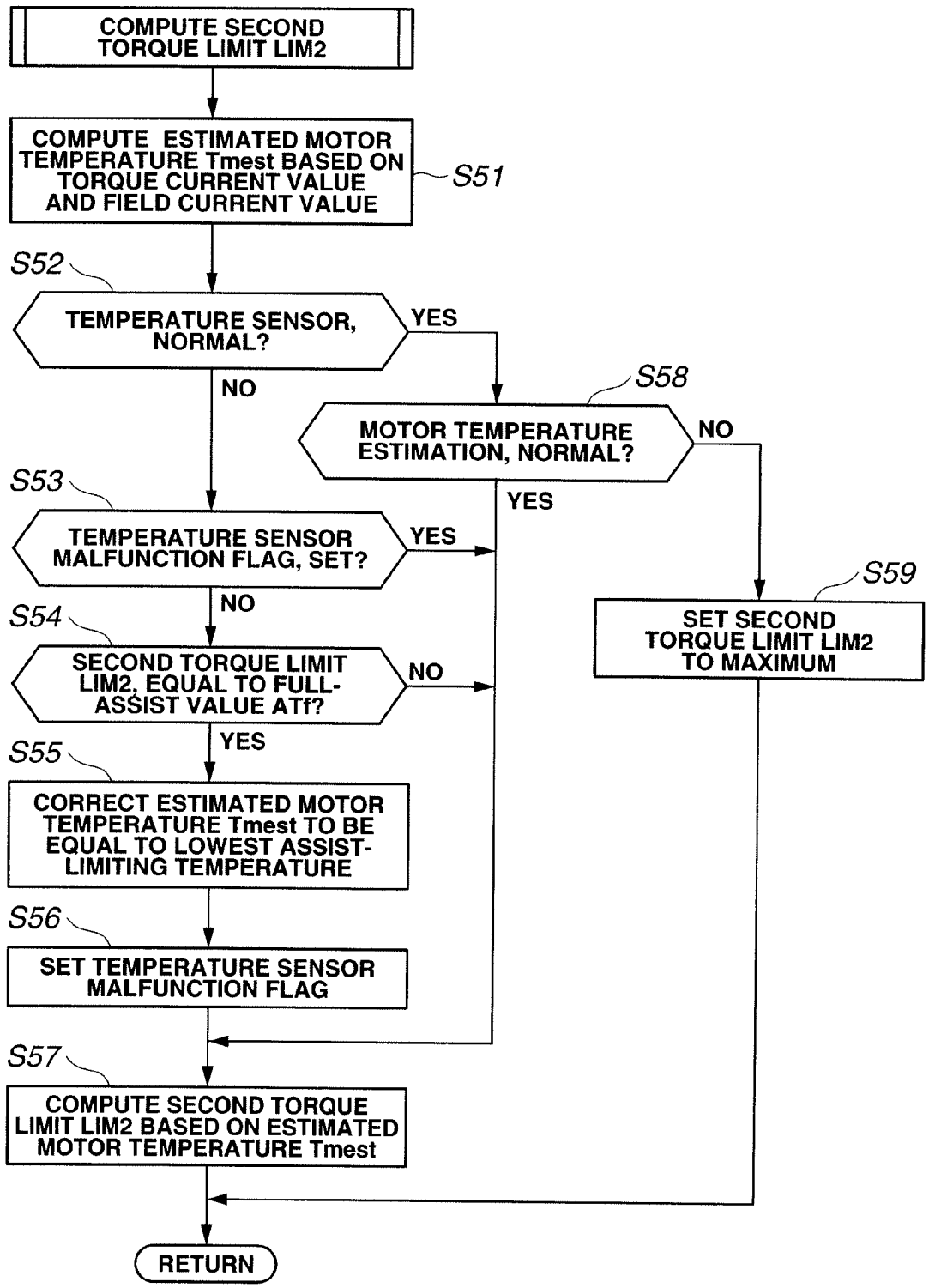
FIG. 15 is a flow chart showing a detailed process of computing the second torque limit according to the second embodiment.

The following describes a power steering apparatus according to a second embodiment of the present invention with reference to FIGS. 14 and 15. As described above, the power steering apparatus according to the first embodiment is configured to: monitor malfunction of temperature sensor 40; and when temperature sensor 40 becomes abnormal, set temperature-based torque limit ATlim to be equal to second torque limit LIM2 so as to limit desired assist steering torque ATdes. In contrast, as described in detail below, the power steering apparatus according to the second embodiment is further configured to: monitor malfunction of motor temperature estimating part 42c; and when motor temperature estimating part 42c becomes abnormal, set temperature-based torque limit ATlim to be equal to first torque limit LIM1 so as to limit desired assist steering torque ATdes.

In the following, the corresponding components are given the same reference characters as in the first embodiment. FIG. 14 shows a control block diagram of temperature-based torque limit computing section 42. Temperature-based torque limit computing section 42 further includes a motor temperature estimation malfunction monitoring part 42f.

Motor temperature estimation malfunction monitoring part 42f monitors malfunction of motor temperature estimating part 42c; and when judging motor temperature estimating part 42c as abnormal, outputs a signal indicative of malfunction of motor temperature estimating part 42c to second torque limit computing part 42d. Second torque limit computing part 42d receives a signal indicative of estimated motor temperature Tmest from motor temperature estimating part 42c, and a signal indicative of malfunction of motor temperature estimation from motor temperature estimation malfunction monitoring part 42f, computes second torque limit LIM2, and outputs a signal indicative of second torque limit LIM2 to minimum selecting part 42e.

Although the second embodiment is based on the first embodiment, the second embodiment differs from the first embodiment in the operation of computing second torque limit LIM2 as follows.

The following describes a process of computing second torque limit LIM2 with reference to FIG. 15. At Step S51, control unit 4 computes estimated motor temperature Tmest of electric motor 31 on the basis of the torque current and field current supplied to electric motor 31, and then proceeds to Step S52. Control unit 4 estimates or computes an amount of generated heat on the basis of a value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S52, control unit 4 judges whether or not temperature sensor 40 is normal, on the basis of presence or absence of the signal indicative of malfunction of temperature sensor 40 outputted from temperature sensor malfunction monitoring section 41. When judging temperature sensor 40 as normal, then control unit 4 proceeds to Step S58. When judging temperature sensor 40 as abnormal, control unit 4 proceeds to Step S53.

At Step S53, control unit 4 judges whether or not a flag (referred to as temperature sensor malfunction flag) is set. When judging the temperature sensor malfunction flag as set, control unit 4 proceeds to Step S57. When judging the temperature sensor malfunction flag as not set, control unit 4 proceeds to Step S54. The temperature sensor malfunction flag is a data set flag for condition that temperature sensor 40 is abnormal.

At Step S54, control unit 4 judges whether or not second torque limit LIM2 is equal to full-assist value ATf. When judging second torque limit LIM2 as equal to full-assist value ATf, control unit 4 proceeds to Step S55. When judging second torque limit LIM2 as not equal to full-assist value ATf, control unit 4 proceeds to Step S57.

At Step S55, control unit 4 corrects estimated motor temperature Tmest to be equal to the lowest assist-limiting temperature, and then proceeds to Step S56. Estimated motor temperature Tmest is updated at Step S51 by adding, to the preceding value of estimated motor temperature Tmest, the amount of generated heat of electric motor 31 computed on the basis of the torque current and field current. If estimated motor temperature Tmest is increased in the following control cycle, the assist steering torque is limited to second torque limit LIM2 which is below full-assist value ATf, because estimated motor temperature Tmest is set to the lowest assist-limiting temperature at Step S55 in the current control cycle.

At Step S56, control unit 4 sets the temperature sensor malfunction flag, and then proceeds to Step S57.

At Step S57, control unit 4 computes second torque limit LIM2 on the basis of estimated motor temperature Tmest computed at Step S51 and corrected at Step S55, and then exits from this process. Second torque limit LIM2 is computed using the function of computing second torque limit LIM2 shown in FIG. 5. Specifically, when estimated motor temperature Tmest is below the lowest assist-limiting temperature, control unit 4 sets second torque limit LIM2 to full-assist value ATf. On the other hand, when estimated motor temperature Tmest is above the lowest assist-limiting temperature, control unit 4 sets second torque limit LIM2 to decrease with increase in estimated motor temperature Tmest.

At Step S58, control unit 4 judges whether or not motor temperature estimating part 42c is normal. When judging motor temperature estimating part 42c as normal, then control unit 4 proceeds to Step S57. When judging motor temperature estimating part 42c as abnormal, control unit 4 proceeds to Step S59.

At Step S59, control unit 4 sets first torque limit LIM1 to the maximum value, or to full-assist value ATf, and exits from this process. According to this, when motor temperature estimating part 42c is abnormal and temperature sensor 40 is normal, temperature-based torque limit ATlim is constantly set to be equal to first torque limit LIM1, because temperature-based torque limit ATlim is set to the smaller one of first torque limit LIM1 and second torque limit LIM2.

Thus, even after motor temperature estimating part 42c becomes abnormal, it is possible to provide temperature-based torque limit ATlim on the basis of measured temperature Tmsr. Therefore, it is possible to produce a sufficient assist steering torque for steering operation, while preventing control unit 4 and electric motor 31 from overheating.

The following describes a power steering apparatus according to a third embodiment of the present invention with reference to FIGS. 16 to 18B. As described above, the power steering apparatus according to the first embodiment is configured to correct estimated motor temperature Tmest to increase, when determining that when estimated motor temperature Tmest is within the full-assist range, temperature sensor 40 becomes abnormal. In contrast, as described in detail below, the power steering apparatus according to the third embodiment is configured to correct the lowest assist-limiting temperature of the function of computing second torque limit LIM2 to decrease, when determining that when estimated motor temperature Tmest is within the full-assist range, temperature sensor 40 becomes abnormal.

In the following, the corresponding components are given the same reference characters as in the first embodiment. The third embodiment differs from the first embodiment in the operation of computing second torque limit LIM2 as follows.

Figure 16:
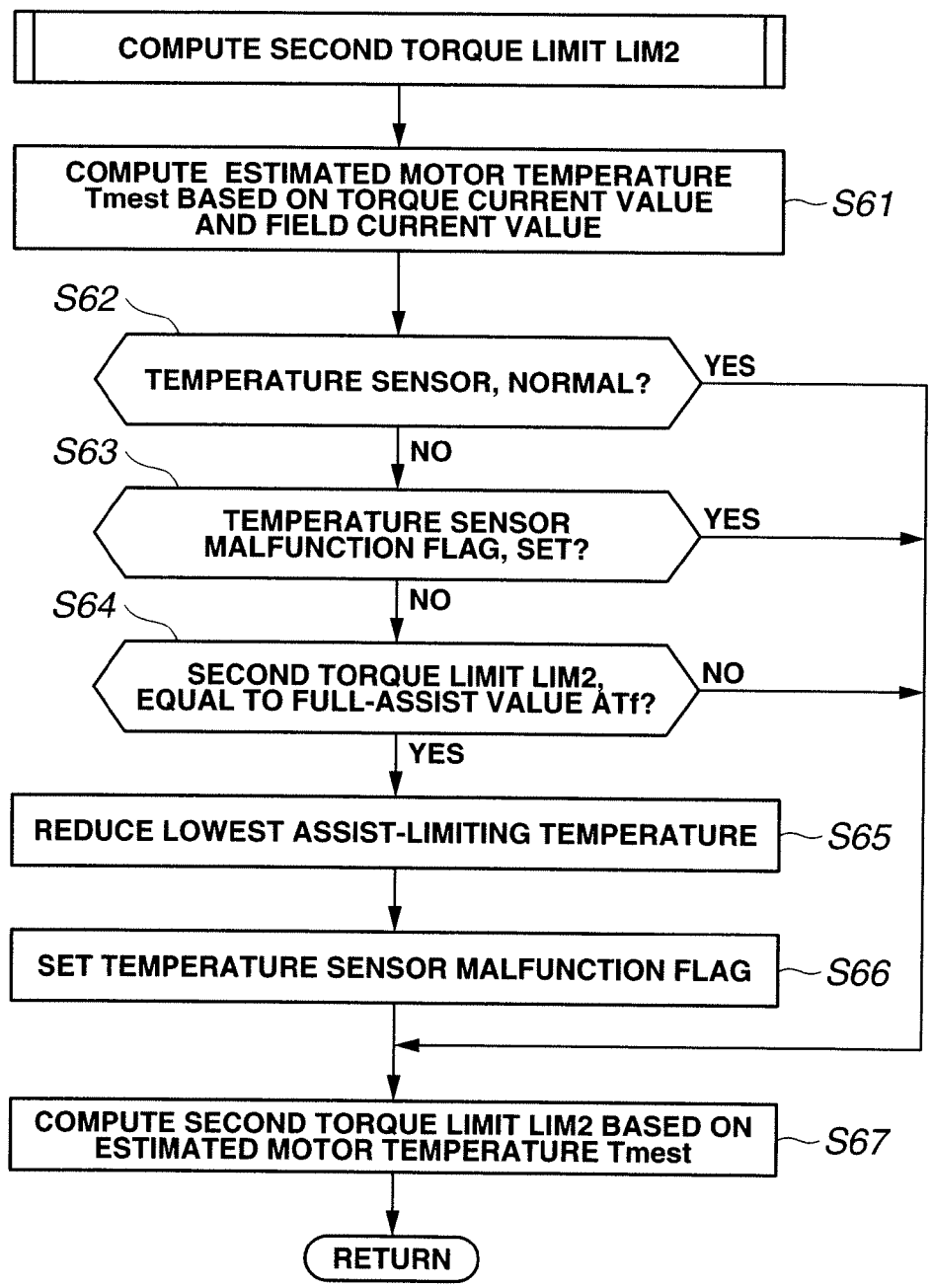
FIG. 16 is a flow chart showing a detailed process of computing the second torque limit according to a third embodiment of the present invention.

The following describes a process of computing second torque limit LIM2 with reference to FIG. 16. At Step S61, control unit 4 computes estimated motor temperature Tmest of electric motor 31 on the basis of the torque current and field current supplied to electric motor 31, and then proceeds to Step S62. Control unit 4 estimates or computes an amount of generated heat on the basis of the value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S62, control unit 4 judges whether or not temperature sensor 40 is normal, on the basis of presence or absence of the signal indicative of malfunction of temperature sensor 40 outputted from temperature sensor malfunction monitoring section 41. When judging temperature sensor 40 as normal, then control unit 4 proceeds to Step S67. When judging temperature sensor 40 as abnormal, control unit 4 proceeds to Step S63.

At Step S63, control unit 4 judges whether or not a flag (referred to as temperature sensor malfunction flag) is set. When judging the temperature sensor malfunction flag as set, control unit 4 proceeds to Step S67. When judging the temperature sensor malfunction flag as not set, control unit 4 proceeds to Step S64. The temperature sensor malfunction flag is a data set flag for condition that temperature sensor 40 is abnormal.

At Step S64, control unit 4 judges whether or not second torque limit LIM2 is equal to full-assist value ATf. When judging second torque limit LIM2 as equal to full-assist value ATf, control unit 4 proceeds to Step S65. When judging second torque limit LIM2 as not equal to full-assist value ATf, control unit 4 proceeds to Step S67.

Figure 17:
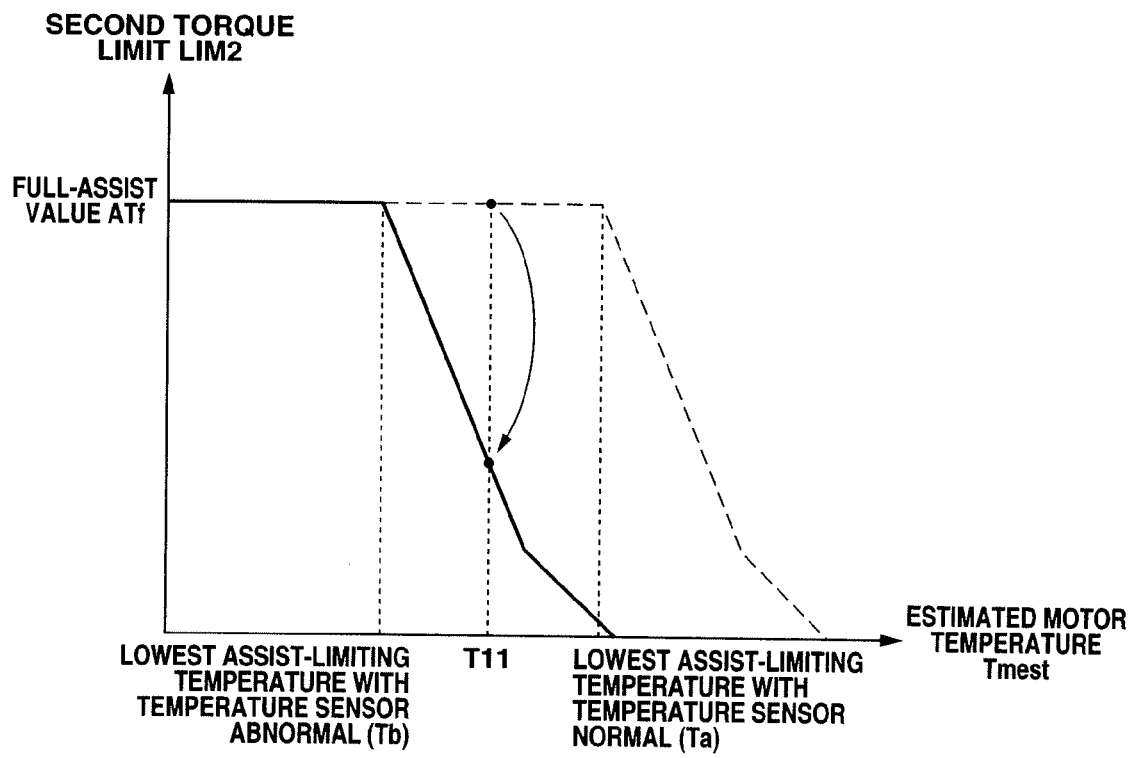
FIG. 17 is a graph showing a function of computing the second torque limit according to the third embodiment.

At Step S65, control unit 4 reduces the lowest assist-limiting temperature of the function of computing second torque limit LIM2, and then proceeds to Step S66. The function indicated by broken lines in FIG. 17 is normally employed to compute second torque limit LIM2. On the other hand, at Step S65, the function indicated by solid lines in FIG. 17 is employed, which is provided by reducing the lowest assist-limiting temperature from Ta to Tb. Thus, the lowest assist-limiting temperature is corrected by subtracting a predetermined value, when it is determined that when estimated motor temperature Tmest is below the lowest assist-limiting temperature, temperature sensor 40 becomes abnormal.

At Step S66, control unit 4 sets the temperature sensor malfunction flag, and then proceeds to Step S27.

At Step S67, control unit 4 computes second torque limit LIM2 on the basis of estimated motor temperature Tmest computed at Step S61, using the corrected function, and then exits from this process.

Figure 18A:
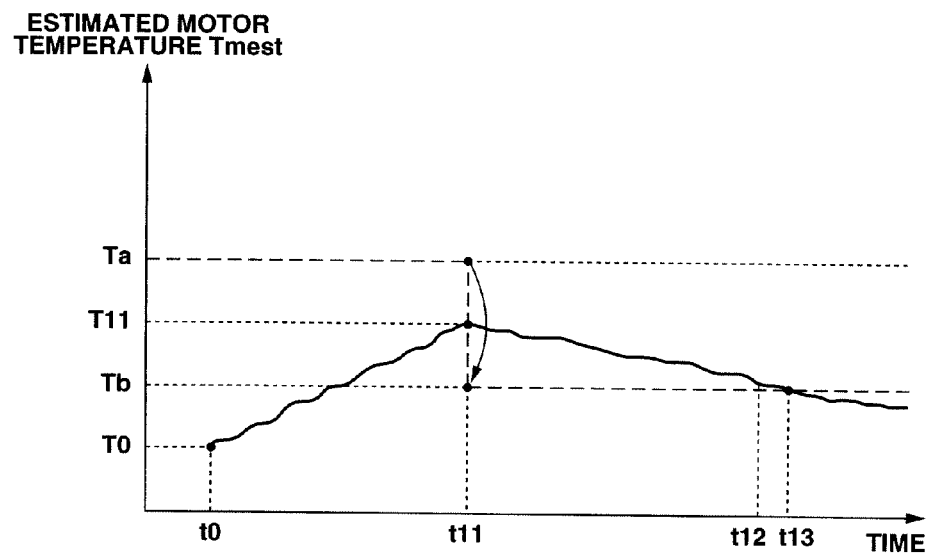
FIGS. 18A and 18B are a set of time charts showing an example of how the power steering apparatus according to the third embodiment operates.
Figure 18B:
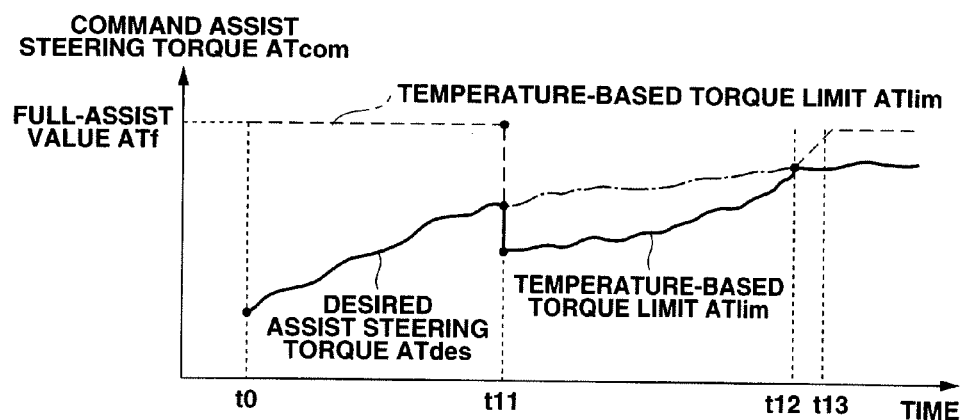

The following describes an example of how the power steering apparatus according to the third embodiment operates with reference to FIGS. 18A and 18B. FIG. 18A shows how estimated motor temperature Tmest changes with time, while FIG. 18B shows how command assist steering torque ATcom changes with time.

In the following, estimated motor temperature Tmest when temperature sensor 40 becomes abnormal is assumed to be equal to a temperature value T11. Temperature value T11 is below the lowest assist-limiting temperature Ta of the function of computing second torque limit LIM2 for condition that temperature sensor 40 is normal, and is above the lowest assist-limiting temperature Tb of the function of computing second torque limit LIM2 for condition that temperature sensor 40 is abnormal, as shown in FIG. 17.

As shown in FIG. 18B, until time t11 after time t0, command assist steering torque ATcom is set to be equal to desired assist steering torque ATdes, because desired assist steering torque ATdes is smaller than temperature-based torque limit ATlim. Accordingly, as shown in FIG. 18A, until time t11 after time t0, estimated motor temperature Tmest increases with increase in desired assist steering torque ATdes.

Temperature sensor 40 is assumed to become abnormal at time t11. At time t11, estimated motor temperature Tmest is equal to temperature value T11. At time t11, the lowest assist-limiting temperature is shifted from Ta to Tb, so that estimated motor temperature Tmest exceeds lowest assist-limiting temperature Tb as shown in FIG. 18A. Thus, as shown in FIG. 18B, after time t11, temperature-based torque limit ATlim is lower than desired assist steering torque ATdes, so that command assist steering torque ATcom is set to be equal to temperature-based torque limit ATlim.

As shown in FIG. 18A, until time t12 after time t11, estimated motor temperature Tmest continues to decrease, while temperature-based torque limit ATlim increases with decrease in estimated motor temperature Tmest. After time t12, command assist steering torque ATcom is set to be equal to desired assist steering torque ATdes, because temperature-based torque limit ATlim exceeds desired assist steering torque ATdes at time t12.

Thus, when temperature sensor 40 becomes abnormal, and motor temperature estimating part 42c estimates an increase in estimated motor temperature Tmest, second torque limit LIM2 is set so as to limit the assist steering torque. Therefore, it is possible to produce a sufficient assist steering torque for steering operation, while preventing control unit 4 and electric motor 31 from overheating.

The third embodiment may be combined with the first embodiment. Specifically, the power steering apparatus may correct one or both of estimated motor temperature Tmest and the lowest assist-limiting temperature in such a manner that estimated motor temperature Tmest increases with respect to the lowest assist-limiting temperature, when determining that when estimated motor temperature Tmest is below the lowest assist-limiting temperature, temperature sensor 40 becomes abnormal.

The following describes a power steering apparatus according to a fourth embodiment of the present invention with reference to FIGS. 19 to 21B. As described above, the power steering apparatus according to the first embodiment is configured to correct estimated motor temperature Tmest to increase, when determining that when estimated motor temperature Tmest is within the full-assist range, temperature sensor 40 becomes abnormal. In contrast, as described in detail below, the power steering apparatus according to the fourth embodiment is configured to correct the value of the function of computing second torque limit LIM2 to decrease, when determining that when estimated motor temperature Tmest is within the full-assist range, temperature sensor 40 becomes abnormal.

In the following, the corresponding components are given the same reference characters as in the first embodiment. The fourth embodiment differs from the first embodiment in the operation of computing second torque limit LIM2 as follows.

Figure 19:
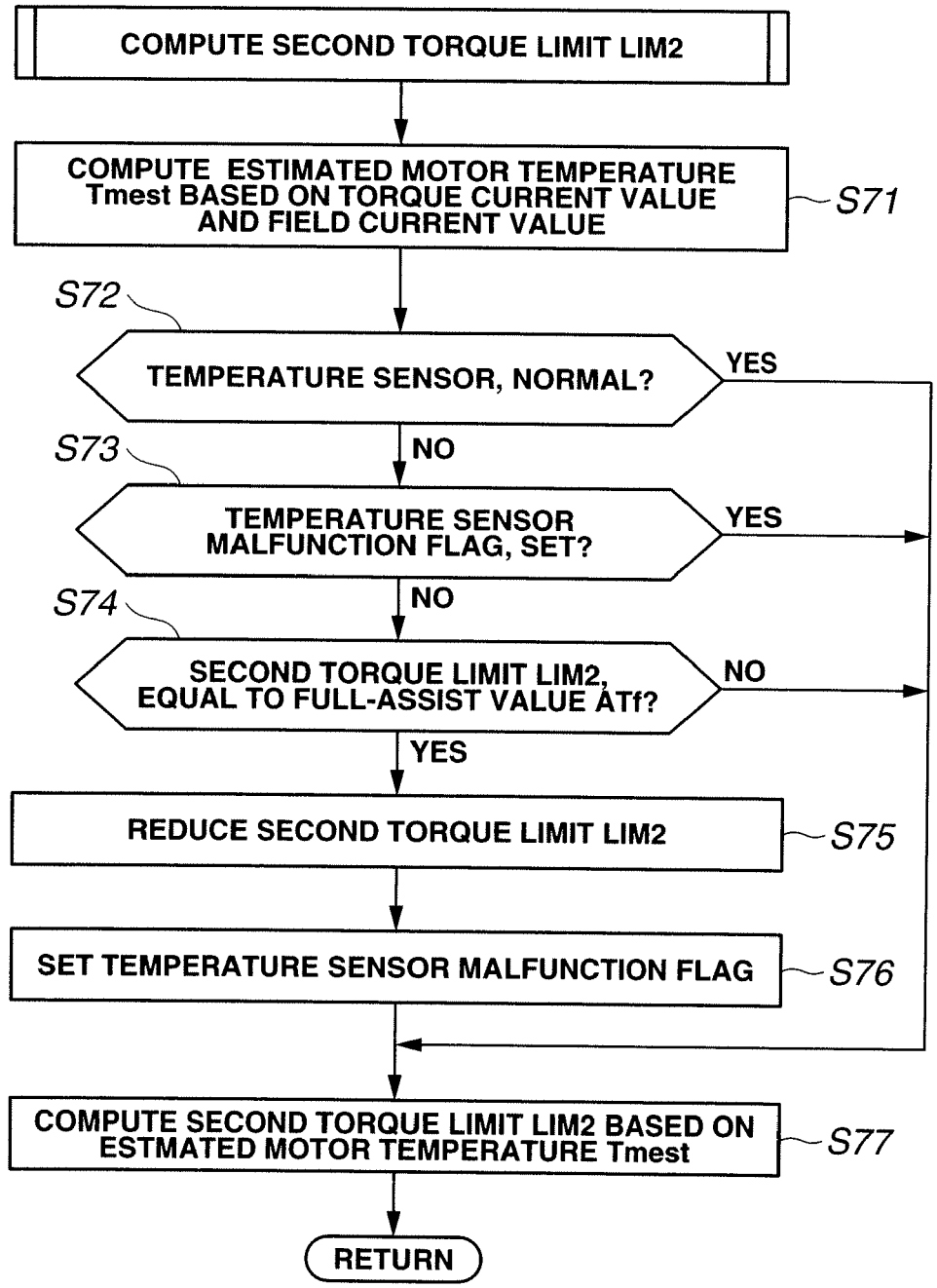
FIG. 19 is a flow chart showing a detailed process of computing the second torque limit according to a fourth embodiment of the present invention.

The following describes a process of computing second torque limit LIM2 with reference to FIG. 19. At Step S71, control unit 4 computes estimated motor temperature Tmest of electric motor 31 on the basis of the torque current and field current supplied to electric motor 31, and then proceeds to Step S72. Control unit 4 estimates or computes an amount of generated heat on the basis of the value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S72, control unit 4 judges whether or not temperature sensor 40 is normal, on the basis of presence or absence of the signal indicative of malfunction of temperature sensor 40 outputted from temperature sensor malfunction monitoring section 41. When judging temperature sensor 40 as normal, then control unit 4 proceeds to Step S77. When judging temperature sensor 40 as abnormal, control unit 4 proceeds to Step S73.

At Step S73, control unit 4 judges whether or not a flag (referred to as temperature sensor malfunction flag) is set. When judging the temperature sensor malfunction flag as set, control unit 4 proceeds to Step S77. When judging the temperature sensor malfunction flag as not set, control unit 4 proceeds to Step S74. The temperature sensor malfunction flag is a data set flag for condition that temperature sensor 40 is abnormal.

At Step S74, control unit 4 judges whether or not second torque limit LIM2 is equal to full-assist value ATf. When judging second torque limit LIM2 as equal to full-assist value ATf, control unit 4 proceeds to Step S75. When judging second torque limit LIM2 as not equal to full-assist value ATf, control unit 4 proceeds to Step S77.

Figure 20:
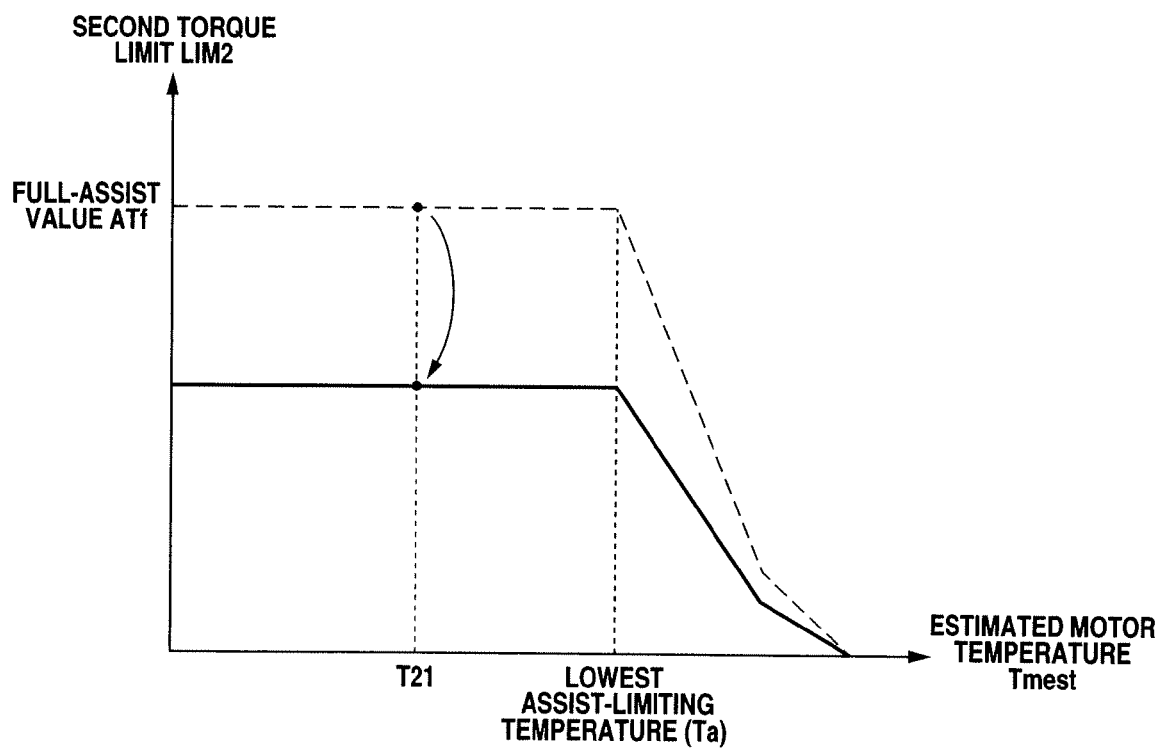
FIG. 20 is a graph showing a function of computing the second torque limit according to the fourth embodiment.

At Step S75, control unit 4 reduces the value of the function of computing second torque limit LIM2, and then proceeds to Step S76. The function indicated by broken lines in FIG. 20 is normally employed to compute second torque limit LIM2. In contrast, at Step S75, the function indicated by solid lines in FIG. 20 is employed, which is provided by reducing the value of second torque limit LIM2.

At Step S76, control unit 4 sets the temperature sensor malfunction flag, and then proceeds to Step S77.

At Step S77, control unit 4 computes second torque limit LIM2 on the basis of estimated motor temperature Tmest computed at Step S71, using the corrected function, and then exits from this process.

Figure 21A:
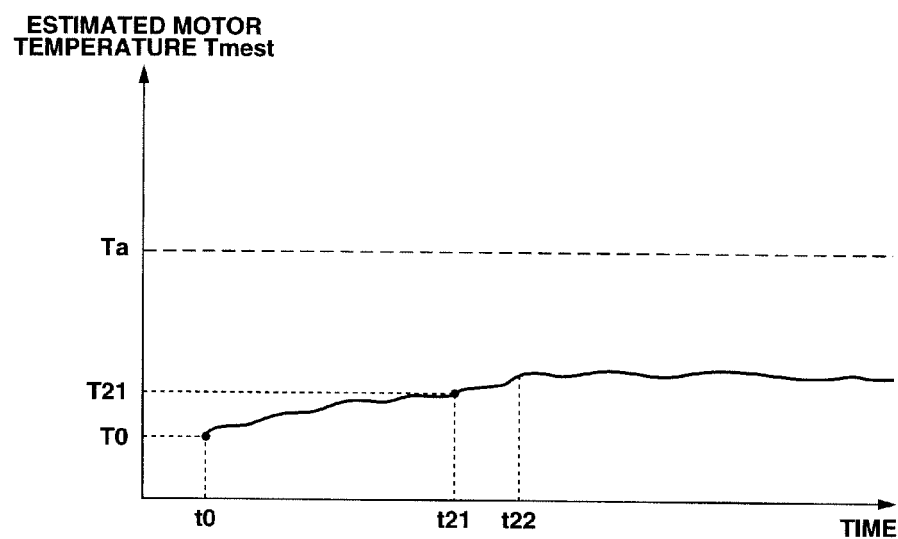
FIGS. 21A and 21B are a set of time charts showing an example of how the power steering apparatus according to the fourth embodiment operates.
Figure 21B:
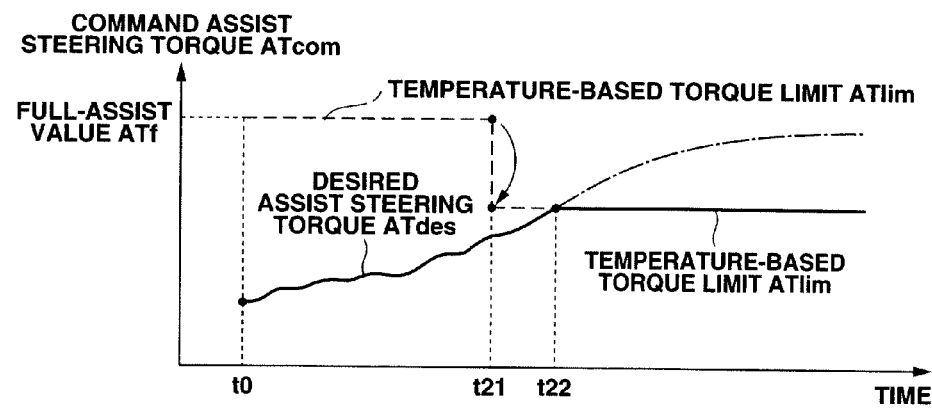
Figure 22:
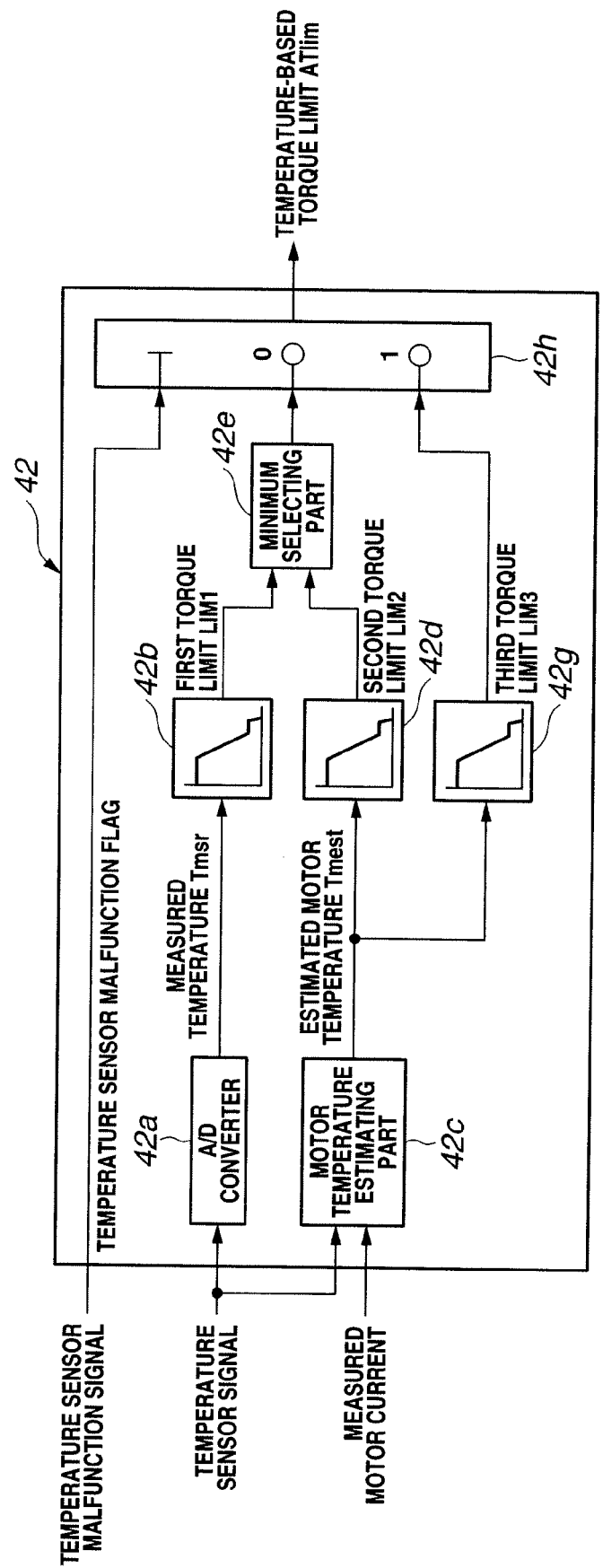
FIG. 22 is a control block diagram showing a temperature-based torque limit computing section of a control unit of a power steering apparatus according to a fifth embodiment of the present invention.

The following describes an example of how the power steering apparatus according to the fourth embodiment operates with reference to FIGS. 21A and 21B. FIG. 21A shows how estimated motor temperature Tmest changes with time, while FIG. 22B shows how command assist steering torque ATcom changes with time.

In the following, estimated motor temperature Tmest when temperature sensor 40 becomes abnormal is assumed to be equal to a temperature value T21. Temperature value T21 is below the lowest assist-limiting temperature Ta of the function of computing second torque limit LIM2, as shown in FIG. 20.

As shown in FIG. 21B, until time t21 after time t0, command assist steering torque ATcom is set to be equal to desired assist steering torque ATdes, because desired assist steering torque ATdes is smaller than temperature-based torque limit ATlim. Accordingly, as shown in FIG. 21A, until time t21 after time t0, estimated motor temperature Tmest increases with increase in desired assist steering torque ATdes.

Temperature sensor 40 is assumed to become abnormal at time t21. At time t21, temperature-based torque limit ATlim is set to a reduced value, as shown in FIG. 21B. Until time t22 after time t21, desired assist steering torque ATdes is below temperature-based torque limit ATlim, so that command assist steering torque ATcom is set to be equal to desired assist steering torque ATdes.

After time t22, command assist steering torque ATcom is set to temperature-based torque limit ATlim, because desired assist steering torque ATdes exceeds temperature-based torque limit ATlim at time t22. Thus, when temperature sensor 40 becomes abnormal, and motor temperature estimating part 42c estimates an increase in estimated motor temperature Tmest, second torque limit LIM2 is set so as to limit the assist steering torque. Therefore, it is possible to produce a sufficient assist steering torque for steering operation, while preventing control unit 4 and electric motor 31 from overheating.

The following describes a power steering apparatus according to a fifth embodiment of the present invention with reference to FIGS. 22 to 33C. As described above, the power steering apparatus according to the first embodiment is configured to correct estimated motor temperature Tmest to increase, when determining that when estimated motor temperature Tmest is within the full-assist range, temperature sensor 40 becomes abnormal. In contrast, as described in detail below, the power steering apparatus according to the fifth embodiment is configured to employ a function of computing a third torque limit LIM3 where third torque limit LIM3 is below second torque limit LIM2 for each value of estimated motor temperature Tmest, when determining that when estimated motor temperature Tmest is within the full-assist range, temperature sensor 40 becomes abnormal.

In the following, the corresponding components are given the same reference characters as in the first embodiment. The following describes temperature-based torque limit computing section 42 with reference to FIG. 22. Temperature-based torque limit computing section 42 includes an A/D (Analog-to-Digital) converter 42a, a first torque limit computing part 42b, a motor temperature estimating part 42c, a second torque limit computing part 42d, a minimum selecting part 42e, a third torque limit computing part 42g, and a switch 42h. A/D converter 42a receives an analog signal indicative of the measured temperature from temperature sensor 40, converts the analog signal into a digital signal, and outputs the digital signal to first torque limit computing part 42b.

First torque limit computing part 42b receives a signal indicative of the measured temperature, and computes a value (referred to as first torque limit LIM1) which is computed based on the temperature of control unit 4 for preventing overheating. First torque limit computing part 42b outputs a signal indicative of first torque limit LIM1 to minimum selecting part 42e.

Figure 23:
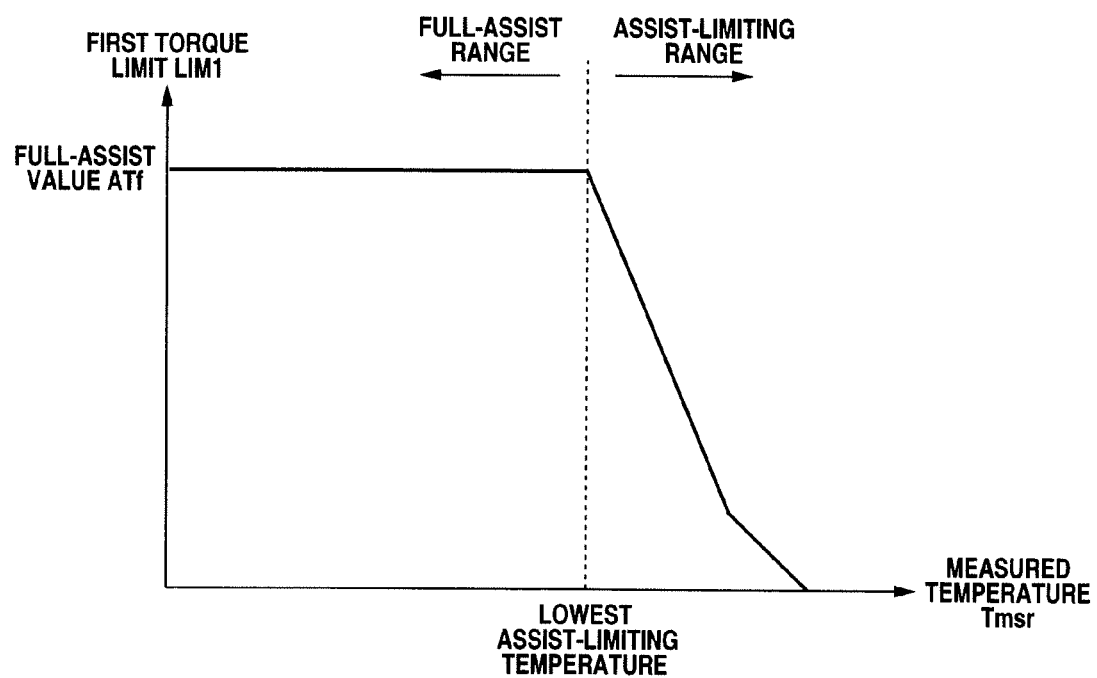
FIG. 23 is a graph showing a function of computing the first torque limit according to the fifth embodiment.

First torque limit computing part 42b stores data indicative of a function of computing first torque limit LIM1 as shown in FIG. 23. As shown in FIG. 23, according to the function of computing first torque limit LIM1, when measured temperature Tmsr (the temperature of control unit 4) is lower than a temperature value (referred to as lowest assist-limiting temperature), then first torque limit LIM1 is set to a maximum value (referred to as full-assist value ATf). The range below the lowest assist-limiting temperature is referred to as full-assist range. On the other hand, when measured temperature Tmsr is above the lowest assist-limiting temperature, then first torque limit LIM1 is set to decrease with increase in measured temperature Tmsr. The range above the lowest assist-limiting temperature is referred to as assist-limiting range.

Motor temperature estimating part 42c receives a signal indicative of the motor current supplied to electric motor 31 from current sensor 48, and a signal indicative of measured temperature Tmsr of control unit 4 from temperature sensor 40, estimates the temperature of electric motor 31 as estimated motor temperature Tmest, and outputs a signal indicative of estimated motor temperature Tmest to second torque limit computing part 42d.

Second torque limit computing part 42d receives a signal indicative of estimated motor temperature Tmest from motor temperature estimating part 42c, computes a value (referred to as second torque limit LIM2) which is computed based on the temperature of electric motor 31 for preventing overheating, and outputs a signal indicative of second torque limit LIM2 to minimum selecting part 42e.

Figure 24:
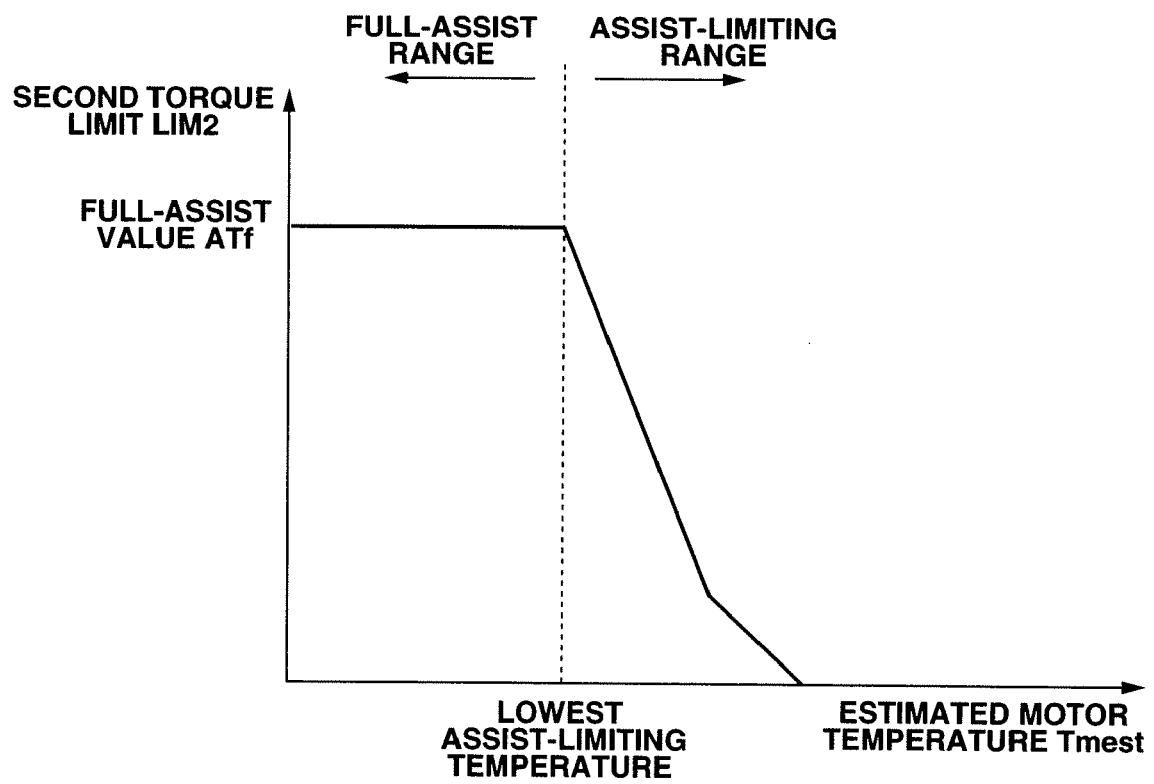
FIG. 24 is a graph showing a function of computing the second torque limit according to the fifth embodiment.

Second torque limit computing part 42d stores data indicative of a function of computing second torque limit LIM2 as shown in FIG. 24. As shown in FIG. 24, according to the function of computing second torque limit LIM2, when estimated motor temperature Tmest is lower than a temperature value (referred to as lowest assist-limiting temperature) (within the full-assist range), then second torque limit LIM2 is set to full-assist value ATf. On the other hand, when estimated motor temperature Tmest is above the lowest assist-limiting temperature (within the assist-limiting range), then second torque limit LIM2 is set to decrease with increase in estimated motor temperature Tmest.

Minimum selecting part 42e receives a signal indicative of first torque limit LIM1 from first torque limit computing part 42b, and a signal indicative of second torque limit LIM2 from second torque limit computing part 42d, compares first torque limit LIM1 with second torque limit LIM2, and outputs the smaller one of them as temperature-based torque limit ATlim to switch 42h.

Third torque limit computing part 42g receives a signal indicative of estimated motor temperature Tmest from motor temperature estimating part 42c, computes third torque limit LIM3 on the basis of estimated motor temperature Tmest, and outputs a signal indicative of third torque limit LIM3 to switch 42h.

Figure 25:
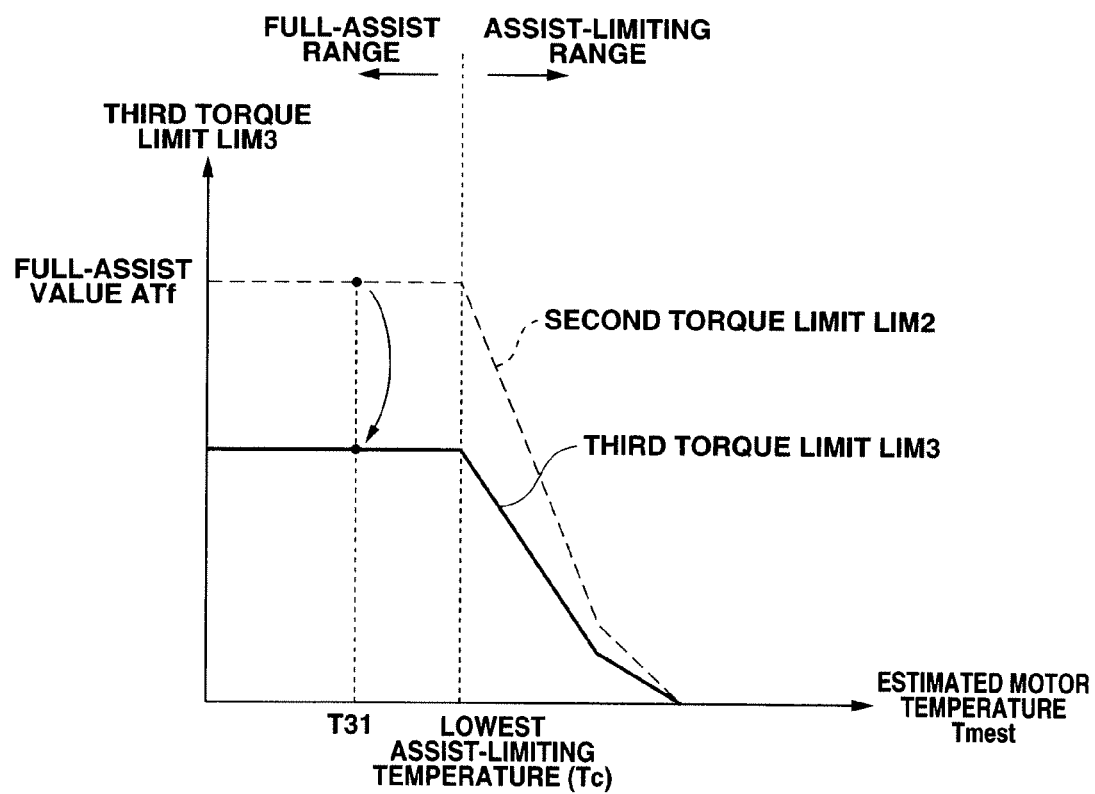
FIG. 25 is a graph showing a function of computing a third torque limit according to the fifth embodiment.

Third torque limit computing part 42g stores data indicative of a function of computing third torque limit LIM3 as shown in FIG. 25. In FIG. 25, the function of second torque limit LIM2 is indicated by broken lines, while the function of third torque limit LIM3 is indicated by solid lines. As shown in FIG. 25, third torque limit LIM3 is set to be lower than second torque limit LIM2 for any value of estimated motor temperature Tmest. Specifically, the maximum value for third torque limit LIM3 in the full-assist range is lower than that for second torque limit LIM2. In this embodiment, third torque limit LIM3 is thus determined by reducing second torque limit LIM2 for each value of estimated motor temperature Tmest.

Switch 42h receives a signal indicative of one of first torque limit LIM1 and second torque limit LIM2 from minimum selecting part 42e, a signal indicative of third torque limit LIM3 from third torque limit computing part 42g, and a signal indicative of malfunction of temperature sensor 40 from temperature sensor malfunction monitoring section 41. Switch 42h selectively outputs the one of first torque limit LIM1 and second torque limit LIM2 or third torque limit LIM3 in accordance with the temperature sensor malfunction flag.

FIGS. 26A and 26B show temperature-based torque limit computing section 42 under two different conditions. FIG. 26A shows a condition in which the temperature sensor malfunction flag is equal to zero, while FIG. 26B shows a condition in which the temperature sensor malfunction flag is equal to one. When the temperature sensor malfunction flag is equal to zero, that is, when temperature sensor 40 is normal, switch 42h outputs one of first torque limit LIM1 and second torque limit LIM2 outputted from minimum selecting part 42e, as shown in FIG. 26A. On the other hand, when the temperature sensor malfunction flag is equal to one, that is, when temperature sensor 40 is abnormal, switch 42h outputs third torque limit LIM3 outputted from third torque limit computing part 42g, as shown in FIG. 26B. Switch 42h implements the switch from one of first torque limit LIM1 and second torque limit LIM2 to third torque limit LIM3 gradually over a predetermined period of time.

Figure 27:
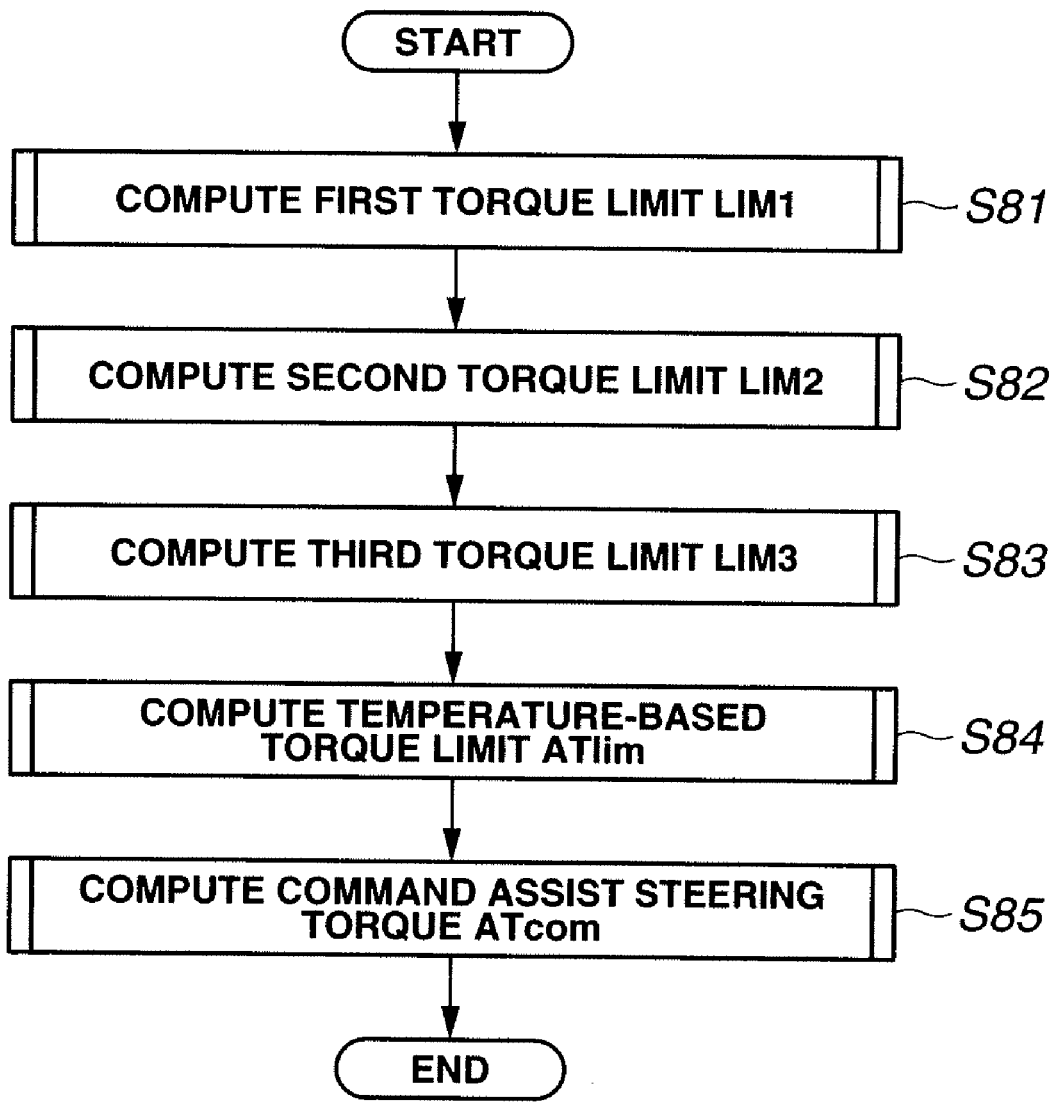
FIG. 27 is a flow chart showing a main process to be performed by the control unit according to the fifth embodiment.

The following describes a process performed by control unit 4 with reference to FIG. 27. At Step S81, control unit 4 computes first torque limit LIM1 on the basis of the temperature of control unit 4, and then proceeds to Step S82. The operation of computing first torque limit LIM1 is described in detail below with reference to FIG. 28.

At Step S82, control unit 4 computes second torque limit LIM2 on the basis of the temperature of electric motor 31, and then proceeds to Step S83. The operation of computing second torque limit LIM2 is described in detail below with reference to FIG. 29.

At Step S83, control unit 4 computes third torque limit LIM3 on the basis of the temperature of electric motor 31, and the proceeds to Step S84. The operation of computing third torque limit LIM3 is described in detail below with reference to FIG. 30.

At Step S84, control unit 4 computes temperature-based torque limit ATlim on the basis of first torque limit LIM1, second torque limit LIM2, and third torque limit LIM3, and then proceeds to Step S85. The operation of computing temperature-based torque limit ATlim is described in detail below with reference to FIG. 31.

At Step S85, control unit 4 computes command assist steering torque ATcom on the basis of desired assist steering torque ATdes and temperature-based torque limit ATlim, and then exits from this process. The operation of computing command assist steering torque ATcom is described in detail below with reference to FIG. 32.

Figure 28:
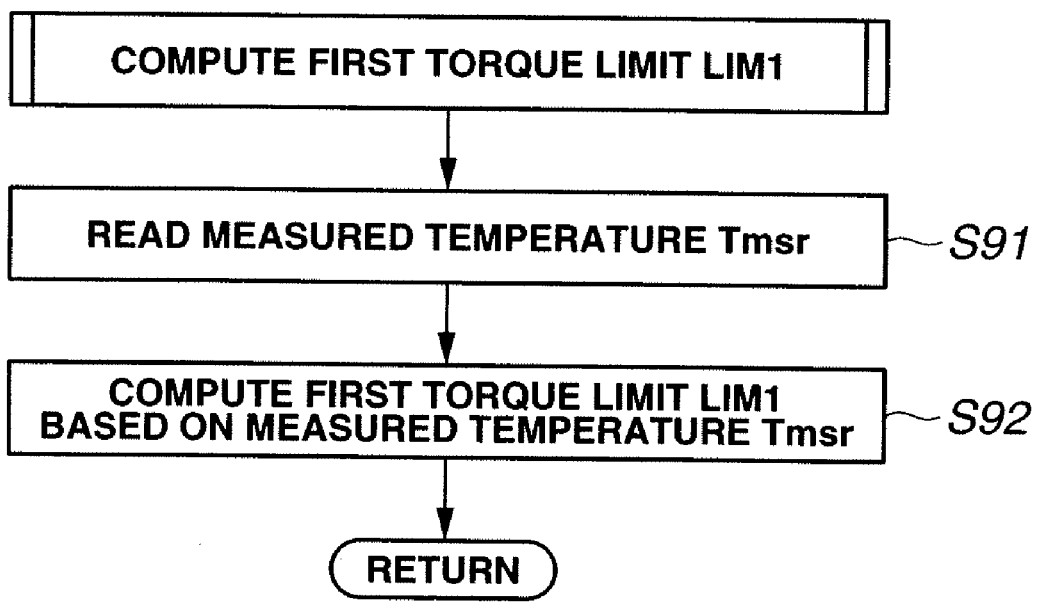
FIG. 28 is a flow chart showing a detailed process of computing the first torque limit according to the fifth embodiment.

The following describes a process of computing first torque limit LIM1 with reference to FIG. 28. At Step S91, control unit 4 reads and obtains measured temperature Tmsr from temperature sensor 40, and then proceeds to Step S92.

At Step S92, control unit 4 computes first torque limit LIM1 on the basis of measured temperature Tmsr using the function of computing first torque limit LIM1 shown in FIG. 23. Specifically, when measured temperature Tmsr (the temperature of control unit 4) is lower than the lowest assist-limiting temperature, then control unit 4 sets first torque limit LIM1 to full-assist value ATf. On the other hand, when measured temperature Tmsr is above the lowest assist-limiting temperature, then control unit 4 sets first torque limit LIM1 to decrease with increase in measured temperature Tmsr.

Figure 29:
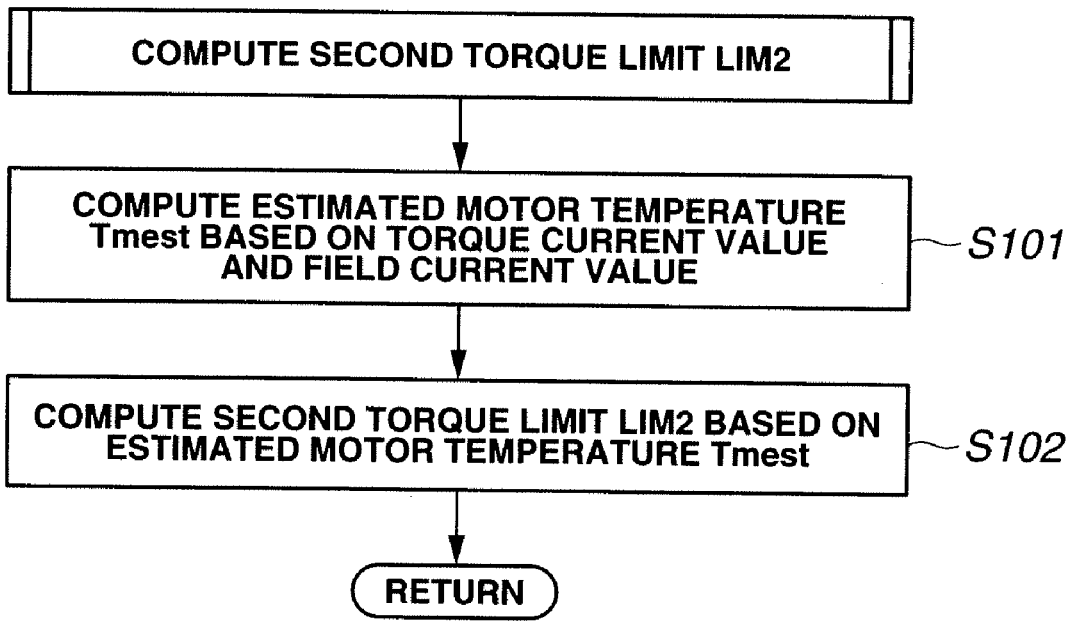
FIG. 29 is a flow chart showing a detailed process of computing the second torque limit according to the fifth embodiment.

The following describes a process of computing second torque limit LIM2 with reference to FIG. 29. At Step S101, control unit 4 computes estimated motor temperature Tmest of electric motor 31 on the basis of the torque current and field current supplied to electric motor 31, and then proceeds to Step S102. Control unit 4 estimates or computes an amount of generated heat on the basis of the value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S102, control unit 4 computes second torque limit LIM2 on the basis of estimated motor temperature Tmest computed at Step S101, and then exits from this process. Second torque limit LIM2 is computed using the function of computing second torque limit LIM2 shown in FIG. 24. Specifically, when estimated motor temperature Tmest is below the lowest assist-limiting temperature, control unit 4 sets second torque limit LIM2 to full-assist value ATf. On the other hand, when estimated motor temperature Tmest is above the lowest assist-limiting temperature, control unit 4 sets second torque limit LIM2 to decrease with increase in estimated motor temperature Tmest.

Figure 30:
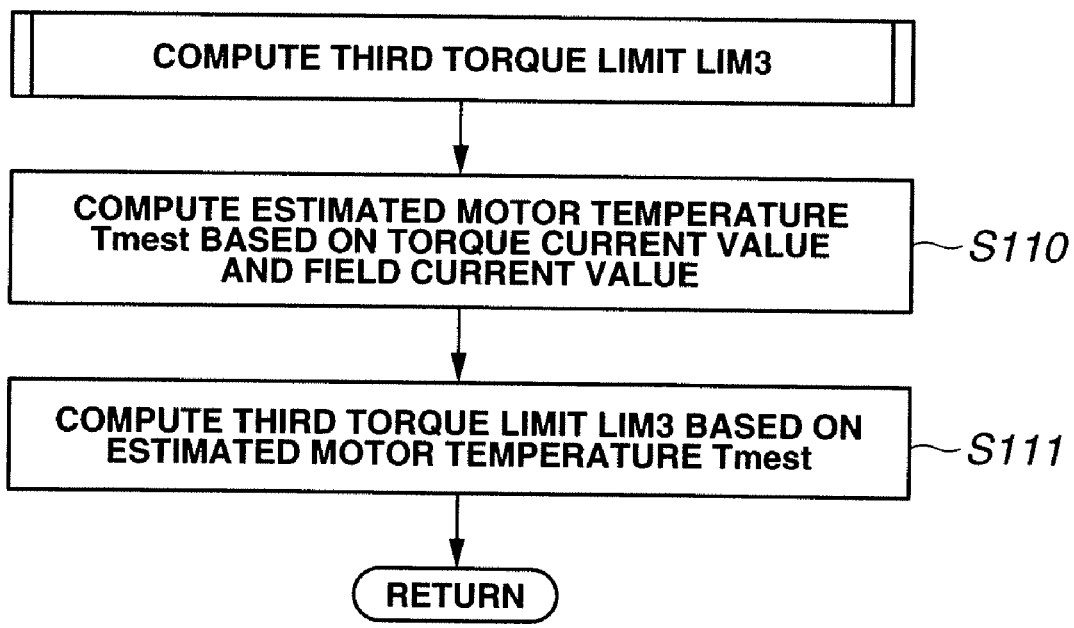
FIG. 30 is a flow chart showing a detailed process of computing the third torque limit according to the fifth embodiment.

The following describes a process of computing third torque limit LIM3 with reference to FIG. 30. At Step S110, control unit 4 computes estimated motor temperature Tmest of electric motor 31 on the basis of the torque current and field current supplied to electric motor 31, and then proceeds to Step S11. Control unit 4 estimates or computes an amount of generated heat on the basis of the value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S111, control unit 4 computes third torque limit LIM3 on the basis of estimated motor temperature Tmest computed at Step S110, and then exits from this process. Third torque limit LIM3 is computed using the function of computing third torque limit LIM3 shown in FIG. 25. Specifically, when estimated motor temperature Tmest is below the lowest assist-limiting temperature, control unit 4 sets third torque limit LIM3 to full-assist value ATf. On the other hand, when estimated motor temperature Tmest is above the lowest assist-limiting temperature, control unit 4 sets third torque limit LIM3 to decrease with increase in estimated motor temperature Tmest.

Figure 31:
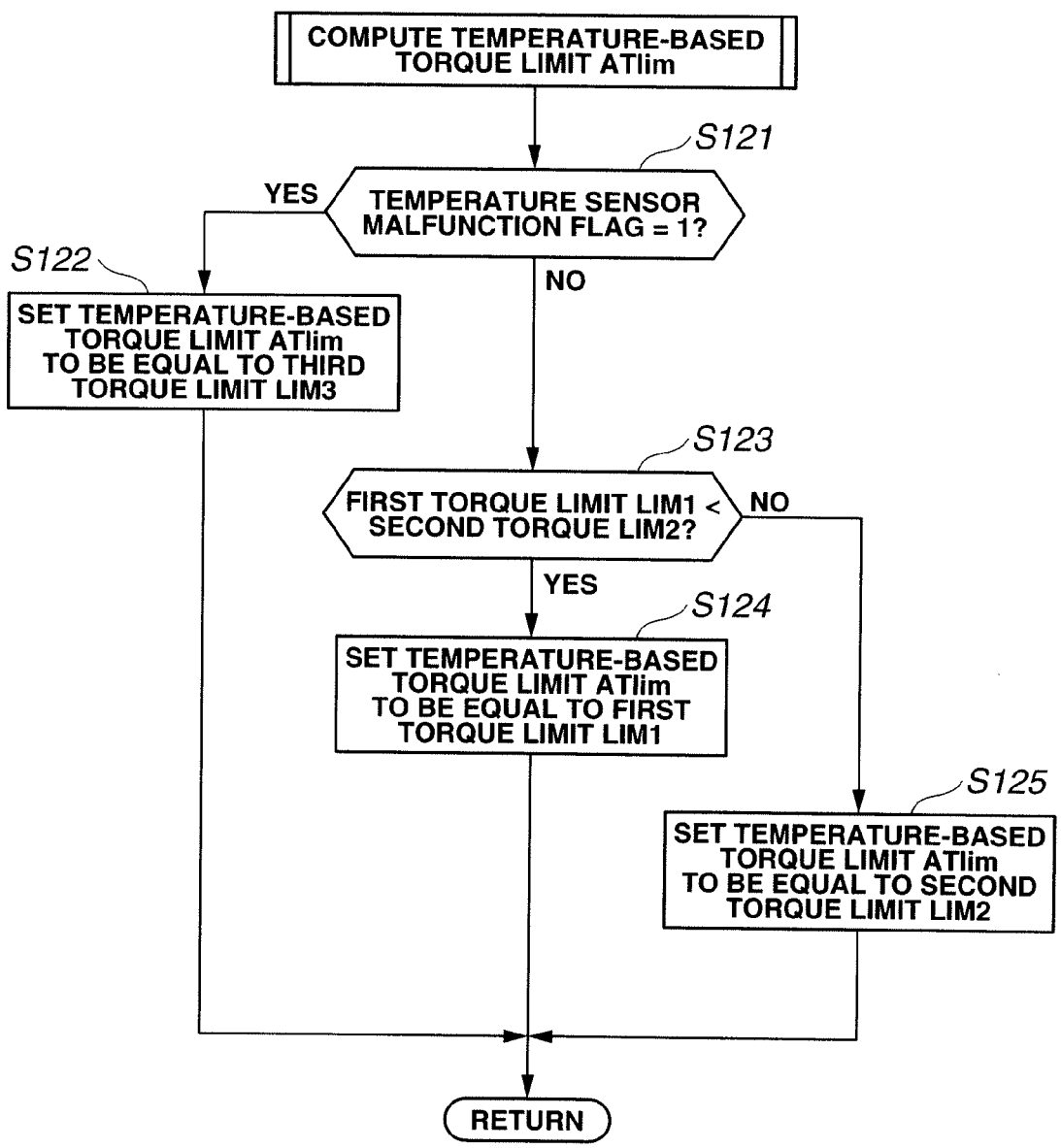
FIG. 31 is a flow chart showing a detailed process of computing the temperature-based torque limit according to the fifth embodiment.

The following describes a process of computing temperature-based torque limit ATlim with reference to FIG. 31. At Step S121, control unit 4 judges whether or not the malfunction flag of temperature sensor 40 is equal to one. When judging the temperature sensor malfunction flag as equal to one, then control unit 4 proceeds to Step S122. When judging the temperature sensor malfunction flag as not equal to one, or as equal to zero, then control unit 4 proceeds to Step S123.

At Step S122, control unit 4 sets temperature-based torque limit ATlim to be equal to third torque limit LIM3, and then exits from this process. At Step S123, control unit 4 compares first torque limit LIM1 with second torque limit LIM2, and then judges whether or not first torque limit LIM1 is smaller than second torque limit LIM2. When judging first torque limit LIM1 as smaller than second torque limit LIM2, control unit 4 proceeds to Step S124. When judging first torque limit LIM1 as not smaller than second torque limit LIM2, control unit 4 proceeds to Step S125.

At Step S124, control unit 4 sets temperature-based torque limit ATlim to be equal to first torque limit LIM1, and then exits from this process. At Step S125, control unit 4 sets temperature-based torque limit ATlim to be equal to second torque limit LIM2, and then exits from this process.

Figure 32:
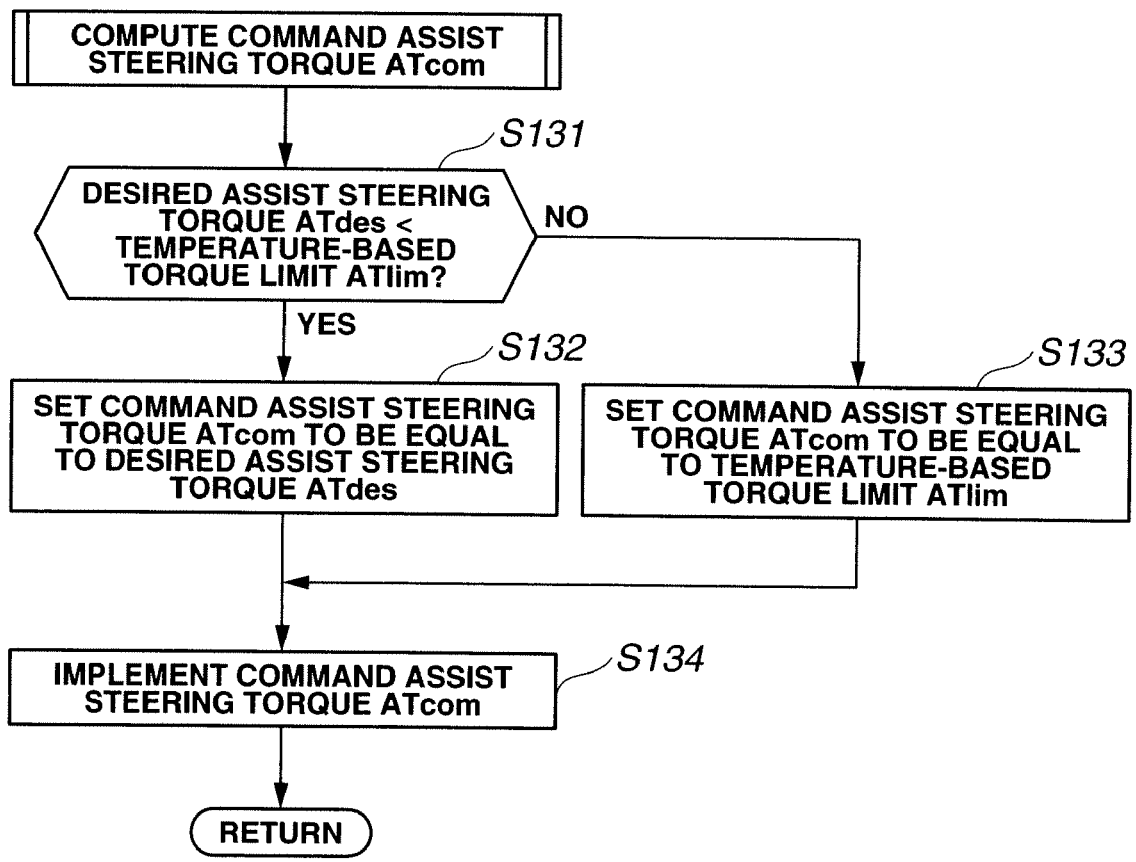
FIG. 32 is a flow chart showing a detailed process of computing the command assist steering torque according to the fifth embodiment.

The following describes a process of computing command assist steering torque ATcom with reference to FIG. 32. At Step S131, control unit 4 judges whether or not desired assist steering torque ATdes is smaller than temperature-based torque limit ATlim. When judging desired assist steering torque ATdes as smaller than temperature-based torque limit ATlim, control unit 4 proceeds to Step S132. When judging desired assist steering torque ATdes as not smaller than temperature-based torque limit ATlim, control unit 4 proceeds to Step S133.

At Step S132, control unit 4 sets command assist steering torque ATcom to be equal to desired assist steering torque ATdes, and then proceeds to Step S134.

At Step S133, control unit 4 sets command assist steering torque ATcom to be equal to temperature-based torque limit ATlim, and then proceeds to Step S134.

At Step S134, control unit 4 implements command assist steering torque ATcom which is set at Step S132 or S133, and then exits from this process.

Figure 33A:
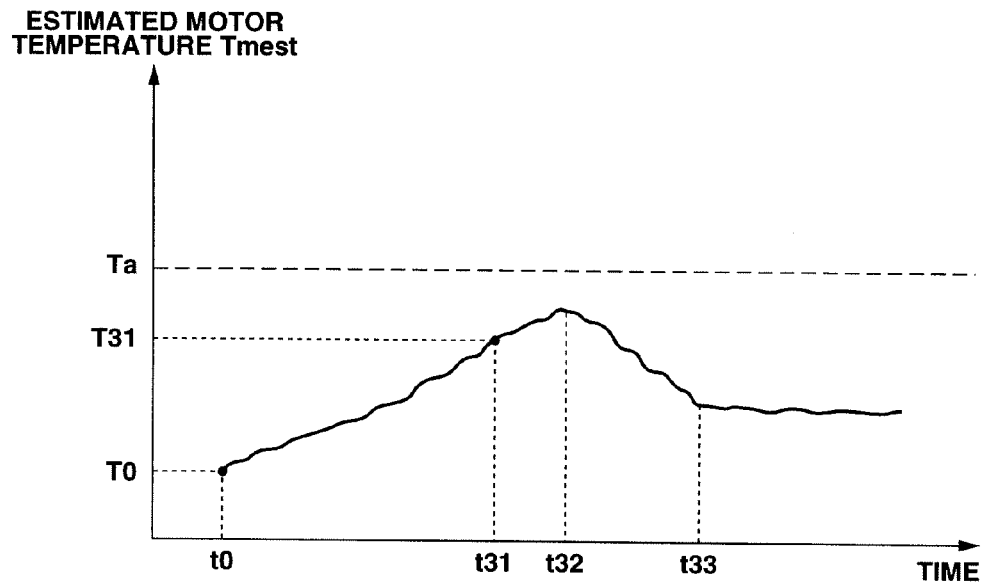
FIGS. 33A, 33B and 33C are a set of time charts showing an example of how the power steering apparatus according to the fifth embodiment operates.
Figure 33B:
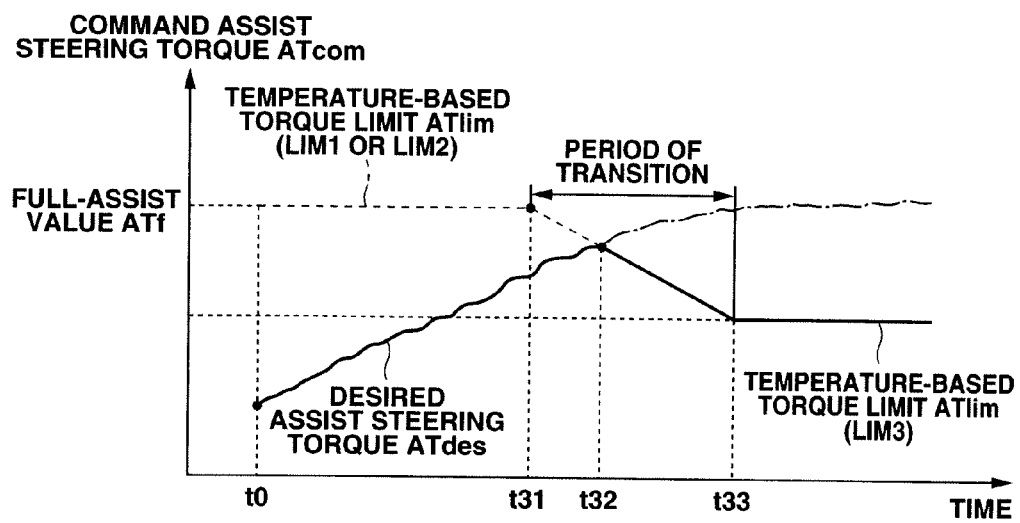
Figure 33C:
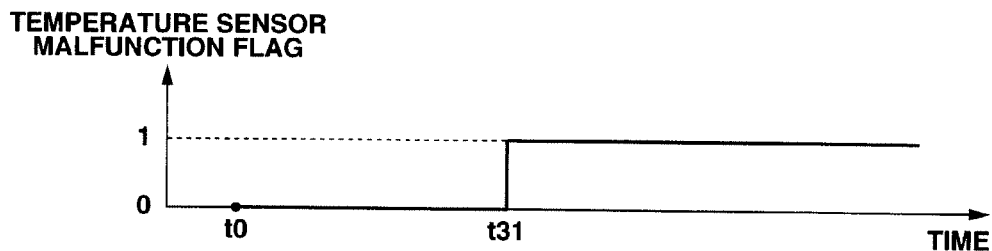

The following describes an example of how the power steering apparatus according to the fifth embodiment operates with reference to FIGS. 33A, 33B and 33C. FIG. 33A shows how estimated motor temperature Tmest changes with time, FIG. 33B shows how command assist steering torque ATcom changes with time, and FIG. 33C shows how the temperature sensor malfunction flag changes with time.

In the following, estimated motor temperature Tmest when temperature sensor 40 becomes abnormal is assumed to be equal to a temperature value T31. Temperature value T31 is below the lowest assist-limiting temperature Tc of the function of computing second torque limit LIM2 or the function of computing third torque limit LIM3, as shown in FIG. 25.

As shown in FIG. 33B, until time t31 after time t0, command assist steering torque ATcom is set to be equal to desired assist steering torque ATdes, because desired assist steering torque ATdes is smaller than temperature-based torque limit ATlim. Accordingly, as shown in FIG. 33A, until time t31 after time t0, estimated motor temperature Tmest increases with increase in desired assist steering torque ATdes.

At time t31, temperature sensor 40 becomes abnormal, so that the temperature sensor malfunction flag is set to one. Over a predetermined period from time t31 to time t33, temperature-based torque limit ATlim changes from one of first torque limit LIM1 and second torque limit LIM2, which is outputted when the temperature sensor malfunction flag is equal to zero, to third torque limit LIM3, which is outputted when the temperature sensor malfunction flag is equal to one.

Until time t32 after time t31, command assist steering torque ATcom is set to be equal to desired assist steering torque ATdes, because desired assist steering torque ATdes is still below temperature-based torque limit ATlim. After time t32, command assist steering torque ATcom is set to be equal to temperature-based torque limit ATlim, because temperature-based torque limit ATlim is smaller than desired assist steering torque ATdes.

Thus, when temperature sensor 40 becomes abnormal, and motor temperature estimating part 42c estimates an increase in estimated motor temperature Tmest, third torque limit LIM3 is set so as to limit the assist steering torque. Therefore, it is possible to produce a sufficient assist steering torque for steering operation, while preventing control unit 4 and electric motor 31 from overheating.

Figure 34:
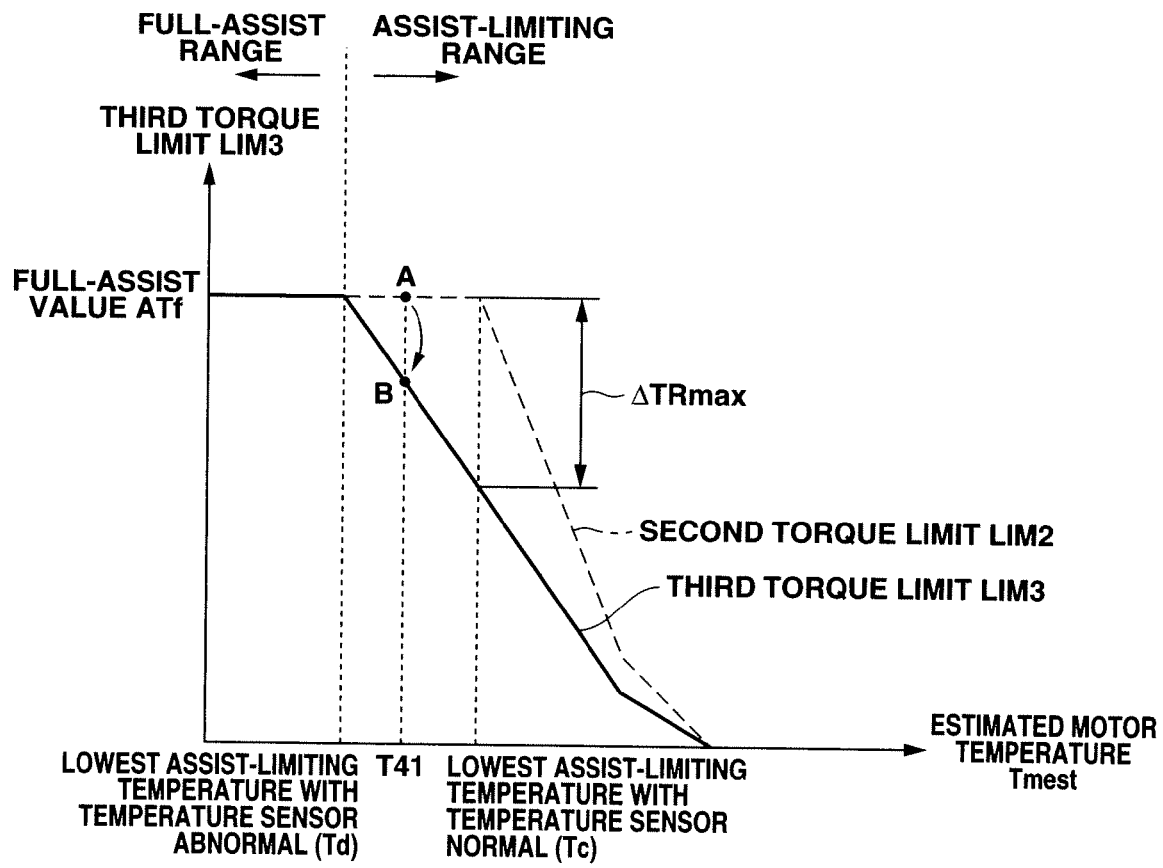
FIG. 34 is a graph showing a function of computing the third torque limit according to a sixth embodiment of the present invention.
Figure 35A:
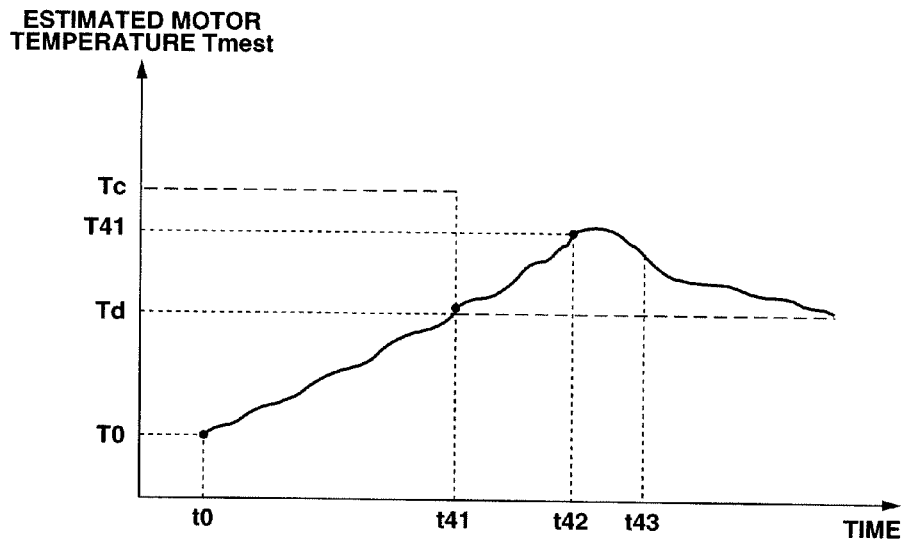
FIGS. 35A, 35B and 35C are a set of time charts showing an example of how a power steering apparatus according to the sixth embodiment operates.
Figure 35B:
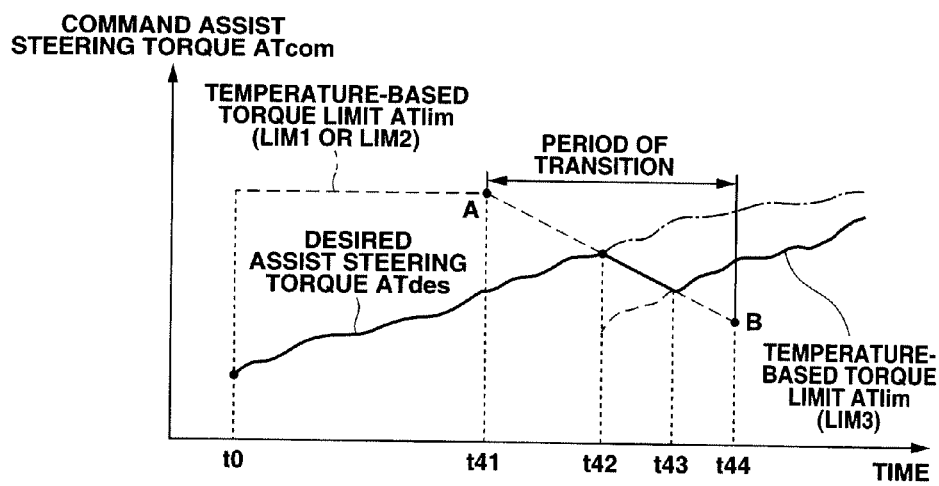
Figure 35C:
Figure 36:
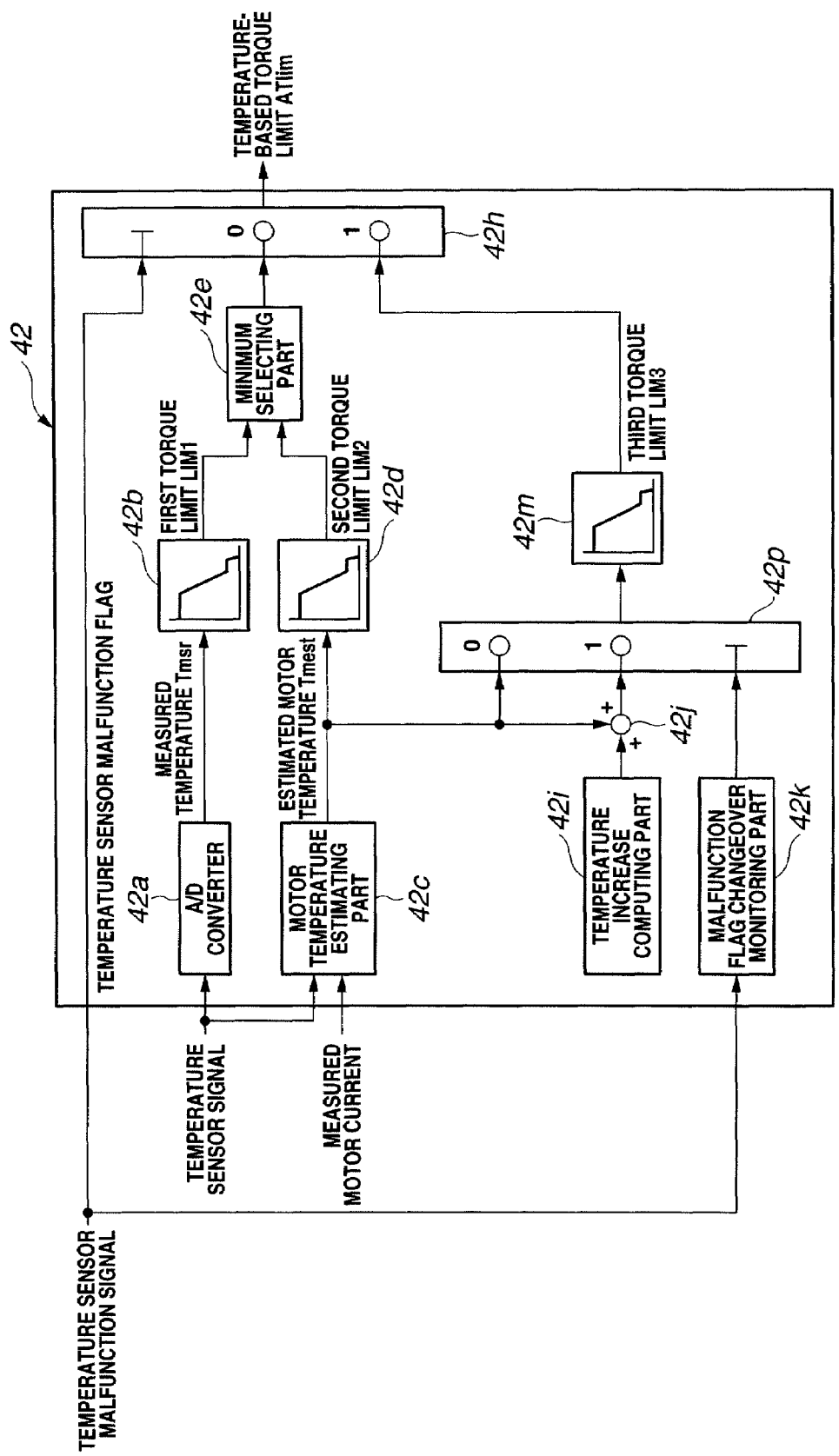
FIG. 36 is a control block diagram showing a temperature-based torque limit computing section of a control unit of a power steering apparatus according to a seventh embodiment of the present invention.

The following describes a power steering apparatus according to a sixth embodiment of the present invention with reference to FIGS. 34 to 35C. As described above, the power steering apparatus according to the fifth embodiment is configured to employ the function of third torque limit LIM3 for setting temperature-based torque limit ATlim to be smaller than the function of second torque limit LIM2, when determining that temperature sensor 40 becomes abnormal. In contrast, as described in detail below, the power steering apparatus according to the sixth embodiment is configured to employ another function of computing third torque limit LIM3 which has a lowest assist-limiting temperature lower than the function of computing second torque limit LIM2, when determining that temperature sensor 40 becomes abnormal.

In the following, the corresponding components are given the same reference characters as in the fifth embodiment. The sixth embodiment differs from the fifth embodiment in the operation of computing third torque limit LIM3 as follows.

FIG. 34 shows a function of computing third torque limit LIM3 according to the sixth embodiment. In FIG. 34, the function of computing second torque limit LIM2 is indicated by broken lines, while the function of computing third torque limit LIM3 is indicated by solid lines. The function of computing third torque limit LIM3 has a lowest assist-limiting temperature Td than the function of computing second torque limit LIM2 (Tc).

When temperature sensor 40 becomes abnormal, the function employed to compute temperature-based torque limit ATlim is shifted gradually over a predetermined period for transition from one of the function of computing first torque limit LIM1 and the function of computing second torque limit LIM2 to the function of computing third torque limit LIM3. The predetermined period is set to vary in accordance with the maximum difference in the torque limit value between the function of computing third torque limit LIM3 and the one of the function of computing first torque limit LIM1 and the function of computing second torque limit LIM2. For example, when temperature sensor 40 becomes abnormal at point A of the curve of second torque limit LIM2 in FIG. 34, temperature-based torque limit ATlim is computed to change gradually over a predetermined period of time from point A to point B of the curve of third torque limit LIM3. The predetermined period is set in accordance with the maximum difference ΔTRmax between the function of computing third torque limit LIM3 and the function of computing second torque limit LIM2.

The following describes an example of how the power steering apparatus according to the sixth embodiment operates with reference to FIGS. 35A, 35B and 35C. FIG. 35A shows how estimated motor temperature Tmest changes with time, FIG. 35B shows how command assist steering torque ATcom changes with time, and FIG. 35C shows how the temperature sensor malfunction flag changes with time.

In the following, estimated motor temperature Tmest when temperature sensor 40 becomes abnormal is assumed to be equal to a temperature value T41. Temperature value T41 is below the lowest assist-limiting temperature Tc of the function of computing second torque limit LIM2 for condition that temperature sensor 40 is normal, and is above the lowest assist-limiting temperature Td of the function of computing third torque limit LIM3 for condition that temperature sensor 40 is abnormal, as shown in FIG. 34.

As shown in FIG. 35B, until time t41 after time t0, command assist steering torque ATcom is set to be equal to desired assist steering torque ATdes, because desired assist steering torque ATdes is smaller than temperature-based torque limit ATlim. Accordingly, as shown in FIG. 35A, until time t41 after time t0, estimated motor temperature Tmest increases with increase in desired assist steering torque ATdes.

At time t41, temperature sensor 40 becomes abnormal, so that the temperature sensor malfunction flag is set to one. Over a predetermined period from time t41 to time t44, temperature-based torque limit ATlim changes from one of first torque limit LIM1 and second torque limit LIM2 (at point A), which is outputted when the temperature sensor malfunction flag is equal to zero, to third torque limit LIM3 (at point B), which is outputted when the temperature sensor malfunction flag is equal to one.

Until time t42 after time t41, command assist steering torque ATcom is set to be equal to desired assist steering torque ATdes, because desired assist steering torque ATdes is still below temperature-based torque limit ATlim. Accordingly, as shown in FIG. 35A, until time t42 after time t41, estimated motor temperature Tmest increases with increase in desired assist steering torque ATdes.

After time t42, command assist steering torque ATcom is set to be equal to temperature-based torque limit ATlim, because temperature-based torque limit ATlim is smaller than desired assist steering torque ATdes. Until time t43 after time t42, command assist steering torque ATcom decreases so that estimated motor temperature Tmest decreases, and that third torque limit LIM3 increases. After time t43, command assist steering torque ATcom is set to be equal to third torque limit LIM3, because third torque limit LIM3 exceeds a value of the line of transition from one of first torque limit LIM1 and second torque limit LIM2 to third torque limit LIM3 (line AB in FIG. 34) at time t43. Incidentally, the line of transition is set on the basis of a previous value of third torque limit LIM3.

Thus, when temperature sensor 40 becomes abnormal, and motor temperature estimating part 42c estimates an increase in estimated motor temperature Tmest, third torque limit LIM3 is set so as to limit the assist steering torque. Therefore, it is possible to produce a sufficient assist steering torque for steering operation, while preventing control unit 4 and electric motor 31 from overheating.

The following describes a power steering apparatus according to a seventh embodiment of the present invention with reference to FIGS. 36 to 39C. As described above, the power steering apparatus according to the fifth embodiment is configured to employ the function of computing third torque limit LIM3 for setting temperature-based torque limit ATlim to be smaller than the function of second torque limit LIM2, when determining that temperature sensor 40 becomes abnormal. In contrast, as described in detail below, the power steering apparatus according to the seventh embodiment is configured to correct estimated motor temperature Tmest by adding a predetermined value, and compute third torque limit LIM3 on the basis of the corrected estimated motor temperature using the function of second torque limit LIM2, when determining that temperature sensor 40 becomes abnormal.

In the following, the corresponding components are given the same reference characters as in the fifth embodiment. The seventh embodiment differs from the first embodiment in the configuration of temperature-based torque limit computing section 42. The following describes the difference with reference to FIG. 36 which is provided by modifying FIG. 22.

Temperature-based torque limit computing section 42 according to the seventh embodiment further includes a temperature increase computing part 42i, an adder 42j, a malfunction flag changeover monitoring part 42k, a switch 42p, and a third torque limit computing part 42m, as compared to the fifth embodiment. Malfunction flag changeover monitoring part 42k receives a signal indicative of malfunction of temperature sensor 40 from temperature sensor malfunction monitoring section 41, and outputs a signal indicative of one when the temperature sensor malfunction flag changes from zero to one. Temperature increase computing part 42i provides a predetermined temperature value. Adder 42j adds to estimated motor temperature Tmest the predetermined temperature value that is outputted from temperature increase computing part 42i.

Switch 42p receives a signal indicative of estimated motor temperature Tmest from motor temperature estimating part 42c, a signal indicative of the corrected estimated motor temperature from adder 42j, and a signal from malfunction flag changeover monitoring part 42k. Switch 42p selectively outputs a signal indicative of estimated motor temperature Tmest when the signal from malfunction flag changeover monitoring part 42k is equal to zero, or outputs a signal indicative of the corrected estimated motor temperature when the signal from malfunction flag changeover monitoring part 42k is equal to one.

Third torque limit computing part 42m receives a signal indicative of one temperature value from switch 42p, computes third torque limit LIM3 on the basis of the input temperature value, and outputs a signal indicative of third torque limit LIM3 to switch 42h.

Third torque limit computing part 42m stores data indicative of a function of computing third torque limit LIM3 which is identical to the function of computing second torque limit LIM2.

Figure 37:
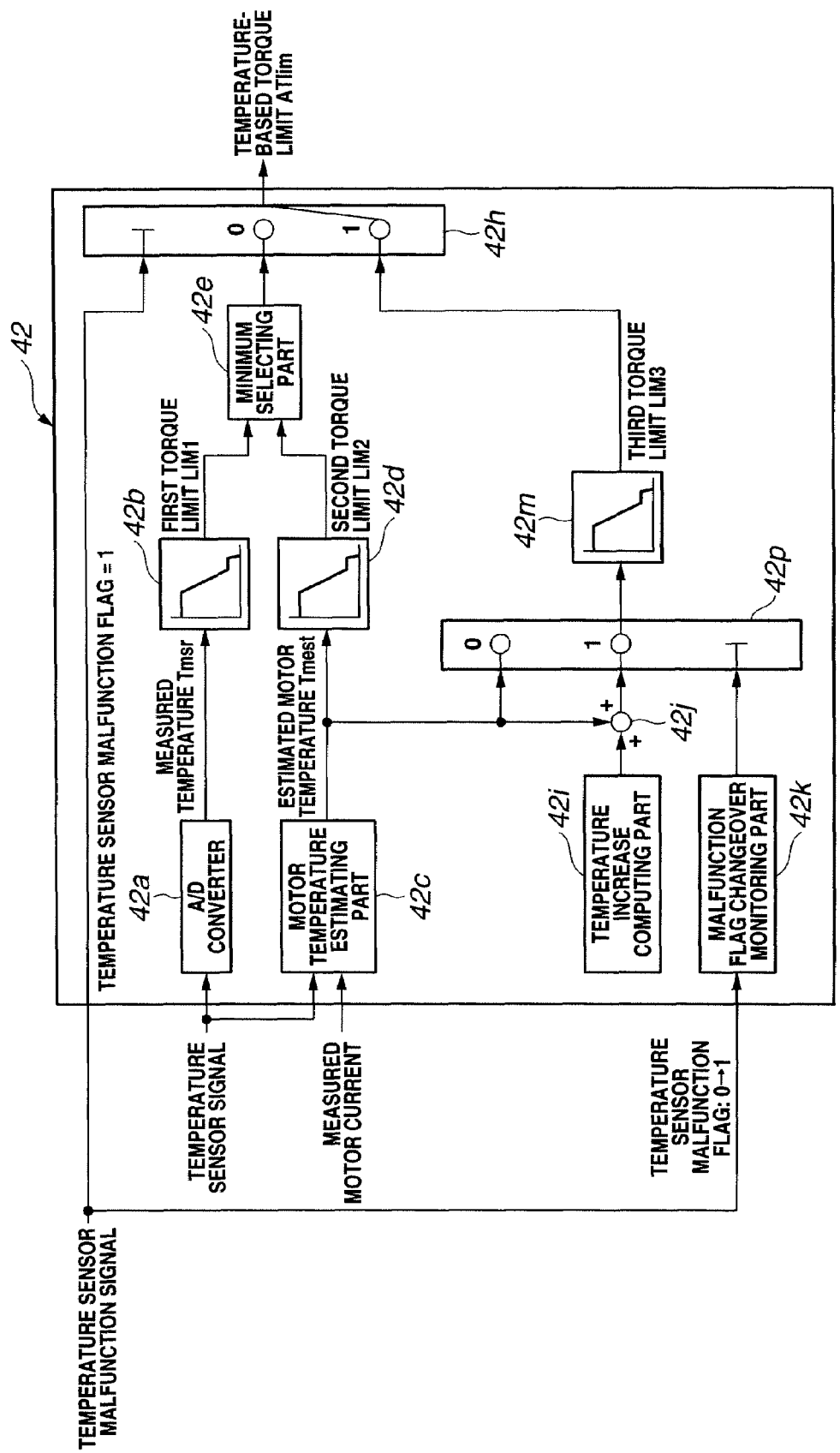
FIG. 37 is a control block diagram showing the temperature-based torque limit computing section under one exemplary condition according to the seventh embodiment.

FIG. 37 shows temperature-based torque limit computing section 42 under condition that switch 42h is switched in accordance with the temperature sensor malfunction flag when the temperature sensor malfunction flag changes from zero to one. When the temperature sensor malfunction flag changes from zero to one, then malfunction flag changeover monitoring part 42k outputs a signal indicative of one. Accordingly, switch 42p outputs to third torque limit computing part 42m the corrected estimated motor temperature which is produced by adding the predetermined value to estimated motor temperature Tmest.

Figure 38:
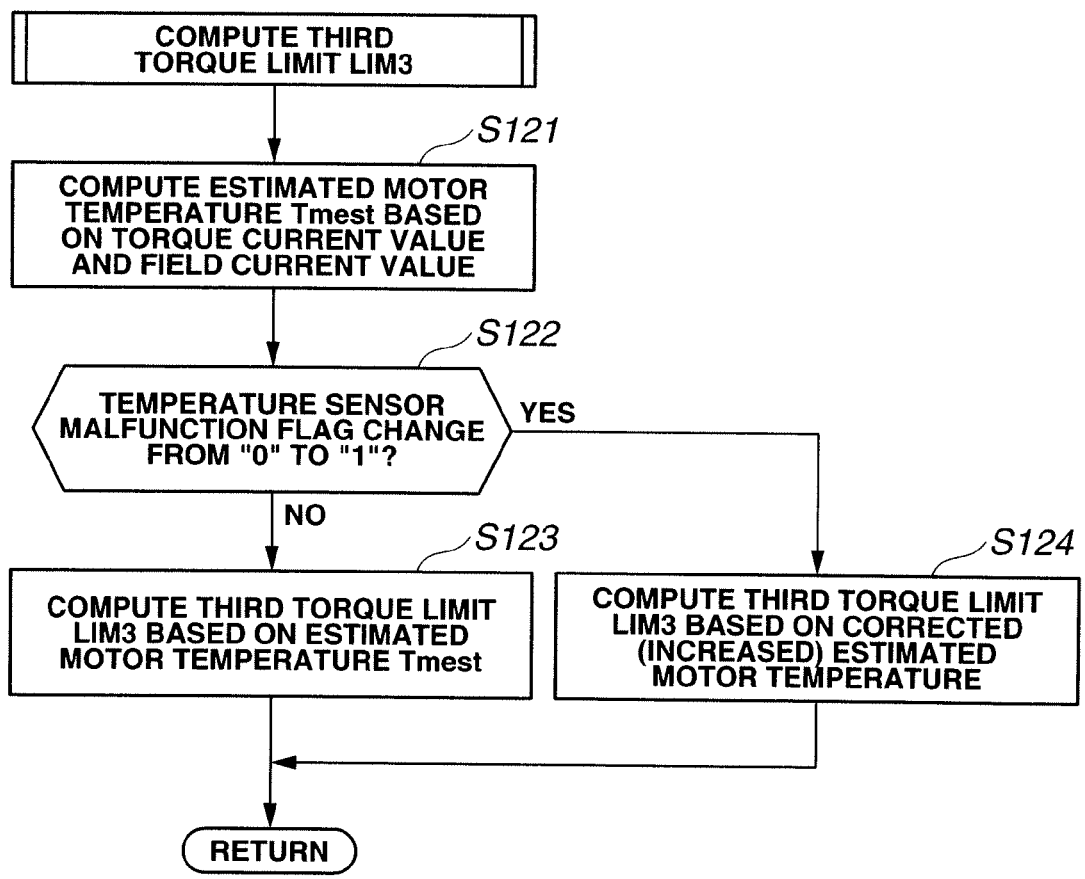
FIG. 38 is a flow chart showing a detailed process of computing the third torque limit according to the seventh embodiment.

The following describes a process of computing third torque limit LIM3 with reference to FIG. 38. At Step S121, control unit 4 computes estimated motor temperature Tmest of electric motor 31 on the basis of the torque current and field current supplied to electric motor 31, and then proceeds to Step S122. Control unit 4 estimates or computes an amount of generated heat on the basis of the value of the current supplied to electric motor 31, and estimates an amount of change of temperature of electric motor 31 on the basis of the computed amount of generated heat, and adds the estimated amount of change of temperature to a reference temperature value T0 to produce estimated motor temperature Tmest.

At Step S122, control unit 4 judges whether or not the temperature sensor malfunction flag has changed from zero to one. When judging that the temperature sensor malfunction flag has changed from zero to one, control unit 4 proceeds to Step S124. When judging that the temperature sensor malfunction flag has not changed from zero to one, control unit 4 proceeds to Step S123.

At Step S123, control unit 4 computes third torque limit LIM3 on the basis of estimated motor temperature Tmest which is computed at Step S121, and then returns from this process. At Step S124, control unit 4 computes third torque limit LIM3 on the basis of the value which is computed by adding the predetermined value to estimated motor temperature Tmest, and then returns from this process.

Figure 39A:
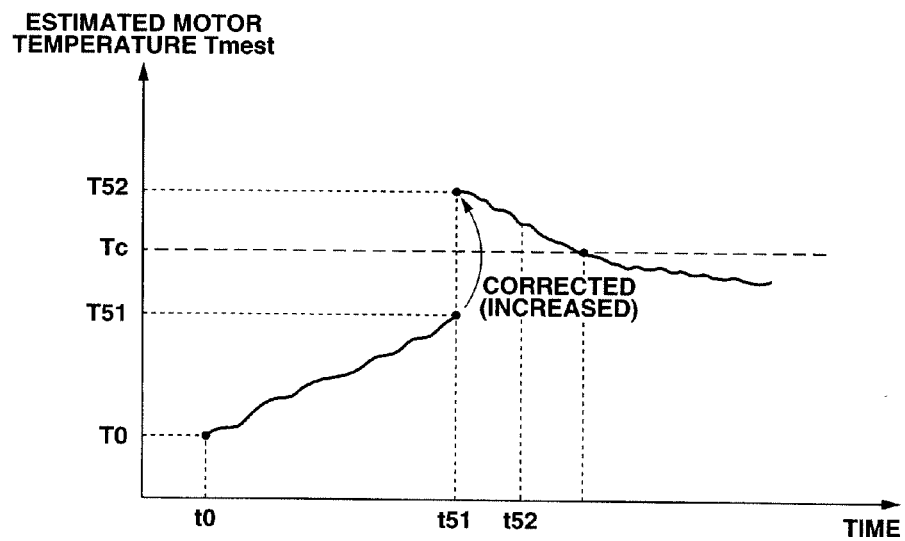
FIGS. 39A, 39B and 39C are a set of time charts showing an example of how the power steering apparatus according to the seventh embodiment operates.
Figure 39B:
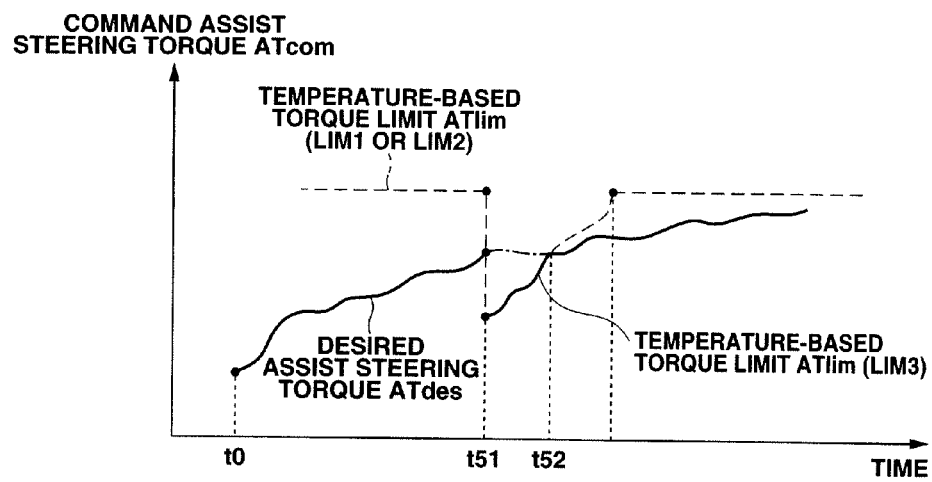
Figure 39C:
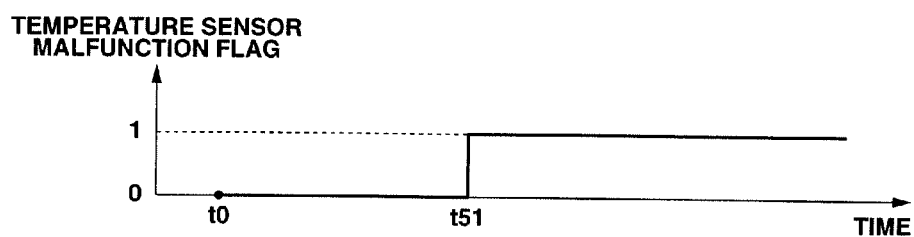

The following describes an example of how the power steering apparatus according to the seventh embodiment operates with reference to FIGS. 39A, 39B and 39C. FIG. 39A shows how estimated motor temperature Tmest changes with time, FIG. 39B shows how command assist steering torque ATcom changes with time, and FIG. 39C shows how the temperature sensor malfunction flag changes with time.

In the following, estimated motor temperature Tmest when temperature sensor 40 becomes abnormal is assumed to be equal to a temperature value T51. Temperature value T51 is below the lowest assist-limiting temperature Tc of the function of computing second torque limit LIM2.

As shown in FIG. 39B, until time t51 after time t0, command assist steering torque ATcom is set to be equal to desired assist steering torque ATdes, because desired assist steering torque ATdes is smaller than temperature-based torque limit ATlim. Accordingly, as shown in FIG. 39A, until time t51 after time t0, estimated motor temperature Tmest increases with increase in desired assist steering torque ATdes.

At time t51, temperature sensor 40 becomes abnormal so that the temperature sensor malfunction flag changes from zero to one. At time 51, estimated motor temperature Tmest is corrected from T51 to T52 by adding the predetermined value, as shown in FIG. 39A. Third torque limit LIM3 is set to be below the maximum value in accordance with temperature value T52, because temperature value T52 is above lowest assist-limiting temperature Tc while temperature value T51 is below lowest assist-limiting temperature Tc.

Until time 52 after time t51, command assist steering torque ATcom is set to be equal to temperature-based torque limit ATlim, because temperature-based torque limit ATlim is smaller than desired assist steering torque ATdes. Accordingly, estimated motor temperature Tmest decreases, while temperature-based torque limit ATlim increases. After time t52, command assist steering torque ATcom is set to be equal to desired assist steering torque ATdes, because desired assist steering torque ATdes is smaller than temperature-based torque limit ATlim.

Thus, when temperature sensor 40 becomes abnormal, and motor temperature estimating part 42c estimates an increase in estimated motor temperature Tmest, third torque limit LIM3 is set so as to limit the assist steering torque. Therefore, it is possible to produce a sufficient assist steering torque for steering operation, while preventing control unit 4 and electric motor 31 from overheating.

The following describes a power steering apparatus according to an eighth embodiment of the present invention with reference to FIGS. 40 to 42C. As described above, the power steering apparatus according to the first embodiment is configured to set temperature-based torque limit ATlim so as to limit desired assist steering torque ATdes. In contrast, as described in detail below, the power steering apparatus according to the eighth embodiment includes an ON-state holding circuit configured to hold control unit 4 in the ON state after an ignition switch or vehicle power switch is turned off.

Figure 40:
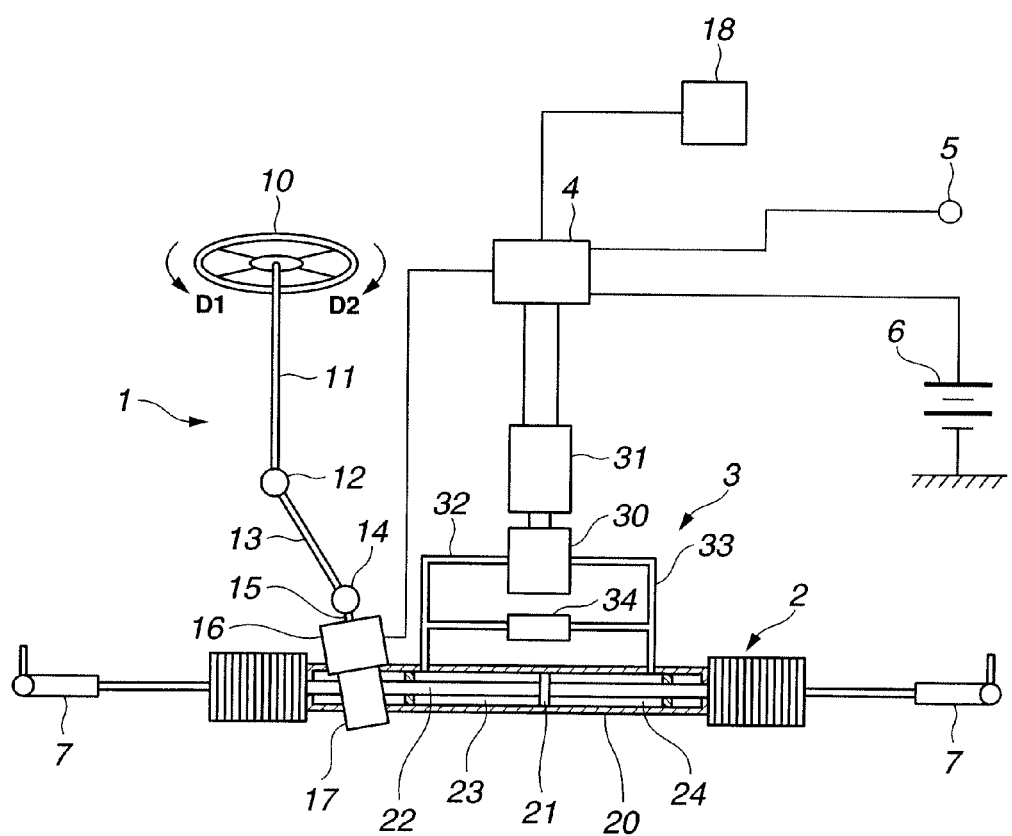
FIG. 40 is a schematic diagram showing system configuration of a power steering apparatus according to an eighth embodiment of the present invention.

In the following, the corresponding components are given the same reference characters as in the first embodiment. FIG. 40 shows system configuration of the power steering apparatus according to the eighth embodiment. The power steering apparatus includes an ON-state holding circuit 18 configured to hold control unit 4 in the ON state after an ignition switch or vehicle power switch is turned off.

ON-state holding circuit 18 receives a signal indicative of measured temperature Tmsr and a signal indicative of estimated motor temperature Tmest of electric motor 31 from control unit 4. When one of measured temperature Tmsr and estimated motor temperature Tmest is above a predetermined threshold temperature value after the ignition switch or vehicle power switch is turned off, ON-state holding circuit 18 outputs a signal (referred to as ON-state holding signal) to control unit 4 so as to hold control unit 4 in the ON state. On the other hand, when one of measured temperature Tmsr and estimated motor temperature Tmest becomes below the threshold temperature value after the ignition switch or vehicle power switch is turned off, ON-state holding circuit 18 stops to output the ON-state holding signal to control unit 4, so as to turn off control unit 4.

According to the provision of ON-state holding circuit 18, when the ignition switch or vehicle power switch is turned on before one of measured temperature Tmsr and estimated motor temperature Tmest becomes lower than the threshold temperature value, motor temperature estimating part 42c can estimate a temperature increase on the basis of the current supplied to electric motor 31, and compute estimated motor temperature Tmest by adding the estimated temperature increase to the current value of estimated motor temperature Tmest as an initial value. On the other hand, when the ignition switch or vehicle power switch is turned on after one of measured temperature Tmsr and estimated motor temperature Tmest becomes lower than the threshold temperature value, motor temperature estimating part 42c can compute estimated motor temperature Tmest by adding the estimated temperature increase to the threshold temperature value as an initial value.

Figure 41:
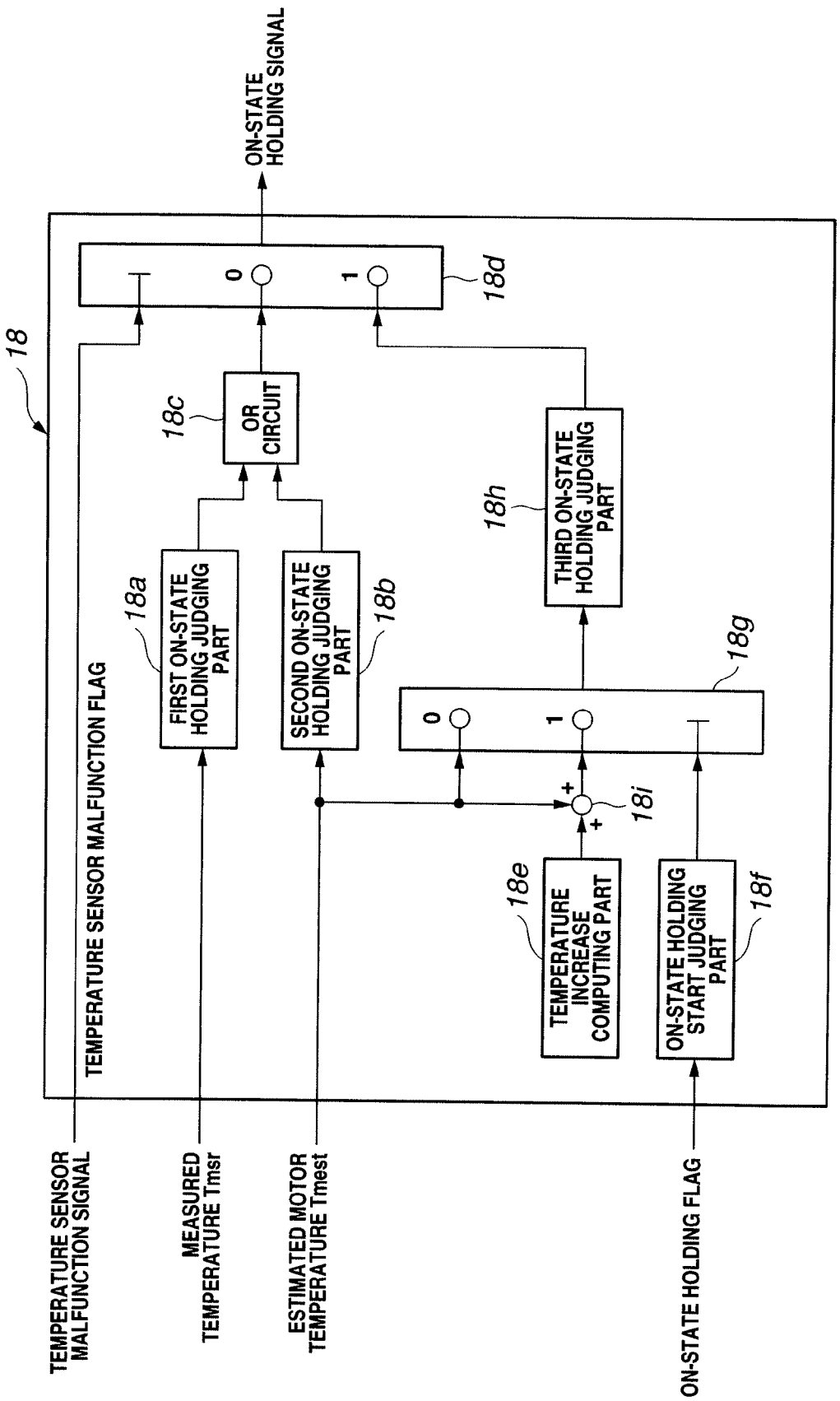
FIG. 41 is a control block diagram showing an ON-state holding circuit 18 of the power steering apparatus according to the eighth embodiment.
Figure 42:
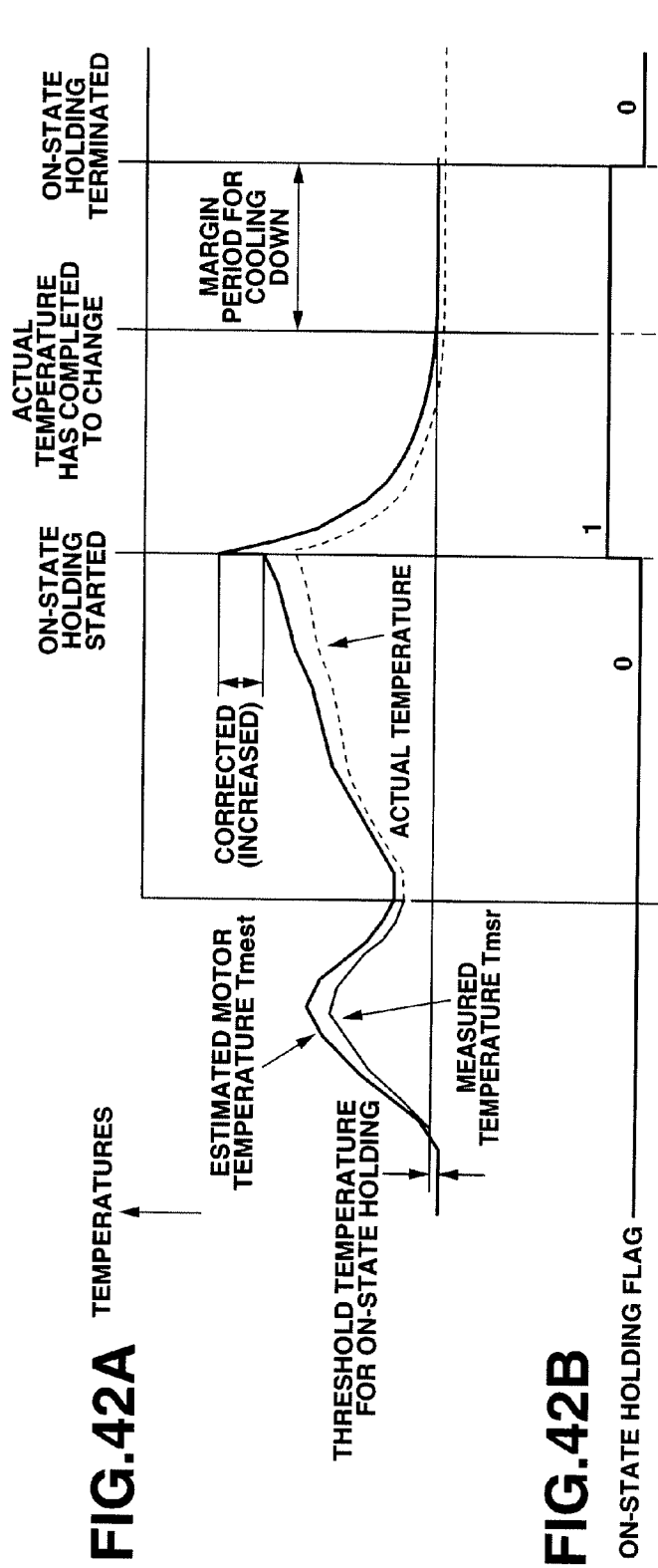
FIGS. 42A, 42B and 42C are a set of time charts showing an example of how the power steering apparatus according to the eighth embodiment operates.

FIG. 41 shows configuration of ON-state holding circuit 18. ON-state holding circuit 18 includes a first ON-state holding judging part 18a, a second ON-state holding judging part 18b, an OR circuit 18c, a switch 18d, a temperature increase computing part 18e, an ON-state holding start judging part 18f, a third ON-state holding start judging part 18h, and an adder 18i. First ON-state holding judging part 18a judges on the basis of the signal indicative of measured temperature Tmsr outputted from control unit 4 whether or not to output the ON-state holding signal to control unit 4.

Second ON-state holding judging part 18b judges on the basis of the signal indicative of estimated motor temperature Tmest outputted from control unit 4 whether or not to output the ON-state holding signal to control unit 4.

OR circuit 18c outputs the ON-state holding signal to switch 18d, when receiving at least one of the ON-state holding signal from first ON-state holding judging part 18a and the ON-state holding signal from second ON-state holding judging part 18b.

ON-state holding start judging part 18f judges whether or not the ignition switch or vehicle power switch is turned from on to off so as to change a flag (referred to as ON-state holding flag) from zero to one. When judging the ON-state holding flag as changing from zero to one, ON-state holding start judging part 18f outputs a signal indicative of one to switch 18g. Otherwise, ON-state holding start judging part 18f outputs a signal indicative of zero to switch 18g. Temperature increase computing part 18e outputs a predetermined value to adder 18i, and then adder 18i corrects estimated motor temperature Tmest by adding the predetermined value, and outputs a signal indicative of the corrected estimated motor temperature to switch 18g.

Switch 18g receives a signal indicative of estimated motor temperature Tmest, a signal indicative of the corrected estimated motor temperature from adder 18i, and the signal from ON-state holding start judging part 18f. When receiving the signal indicative of zero from ON-state holding start judging part 18f, switch 18g outputs a signal indicative of estimated motor temperature Tmest. On the other hand, when receiving the signal indicative of one from ON-state holding start judging part 18f, switch 18g outputs a signal indicative of the corrected estimated motor temperature.

Third ON-state holding start judging part 18h receives a signal indicative of temperature, and judges on the basis of this signal whether or not to output the ON-state holding signal to control unit 4.

Switch 18d receives a signal indicative of the temperature sensor malfunction flag, an ON-state holding signal from OR circuit 18c, and an ON-state holding signal from third ON-state holding start judging part 18h. When the temperature sensor malfunction flag is equal to zero, switch 18d outputs the ON-state holding signal outputted from OR circuit 18c. On the other hand, when the temperature sensor malfunction flag is equal to one, switch 18d outputs the ON-state holding signal outputted from third ON-state holding start judging part 18h.

The following describes an example of how the power steering apparatus according to the eighth embodiment operates with reference to FIGS. 42A, 42B and 42C. FIG. 42A shows how estimated motor temperature Tmest changes with time, FIG. 42B shows how the ON-state holding flag changes with time, and FIG. 42C shows how the temperature sensor malfunction flag changes with time.

At time t61, the temperature sensor malfunction flag is set to one, as shown in FIG. 42C. At time t62, the ON-state holding flag is set to one, as shown in FIG. 42B. At time t62, the corrected estimated motor temperature is inputted into third ON-state holding start judging part 18h. Accordingly, corrected estimated motor temperature Tmest is set to be above the actual motor temperature indicated by broken lines in FIG. 42A. At time t63, the actual motor temperature reaches the threshold temperature value, while estimated motor temperature Tmest reaches the threshold temperature value at time t64 later than time t63.

As described above, the power steering apparatus according to the eighth embodiment includes a circuit (18) for supplying electric power to the control unit (4) after the control unit (4) is switched off, the circuit (18) being configured to: determine in accordance with at least one of the measured temperature (Tmsr) and the estimated temperature (Tmest) whether or not to supply electric power to the control unit (4) after the control unit (4) is switched off; correct the estimated temperature (Tmest) by adding a predetermined value, when determining that the temperature sensor (40) is abnormal; and determine in accordance with the corrected estimated temperature whether or not to supply electric power to the control unit (4) after the control unit (4) is switched off, when determining that the temperature sensor (40) is abnormal. Thus, even when temperature sensor 40 becomes abnormal, it is possible to provide a sufficient period of time to cool down electric motor 31 while holding the control unit 4 in the ON state, and thereby to prevent control unit 4 and electric motor 31 from overheating.

Figure 43:
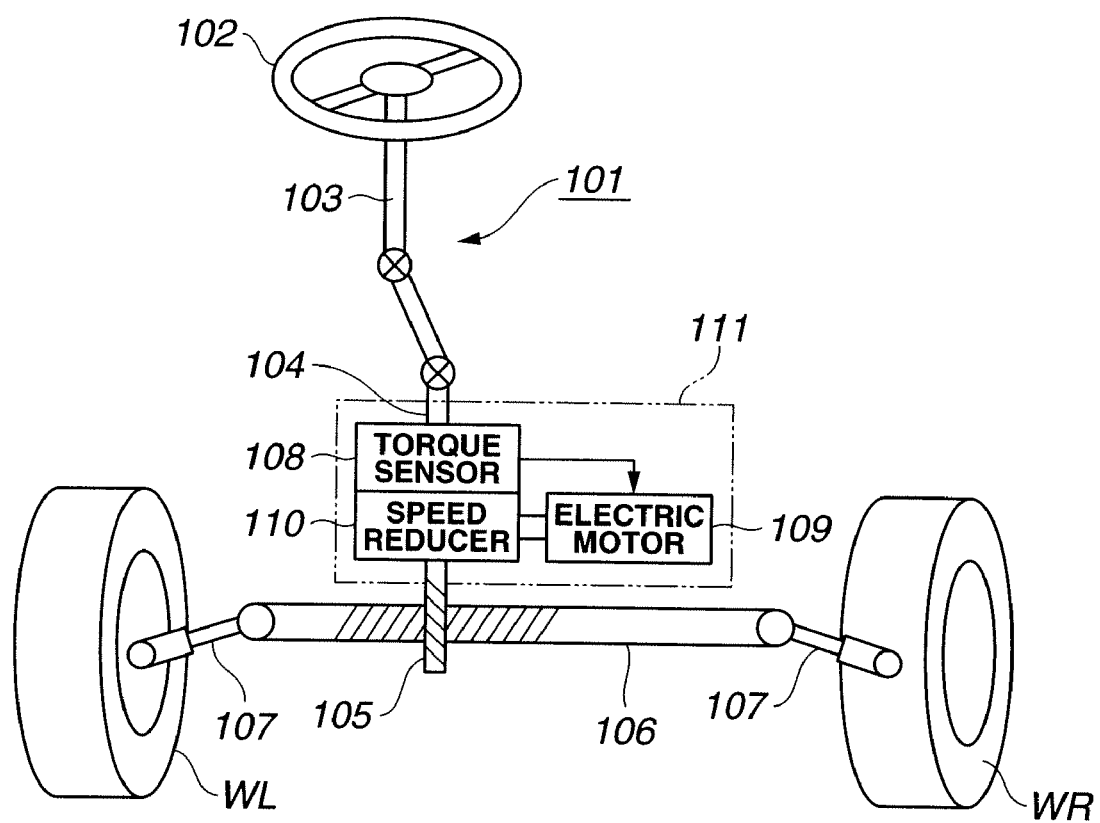
FIG. 43 is a schematic diagram showing system configuration of a power steering apparatus to which the power steering apparatus according to the first to eighth embodiments may be applied.

The following describes an application of the power steering apparatus according to the first to eighth embodiments with reference to FIG. 43. FIG. 43 shows a power steering system to which the power steering apparatus according to first to eighth embodiments may be applied.

As shown in FIG. 43, a power steering apparatus 101 includes a steering wheel 102, a steering shaft 103, an input shaft 104, an output shaft 105, a rack shaft 106, and tie rods 107, 107. Steering wheel 102 is connected to steering shaft 103. Steering shaft 103 is connected to input shaft 104. Output shaft 105 is connected to input shaft 104 through a torsion bar not shown for coaxial relative rotation therebetween. Output shaft 105 is formed with a pinion gear at the axial tip. Rack shaft 106 is formed with a rack gear meshed with the pinion gear of output shaft 105. Each end of rack shaft 106 is connected through tie rod 107 to a knuckle not shown connected to vehicle wheel WL, WR.

When steering wheel 102 is turned, input shaft 104 rotates with steering shaft 103 so as to twist the torsion bar, and thereby to rotate output shaft 105 by the elastic torque of the torsion bar. The rotary motion of output shaft 105 is converted into the linear motion of rack shaft 106 through the rack-and-pinion mechanism. As a result, tie rod 107 pushes or pulls the knuckle, thereby steering vehicle wheel WL, WR.

The point of connection between input shaft 104 and output shaft 105 is covered by a housing 111. Housing 111 accommodates a torque sensor 108, an electric motor 109, and a speed reducer 110. Torque sensor 108 measures a steering torque applied between input shaft 104 and output shaft 105, on the basis of relative angular displacement therebetween. Electric motor 109 generates an assist steering torque in accordance with the measured steering torque. Speed reducer 110 transmits the assist steering torque to output shaft 105.

Electric motor 109 differs from electric motor 31 in that electric motor 109 directly generates an assist steering torque with no hydraulic system. However, control unit 4 may be modified and adapted to electric motor 109 so as to limit the assist steering torque on the basis of the estimated motor temperature.

This application is based on a prior Japanese Patent Application No. 2006-230896 filed on Aug. 28, 2006. The entire contents of this Japanese Patent Application No. 2006-230896 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
   an electric motor for producing an assist steering effort in a steering system;
   a temperature sensor for measuring a temperature of a first portion subject to thermal influence of operation of the electric motor; and
   a control unit configured to:
      determine an estimated temperature of a second portion in accordance with a value of a motor current flowing through the electric motor, the second portion being subject to thermal influence of operation of the electric motor;
      determine a first upper limit value in accordance with the measured temperature;
      determine a second upper limit value in such a manner that when the estimated temperature is below a threshold temperature value, the second upper limit value is larger than or equal to a maximum value of the motor current, and that when the estimated temperature is above the threshold temperature value, the second upper limit value is smaller than the maximum value;
      determine whether the temperature sensor is normal or abnormal;
      limit the motor current to a smaller one of the first and second upper limit values, when determining that the temperature sensor is normal;
      limit the motor current to the second upper limit value, when determining that the temperature sensor is abnormal; and
      correct at least one of the estimated temperature and the threshold temperature value in such a manner that the estimated temperature increases with respect to the threshold temperature value, when determining that when the estimated temperature is below the threshold temperature value, the temperature sensor becomes abnormal.

2. The power steering apparatus as claimed in claim 1, wherein the control unit is configured to determine the estimated temperature of the second portion by:
   determine an estimated amount of change of temperature of the second portion in accordance with the value of the motor current; and
   adding the estimated amount of change of temperature to a reference temperature value.

3. The power steering apparatus as claimed in claim 1, wherein the first portion includes a switching circuit for driving the electric motor.

4. The power steering apparatus as claimed in claim 1, wherein the second portion includes the electric motor.

5. The power steering apparatus as claimed in claim 1, wherein the control unit is configured to:
   determine whether the determination of the estimated temperature is normal or abnormal; and
   limit the motor current to the first upper limit value, when determining that the temperature sensor is normal and that the determination of the estimated temperature is abnormal.

6. The power steering apparatus as claimed in claim 1, wherein the control unit is configured to:
   hold the estimated temperature constant, when determining that when the estimated temperature is above the threshold temperature value, the temperature sensor becomes abnormal.

7. The power steering apparatus as claimed in claim 1, wherein the control unit is configured to:
   set the first upper limit value to be larger than or equal to the maximum value of the motor current, when determining that the temperature sensor is abnormal.

8. The power steering apparatus as claimed in claim 1, wherein the control unit is configured to:
   correct the estimated temperature by adding a predetermined value, when determining that when the estimated temperature is below the threshold temperature value, the temperature sensor becomes abnormal.

9. The power steering apparatus as claimed in claim 1, wherein the control unit is configured to:
   correct the threshold temperature value by subtracting a predetermined value, when determining that when the estimated temperature is below the threshold temperature value, the temperature sensor becomes abnormal.

10. A power steering apparatus comprising:
    an electric motor for producing an assist steering effort in a steering system;
    a temperature sensor for measuring a temperature of a portion subject to thermal influence of operation of the electric motor; and
    a control unit configured to:
       determine an estimated temperature of the portion in accordance with a value of a motor current flowing through the electric motor;
       determine a first upper limit value in accordance with the measured temperature;
       determine a second upper limit value in such a manner that when the estimated temperature is below a threshold temperature value, the second upper limit value is larger than or equal to a maximum value of the motor current, and that when the estimated temperature is above the threshold temperature value, the second upper limit value is smaller than the maximum value;
       determine whether the temperature sensor is normal or abnormal;
       limit the motor current to a smaller one of the first and second upper limit values, when determining that the temperature sensor is normal;
       limit the motor current to the second upper limit value, when determining that the temperature sensor is abnormal; and
       correct at least one of the estimated temperature and the threshold temperature value in such a manner that the estimated temperature increases with respect to the threshold temperature value, when determining that when the estimated temperature is below the threshold temperature value, the temperature sensor becomes abnormal.

11. The power steering apparatus as claimed in claim 10, wherein the control unit is configured to determine the estimated temperature of the portion by:
    determine an estimated amount of change of temperature of the portion in accordance with the value of the motor current; and
    adding the estimated amount of change of temperature to a reference temperature value.

12. The power steering apparatus as claimed in claim 10, wherein the control unit is configured to:

determine whether the determination of the estimated temperature is normal or abnormal; and limit the motor current to the first upper limit value, when determining that the temperature sensor is normal and that the determination of the estimated temperature is abnormal.

13. The power steering apparatus as claimed in claim 10, wherein the control unit is configured to:
hold the estimated temperature constant, when determining that when the estimated temperature is above the threshold temperature value, the temperature sensor becomes abnormal.

14. The power steering apparatus as claimed in claim 10, wherein the control unit is configured to:
set the first upper limit value to be larger than or equal to the maximum value of the motor current, when determining that the temperature sensor is abnormal.

15. A power steering apparatus comprising:
an electric motor for producing an assist steering effort in a steering system;
a temperature sensor for measuring a temperature of a first portion subject to thermal influence of operation of the electric motor; and
a control unit configured to:
determine an estimated temperature of a second portion in accordance with a value of a motor current flowing through the electric motor, the second portion being subject to thermal influence of operation of the electric motor;
determine a first upper limit value in accordance with the measured temperature;
determine a second upper limit value in such a manner that when the estimated temperature is within a first predetermined temperature range, the second upper limit value is larger than or equal to a maximum value of the motor current, and that when the estimated temperature is within a second predetermined temperature range, the second upper limit value is smaller than the maximum value;
determine whether the temperature sensor is normal or abnormal;
limit the motor current to a smaller one of the first and second upper limit values, when determining that the temperature sensor is normal;
limit the motor current to the second upper limit value, when determining that the temperature sensor is abnormal; and
reduce at least one of the first and second upper limit values, when determining that when the estimated temperature is within the first predetermined temperature range, the temperature sensor becomes abnormal.

16. The power steering apparatus as claimed in claim 15, wherein the first portion includes a switching circuit for driving the electric motor.

17. The power steering apparatus as claimed in claim 15, wherein the second portion includes the electric motor.

18. The power steering apparatus as claimed in claim 15, wherein the control unit is configured to:
determine whether the determination of the estimated temperature is normal or abnormal; and
limit the motor current to the first upper limit value, when determining that the temperature sensor is normal and that the determination of the estimated temperature is abnormal.

19. A power steering apparatus comprising:
an electric motor for producing an assist steering effort in a steering system;
a temperature sensor for measuring a temperature of a portion subject to thermal influence of operation of the electric motor; and
a control unit configured to:
determine an estimated temperature of the portion in accordance with a value of a motor current flowing through the electric motor;
determine a first upper limit value in accordance with the measured temperature;
determine a second upper limit value in such a manner that when the estimated temperature is within a first predetermined temperature range, the second upper limit value is larger than or equal to a maximum value of the motor current, and that when the estimated temperature is within a second predetermined temperature range, the second upper limit value is smaller than the maximum value;
determine whether the temperature sensor is normal or abnormal;
limit the motor current to a smaller one of the first and second upper limit values, when determining that the temperature sensor is normal;
limit the motor current to the second upper limit value, when determining that the temperature sensor is abnormal; and
reduce at least one of the first and second upper limit values, when determining that when the estimated temperature is within the first predetermined temperature range, the temperature sensor becomes abnormal.

20. The power steering apparatus as claimed in claim 19, wherein the portion includes the electric motor.

21. The power steering apparatus as claimed in claim 19, wherein the control unit is configured to:
determine whether the determination of the estimated temperature is normal or abnormal; and
limit the motor current to the first upper limit value, when determining that the temperature sensor is normal and that the determination of the estimated temperature is abnormal.

22. The power steering apparatus as claimed in claim 19, wherein the control unit is configured to:
hold the estimated temperature constant, when determining that when the estimated temperature is above the threshold temperature value, the temperature sensor becomes abnormal.

23. A power steering apparatus comprising:
an electric motor for producing an assist steering effort in a steering system;
a temperature sensor for measuring a temperature of a first portion subject to thermal influence of operation of the electric motor; and
a control unit configured to:
determine an estimated temperature of a second portion in accordance with a value of a motor current flowing through the electric motor, the second portion being subject to thermal influence of operation of the electric motor;
determine a first upper limit value in accordance with the measured temperature;
determine a second upper limit value in accordance with the estimated temperature;
determine a third upper limit value in such a manner that the third upper limit value is smaller than or equal to the second upper limit value for each value of the estimated temperature;
determine whether the temperature sensor is normal or abnormal;

limit the motor current to a smaller one of the first and second upper limit values, when determining that the temperature sensor is normal; and limit the motor current to the third upper limit value, when determining that the temperature sensor is abnormal.

24. The power steering apparatus as claimed in claim 23, wherein the control unit is configured to:

determine the third upper limit value by reducing the second upper limit value for each value of the estimated temperature.

25. The power steering apparatus as claimed in claim 23, wherein the control unit is configured to:

determine the second upper limit value in such a manner that when the estimated temperature is below a first threshold temperature value, the second upper limit value is larger than or equal to a maximum value of the motor current, and that when the estimated temperature is above the first threshold temperature value, the second upper limit value is smaller than the maximum value; and determine the third upper limit value in such a manner that when the estimated temperature is below a second threshold temperature value lower than the first threshold temperature value, the second upper limit value is larger than or equal to the maximum value, and that when the estimated temperature is above the second threshold temperature value, the second upper limit value is smaller than the maximum value.

26. The power steering apparatus as claimed in claim 23, wherein the control unit is configured to:

correct the estimated temperature by adding a predetermined value; and determine the third upper limit value in accordance with the corrected estimated temperature.

27. A power steering apparatus comprising:

an electric motor for producing an assist steering effort in a steering system;

a temperature sensor for measuring a temperature of a first portion subject to thermal influence of operation of the electric motor;

a control unit for controlling the electric motor, the control unit being configured to determine an estimated temperature of a second portion in accordance with a value of a motor current flowing through the electric motor, the second portion being subject to thermal influence of operation of the electric motor; and a circuit for supplying electric power to the control unit after the control unit is switched off, the circuit being configured to:

determine in accordance with at least one of the measured temperature and the estimated temperature whether or not to supply electric power to the control unit after the control unit is switched off;

correct the estimated temperature by adding a predetermined value, when determining that the temperature sensor is abnormal; and determine in accordance with the corrected estimated temperature whether or not to supply electric power to the control unit after the control unit is switched off, when determining that the temperature sensor is abnormal.

* * * * *